US011939247B2

(12) United States Patent
Sheldon-Coulson et al.

(10) Patent No.: US 11,939,247 B2
(45) Date of Patent: Mar. 26, 2024

(54) SYSTEMS AND METHODS FOR REMOVAL AND SEQUESTRATION OF ACIDITY FROM SURFACE SEAWATER

(71) Applicant: Lone Gull Holdings, Ltd., Portland, OR (US)

(72) Inventors: Garth Alexander Sheldon-Coulson, Portland, OR (US); Brian Lee Moffat, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 17/972,502

(22) Filed: Oct. 24, 2022

(65) Prior Publication Data

US 2023/0130444 A1 Apr. 27, 2023

Related U.S. Application Data

(60) Provisional application No. 63/410,009, filed on Sep. 26, 2022, provisional application No. 63/304,573, (Continued)

(51) Int. Cl.
*C02F 1/66* (2023.01)
*B63J 3/00* (2006.01)
(Continued)

(52) U.S. Cl.
CPC .............. *C02F 1/66* (2013.01); *B63J 3/00* (2013.01); *C01B 7/012* (2013.01); *C01B 9/02* (2013.01);
(Continued)

(58) Field of Classification Search
CPC .......... C02F 2201/008; C02F 2201/009; C02F 2201/46115; C25B 1/55; C25B 9/17
See application file for complete search history.

(56) References Cited

U.S. PATENT DOCUMENTS 1,121,910 A * 12/1914 Engelstad ............... C01B 7/012
422/198
4,256,552 A * 3/1981 Sweeney ................... C25B 9/19
204/260

(Continued)

OTHER PUBLICATIONS

English translation of CN-105435589 (Year: 2016).*
English translation of CN-108502132 (Year: 2018).*
English translation of DE-3924908 (Year: 1991).*

*Primary Examiner* — Salil Jain
(74) *Attorney, Agent, or Firm* — Fulwider Patton LLP

(57) ABSTRACT

A method by which an environmental energy (e.g., wave energy) is harvested, converted into electrical power, and thereafter used to electrolyze seawater into hydrogen and chlorine gases. Those gases are recombined into hydrogen chloride from which is formed hydrochloric acid solution which is diluted and deposited at a depth sufficient to ensure its neutralization and sequestration for a significant period of time (e.g., for over a millennium). By removing chloride ions from a portion of the sea adjacent to its upper surface and depositing them into a portion of the sea more adjacent to its bottom, acidity is shifted from the surface to base of the sea, and the surface ocean is given a greater ability to absorb and buffer atmospheric carbon dioxide without a corresponding increase in acidity.

21 Claims, 59 Drawing Sheets

Related U.S. Application Data filed on Jan. 29, 2022, provisional application No. 63/272,157, filed on Oct. 26, 2021.

(51) Int. Cl.

| | | |
|---|---|---|
| *C01B 7/01* | (2006.01) | |
| *C01B 9/02* | (2006.01) | |
| *C02F 1/22* | (2023.01) | |
| *C02F 1/32* | (2023.01) | |
| *C02F 1/461* | (2023.01) | |
| *C02F 103/08* | (2006.01) | |
| *C25B 1/04* | (2021.01) | |
| *C25B 1/26* | (2006.01) | |
| *C25B 9/19* | (2021.01) | |
| *C25B 15/08* | (2006.01) | |

(52) U.S. Cl.
CPC ............... *C02F 1/22* (2013.01); *C02F 1/32* (2013.01); *C02F 1/461* (2013.01); *C25B 1/04* (2013.01); *C25B 1/26* (2013.01); *C25B 9/19* (2021.01); *C25B 15/081* (2021.01); *C02F 2103/08* (2013.01); *C02F 2201/008* (2013.01); *C02F 2201/009* (2013.01); *C02F 2201/46115* (2013.01); *C02F 2201/4618* (2013.01)

(56) References Cited

U.S. PATENT DOCUMENTS

| | | | | |
|---|---|---|---|---|
| 4,804,523 | A * | 2/1989 | Abrams | B01D 53/501 423/243.08 |
| 8,551,299 | B2 * | 10/2013 | Keshavarz | C01B 7/012 204/157.52 |
| 2001/0022952 | A1 * | 9/2001 | Rau | B01D 53/62 422/600 |
| 2008/0231053 | A1 * | 9/2008 | Burtch | F03D 9/19 290/55 |
| 2010/0051859 | A1 * | 3/2010 | House | B01D 53/62 423/419.1 |

\* cited by examiner

SYSTEMS AND METHODS FOR REMOVAL AND SEQUESTRATION OF ACIDITY FROM SURFACE SEAWATER

CROSS-REFERENCES TO RELATED APPLICATIONS

This application is based upon and claims priority from U.S. Provisional Application Nos. 63/410,009, filed Sep. 16, 2022; 63/304,573, filed Jan. 29, 2022; and 63/272,157, filed Oct. 26, 2021, incorporated by reference in their entirety.

BACKGROUND

Increasing concentrations of carbon dioxide in the Earth's atmosphere have led to an increasing acidity in the world's oceans. Our environment, and our lives, would benefit from an increase in the rate at which carbon dioxide is removed from the atmosphere. And the rate at which carbon dioxide is absorbed by the world's oceans is correlated with the total alkalinity of the surface waters of those oceans. Therefore, decreasing the acidity and/or increasing the alkalinity of the world's oceans will act to restore more natural levels of carbon dioxide in the atmosphere and more natural levels of acidity in the world's oceans. The present invention removes acidity from the surface waters of an ocean and sequesters it in the more alkaline waters of found far below the surface.

SUMMARY OF THE INVENTION

Disclosed are novel environmentally-powered systems for removing acidity from the upper reaches of the ocean and transferring it to the ocean's lower reaches, thereby reducing acidity at the surface, and allowing ancient calcareous deposits and deep, relatively alkaline waters to neutralize that acid immediately, instead of, as would otherwise happen naturally, over the course of millennia. Furthermore, by removing acidity from those portions of the ocean adjacent to the atmosphere, the ability of those portions of the ocean to absorb carbon dioxide from the atmosphere is enhanced. Thus, by removing acidity from the surface of the sea, and transferring it to depth where it is neutralized, the sea is made able to absorb an increased amount of carbon dioxide from the atmosphere, thereby reducing the rate of the world's warming, and limiting if not decreasing the rate of the ocean's acidification.

DETAILED DESCRIPTIONS OF THE EMBODIMENTS

Figure 1:
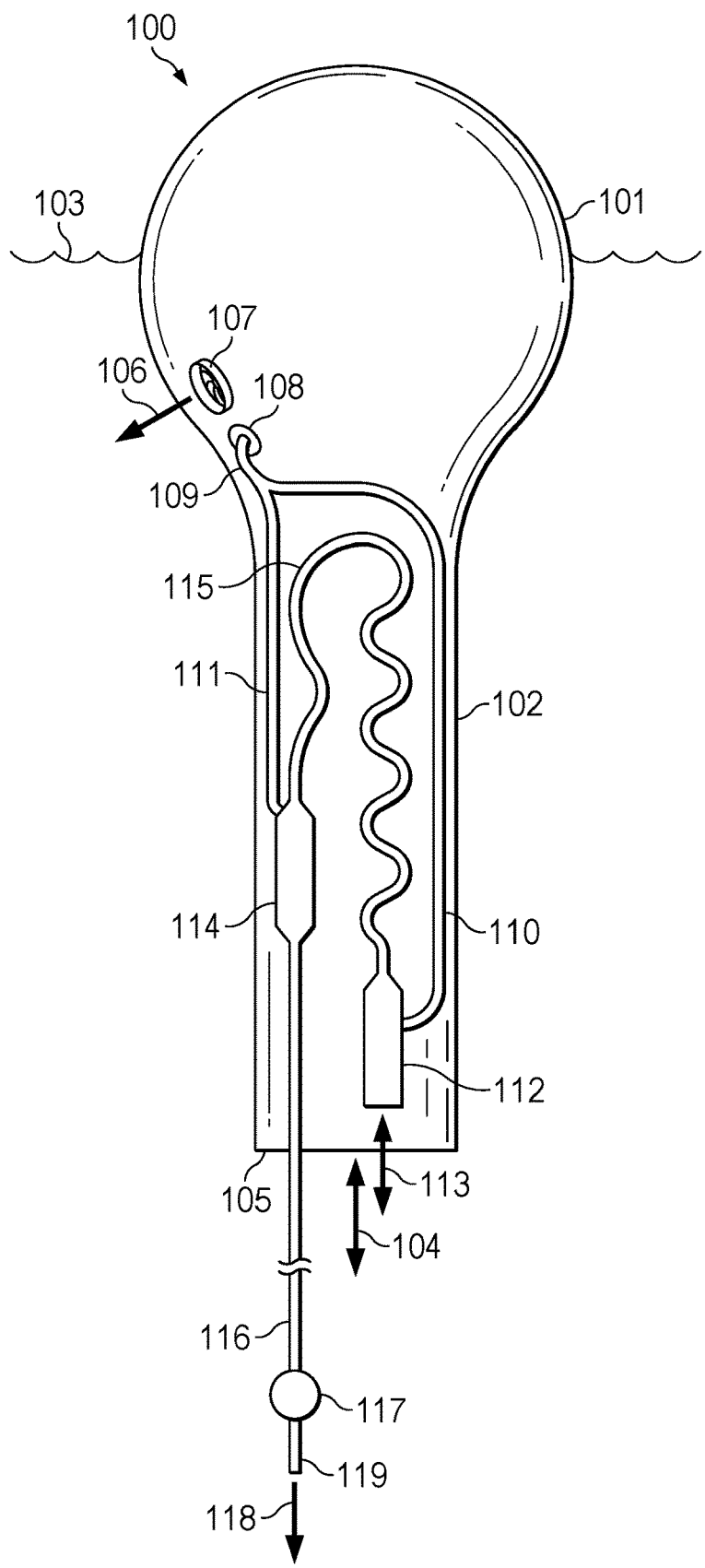
FIG. 1 is a side view of a first embodiment of the present invention.

For a fuller understanding of the nature and objects of the inventions, reference should be made to the preceding Summary of the Invention, taken in connection with the accompanying drawings. The following figures offer explanatory illustrations. The following figures, and the illustrations offered therein, in no way constitute limitations, either explicit or implicit, on and/or of the present inventions.

The present invention includes, but is not limited to, embodiments that incorporate, utilize, and/or include, seawater electrolyzers that execute, implement, and/or manifest, processes that produce hydrogen and chlorine gases from seawater. In an electrolytic cell, apparatus, and/or device, of the type used to electrolyze seawater, and such as the kind used by some embodiments of the present invention, a direct (DC) electrical current is passed through a reservoir, volume, and/or quantity, of seawater. The current is applied to the seawater reservoir by, and/or between, two electrodes: a negatively-charged cathode, and a positively-charged anode, resulting in the evolution of said gases.

The present invention includes, but is not limited to, embodiments that incorporate, utilize, and/or include, seawater diaphragm-cell electrolyzers. The present invention includes, but is not limited to, embodiments that incorporate, utilize, and/or include, electrolyzers which incorporate, utilize, and/or include, diaphragms comprised of porous mixtures of asbestos and polymers. The present invention includes, but is not limited to, embodiments that do not include any diaphragm or membrane between anode and cathode elements.

The evolution of the anode-reduced chlorine atoms as a chlorine gas is also promoted, and/or its efficiency is increased, by creating a flow of seawater, within and/or through a seawater electrolyzer, that originates at the anode and then flows to the cathode, thus inhibiting a counterflow of hydroxide ions from the cathode to the anode which might reduce an amount of chlorine gas produced by a seawater electrolyzer (as such hydroxide ions chemically reacted with dissolved chlorine to produce oxygenated compounds of chlorine). The present invention includes, but it not limited to, embodiments that create a pumping action and/or electrolyte flow manifesting this anode-to-cathode flow pattern, with or without a diaphragm or other cell separator.

The present invention includes, but is not limited to, embodiments that incorporate, utilize, and/or include, an electrolyzer cathode comprised of steel. The present invention includes, but is not limited to, embodiments that incorporate, utilize, and/or include, electrolyzers incorporating, utilizing, and/or including steel cathodes having exterior coatings of nickel. The present invention includes, but is not limited to, embodiments that incorporate, utilize, and/or include, an electrolyzer cathode comprised of a flat hollow steel mesh or perforated steel sheet covered with asbestos fibers and fibrous polytetrafluoro-ethylene (PFTE), wherein the asbestos fibers and fibrous PFTE function as the electrolyzer diaphragm. The present invention includes, but is not limited to, embodiments that incorporate, utilize, and/or include, electrolyzer cathodes coated with a catalyst such as, but not limited to, nickel-sulfur, nickel-aluminum, nickel-nickel oxide, platinum group metals, to increase the cathode's surface area and reduce the hydrogen evolution potential.

The present invention includes, but is not limited to, embodiments that incorporate, utilize, and/or include, electrolyzer anodes comprised of titanium plates covered with layers of Group VIII oxides with metal conductivity (e.g., covered with exterior coatings of ruthenium oxide and/or titanium oxide), and sometimes including iridium oxide.

The present invention includes, but is not limited to, embodiments that incorporate, utilize, and/or include, electrolyzers through which seawater flows continuously, and/or steadily, into respective anode chambers and, from inside those respective anode chambers, then flow to and/or through respective electrolyzer diaphragms to respective cathode chambers.

The present invention includes, but is not limited to, embodiments that incorporate, utilize, and/or include, electrolyzers in which chlorine gas forms at respective anodes, and sodium hydroxide solution and hydrogen gas form directly at respective cathodes. The present invention includes, but is not limited to, embodiments that incorporate, utilize, and/or include, electrolyzers in which respective diaphragms prevent mixing of the electrolytic, and/or cathodic and anodic, products hydrogen and chlorine thereby promoting the separate and/or separated evolution of those respective gases. The present invention includes, but is not limited to, embodiments that incorporate, utilize, and/or include, electrolyzers in which respective diaphragms limit the back-diffusion of hydroxide ions formed at respective cathodes to respective anodes, which thereby promotes the evolution of anode-reduced chlorine as a gas rather than as a hypochlorite solution.

The present invention includes, but is not limited to, embodiments that incorporate, utilize, and/or include, combustion chambers in which hydrogen and chlorine gases produced by respective seawater electrolyzers are ignited and thereby caused to chemically react and produce hydrogen chloride gases. The present invention includes, but is not limited to, embodiments that incorporate, utilize, and/or include, water and/or seawater reservoirs into which hydrogen chloride gases dissolve thereby dissociating into hydrochloric acids. Such seawater reservoirs become increasingly acidic as they absorb more and more hydrogen chloride gas and incorporate more and more concentrated solutions of hydrochloric acid.

While not shown in the sample embodiments illustrated herein, the present invention includes, but is not limited to, embodiments that incorporate, utilize, and/or include, electrolyzers fluidly connected, e.g., by "descaling" valves, to respective hydrochloric acid reservoirs, e.g., within respective combustion chambers. Periodically, an embodiment control system opens a respective descaling valve and thereby permits a relatively small amount and/or quantity of hydrochloric acid solution to flow from a respective hydrochloric acid solution reservoir into the respective cathodic portion and/or chamber of the respective seawater electrolyzer thereby dissolving and/or flushing from the cathodic chamber any precipitates of calcium hydroxide and/or magnesium hydroxide. The illustrations and discussions of the sample embodiments herein omit, for the sake of clarity, such obvious and mundane precipitant-flushing mechanisms, devices, and/or systems.

The present invention includes, but is not limited to, embodiments that incorporate, utilize, and/or include, seawater electrolyzer chambers and/or housings comprised, at least in part, of polyvinyl chlorides, and/or PVCs, as materials of construction and/or fabrication.

FIG. 1 shows a side view of a first embodiment 100 of the present disclosure. The embodiment comprises, in part, a wave energy converter (WEC) 101/102 that is an embodiment of an inertial hydrodynamic wave engine of the type disclosed in U.S. patent Ser. No. 16/789,205. The WEC produces electrical power in response to wave motion as explained in U.S. patent Ser. No. 16/789,205.

In summary, as the WEC 101/102 floats at the surface 103 of a body of water, and moves up and down in response to waves moving across the surface of that body of water, water within the WEC's hollow tube 102 moves 104 in and out of the tube 102 via a mouth 105 or aperture at a lower end of the tube. Periodically, water moving up within the tube 102 encounters a constriction therein and a resulting increase in fluid pressure causes an ejection of pressurized water up and into a pressurized reservoir within the WEC's pressurized upper hollow spherical buoy 101. Pressurized water from the WEC's reservoir flows out 106, and back into the body of water, through a water turbine 107. And, a generator (not shown), operatively connected to the water turbine, produces electrical power in response to an outflow 106 of water and a consequent rotation of the water turbine.

A portion of the electrical power produced by the embodiment's generator (not shown) passes from an interior of the WEC 101/102 to an exterior of the WEC through a bulkhead connector 108. The electrical conductor 109, cable, and/or assembly of wires, which exits the interior of the WEC splits into two electrically connected electrical cables 110 and 111.

Electrical cable 110 electrically connects an electrical output of the generator (not shown) to an electrolyzer cathode (not visible), and an electrolyzer anode (not visible), positioned within an electrolysis chamber 112 where the electrical power supplied by the embodiment's generator causes hydronium (H3O+) ions dissolved within the body of seawater 103 to be reduced at a cathode of the electrolyzer, thereby producing bubbles of hydrogen gas (H2), and causes chloride (Cl−) ions dissolved within the body of seawater to be oxidized at an anode of the electrolyzer, thereby producing bubbles of chlorine gas (Cl2).

As the WEC 101/102 is moved up and down in response to wave motion at the surface 103 of the body of water on which it floats, seawater tends to flow 113 in and out of the cathodic and anodic chambers of the electrolysis chamber 112 thereby ensuring that fresh seawater, i.e., seawater with undepleted concentrations of chloride ions, is continuously available for oxidation at the anode of the electrolyzer, and that hydroxide produced at the cathode is frequently, if not continuously, removed from the cathodic chamber of the electrolyzer.

Electrical cable 111 electrically connects an electrical output of the embodiment's 100 generator (not shown) to an ultraviolet light source, e.g., an LED, and an electrical-spark generator, within a combustion chamber 114. A control unit within the combustion chamber periodically illuminates the ultraviolet light source, and/or creates a voltage, and a consequent spark, across the electrical-spark electrodes, thereby causing a mixture of hydrogen and chlorine gases within the combustion chamber to ignite, react, and/or combine, such that those gases tend to be converted into hydrogen chloride gas, which tends to form hydrochloric acid within a seawater reservoir within the combustion chamber upon contact with a free surface of that seawater reservoir.

Other embodiments of the present disclosure similar to the embodiment illustrated in FIG. 1 trigger an ignition, combustion, and/or reaction, of hydrogen and chlorine gases within their respective combustion chambers, using light sources of wavelengths other than ultraviolet, other electrical phenomena, and other catalysts of chemical reaction. The scope of the present disclosure includes embodiments incorporating, utilizing, and/or including, any and all means, devices, signals, triggers, and/or physical phenomena, which are able to cause hydrogen and chlorine gases to react and form hydrogen chloride gas.

Hydrogen and chlorine gases produced, synthesized, and/or created, within the electrolysis chamber 112 tend to bubble up into, and then through, a gas tube 115 which carries the gas to the combustion chamber 114 where it is periodically ignited and thereby converted into hydrogen chloride gas, which upon dissolution in a seawater reservoir, becomes hydrochloric acid, thereby acidifying the seawater reservoir.

The seawater reservoir of embodiment 100 is contained within an acid-resistant and flexible acid discharge hose 116. Hydrogen chloride gas produced within the combustion chamber 114 is able to fluidly communicate with, and mixes with, seawater within the discharge hose. And, the fluid connection of the interior of the discharge hose to the body of seawater 103 on which the embodiment floats, and the seawater which flows up and into the discharge hose as a consequence of its fluid connection to that body of water, causes the seawater within the discharge hose to serve as, and/or constitute, the seawater reservoir into which the hydrogen chloride produced within the combustion chamber dissolves and transforms into hydrochloric acid.

Hydrochloric acid dissolved within the fluid within the discharge hose is continually drawn down and out of the distal end of the discharge hose. Seawater continually dilutes the hydrochloric acid dissolved within the seawater within the discharge hose.

Hydrogen chloride gas produced within the combustion chamber 114 flows within the combustion chamber until it comes into contact with a free surface of seawater within the acid-resistant and flexible acid discharge hose 116. A lower end of the acid discharge hose is held down, and drifting of the lower end of the acid discharge hose is inhibited, through a hose weight 117 attached, connected, and/or integrated within, a lower end of the acid discharge hose.

Hydrochloric acid deposited into an upper end of the acid discharge hose 116, e.g., from within the combustion chamber 114, flows 118 out of a mouth 119, and/or aperture, at a lower and/or distal end of the acid discharge hose. The length of the acid discharge hose, and therefore the depth at which the hydrochloric acid flows into the body of water 103, is configured to be sufficient to cause the hydrochloric acid solution flowing out of the lower mouth 119 of the acid discharge hose 116 to be deposited into a portion of the body of water, e.g., a portion of sufficient depth, wherein the discharged hydrochloric acid is neutralized and the chloride ions thereby sequestered for a significant period of time, if not forever. For example, in one embodiment of similar to the one illustrated in FIG. 1, the length of the acid discharge hose, and the depth at which hydrochloric acid flowing therefrom is deposited, is 3 km.

Figure 2:
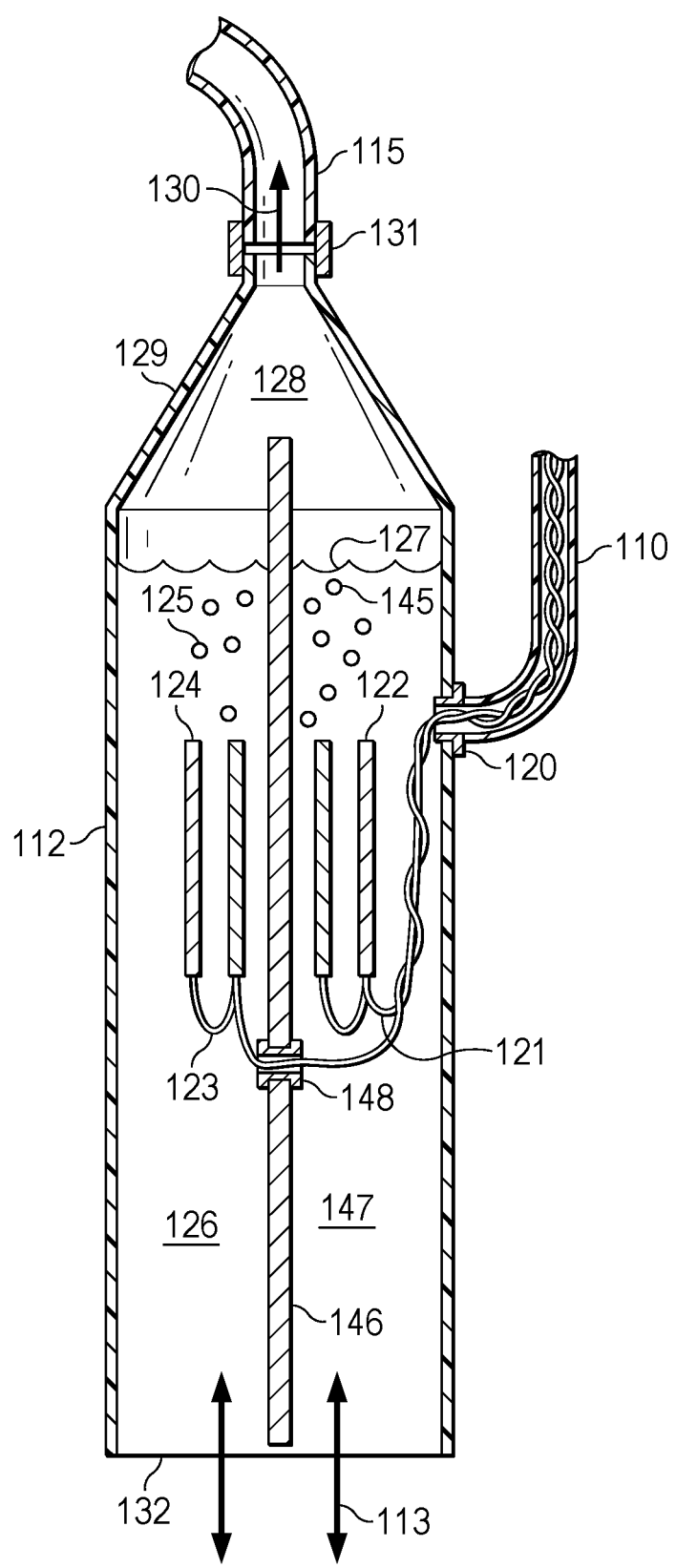
FIG. 2 is a side sectional view of a first component of the first embodiment.

FIG. 2 shows a side sectional view of the electrolysis chamber 112 of the first embodiment 100. Electrical cable 110 brings and/or transmits electricity from the embodiment's generator (not shown). The electrical cable passes through a wall of the electrolysis chamber through a bulkhead connector 120. One wire 121 of the electrical cable, exhibiting a positive charge, is connected to a pair of anodic electrodes, e.g., 122, each of which is fabricated of titanium. In this and other embodiments, anodes are "dimensionally stable" anodes coated with a mixed metal oxide surface layer. Another wire 123 of the electrical cable, exhibiting a negative charge, is connected to a pair of cathodic electrodes, e.g., 124, each of which is fabricated of steel.

The pair of cathodic electrodes, e.g., 124, and the cathodic side 126 and/or chamber of the electrolyzer 112, is separated from the pair of anodic electrodes, e.g., 122, and the anodic side 147 and/or chamber of the electrolyzer, by a semipermeable, microporous diaphragm 146, through which ions may pass, e.g., so as to enable, facilitate, and/or manifest, an electrical current through the seawater and between the cathodic and anodic electrodes, thereby facilitating electrolysis of the seawater within the electrolysis chamber. However, the diaphragm inhibits the movement of hydroxide ions (OH−) from the cathodic chamber to the anodic chamber thereby inhibiting the conversion of oxidized chlorine into hypochlorite before it can form a gas and bubble, e.g., 145, out of the seawater 126. The electrical cable and/or wire 123 conducting a negative DC voltage to the cathodic electrodes, e.g., 124, passes through the diaphragm via a bulkhead connector 148.

When energized with electrical power produced by the embodiment's generator (not shown) and altered by the embodiment's power electronics (not shown), the pair of cathodic electrodes, e.g., 124, reduce hydronium ions and produce hydrogen gas, which bubbles, e.g., 125, upward within the electrolyzer's cathodic chamber 126. Similarly, when energized with electrical power produced by the embodiment's generator (not shown) and altered by the embodiment's power electronics (not shown), the complementary pair of anodic electrodes oxidize chloride ions and produce chlorine gas, which bubbles, e.g., 145, upward within the electrolyzer's anodic chamber 147.

When the electrolyzer's cathodic, e.g., 124, and anodic, e.g., 122, electrodes are sufficiently and properly energized, they give rise to bubbles of hydrogen gas, e.g., 125, and chlorine gas, e.g., 145, respectively, which bubbles tend to move in an upward direction eventually passing out of the seawater 126 and 147 surrounding the electrolyzer electrodes and through a surface 127 of that water within the electrolyzer 112, thereafter tending to accumulate and mix as and/or within a pocket of gas 128 within an upper portion 129 of the electrolyzer chamber 112.

The mixture of hydrogen and chlorine gases within the pocket of gas 128 tends to flow 130 up, into, and through a gas tube 115, a proximal end of which is fluidly connected to an interior of the electrolysis chamber 112 by a hose coupling 131. The hydrogen and chlorine gases that flow into the gas tube flow through that gas tube to the combustion chamber (114 in FIG. 1).

The conversion of hydronium and chlorine ions into corresponding hydrogen and chlorine gases tends to deplete the concentration of chloride ions within the seawater 147 surrounding the anodic electrodes, e.g., 122, and tends to increase the concentration of hydroxide ions within the seawater 126 surrounding the cathodic electrodes, e.g., 124, and/or tends to increase the ratio of conservative positive ions (e.g. $Ca^{2+}$) to conservative negative ions (e.g. Cl−) within said seawater, increasing the total alkalinity of said seawater. However, as a result of the up and down motions induced in the embodiment (100 in FIG. 1) by passing waves at the surface (103 in FIG. 1) of the body of seawater on which the embodiment floats, seawater tends to flow 113 in and out of both sides 126 and 147 of the electrolysis chamber through a mouth 132 and/or aperture at a lower end of the electrolysis chamber 112, thereby tending to the refresh the seawater 126 and 147 on each side of the electrolysis chamber, and to maintain relatively stable concentrations of chloride ions adjacent to the respective electrolysis electrodes 122 and 124.

Figure 3:
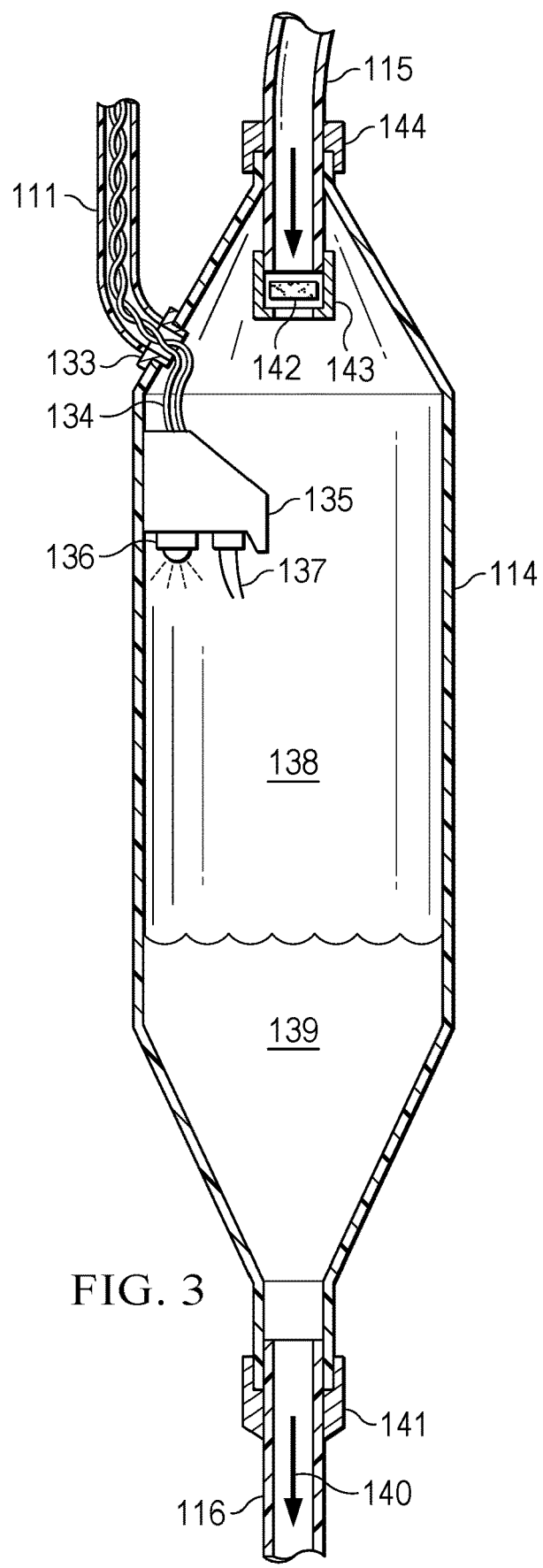
FIG. 3 is a side sectional view of a second component of the first embodiment.

FIG. 3 shows a side sectional view of the combustion chamber 114 of the first embodiment 100. Electrical cable 111 brings and/or transmits electricity from the embodiment's generator (not shown). The electrical cable passes through a wall of the combustion chamber through a bulkhead connector 133.

Electrical power-carrying wires 134 provide energy to an ignition control circuit 135. After receiving a signal from the embodiment's power electronics (not shown) through electrical wires 134 indicating that the amount of energy produced by the generator, and therefore consumed by the electrolyzer electrodes during their production of hydrogen and chlorine gases, has reached and/or exceeded a threshold amount, the ignition control circuit illuminates a light source 136, e.g., a source of ultraviolet light, creates an electrical spark across the electrodes of an electrical spark generator 137, or both, thereby tending to ignite the mixture of hydrogen and chlorine gases contained within an upper part 138 of its interior. The ignition of the mixture of hydrogen and chlorine gases tends to result in a production of hydrogen chloride gas within the combustion chamber. And the hydrogen chloride so produced tends to combine with, and/or dissolve into, water in a reservoir 139 in a lower part of the interior of the combustion chamber to form an acidified pool and/or solution 139 of hydrochloric acid.

Hydrochloric acid accumulated and trapped within acidified pool 139 tends to flow 140 downward into and through the acid discharge hose 116 a proximal end of which is fluidly connected to a lower end of the combustion chamber 114 by a discharge hose connector 141.

A flashback arrestor 142, which is attached and/or connected to an end of the gas tube 115 by an arrestor connector 143, tends to prevent a combustion of hydrogen and chlorine gases within an interior 138 of the combustion chamber from extending throughout the gas tube, and from similarly combusting hydrogen and chlorine gases still within the gas tube, with such an unwanted combustion potentially propagating all the way back to an interior of the electrolysis chamber (112 in FIG. 1). The gas tube is attached and/or connected to the combustion chamber 114 by a gas hose connector 144.

Figure 4:
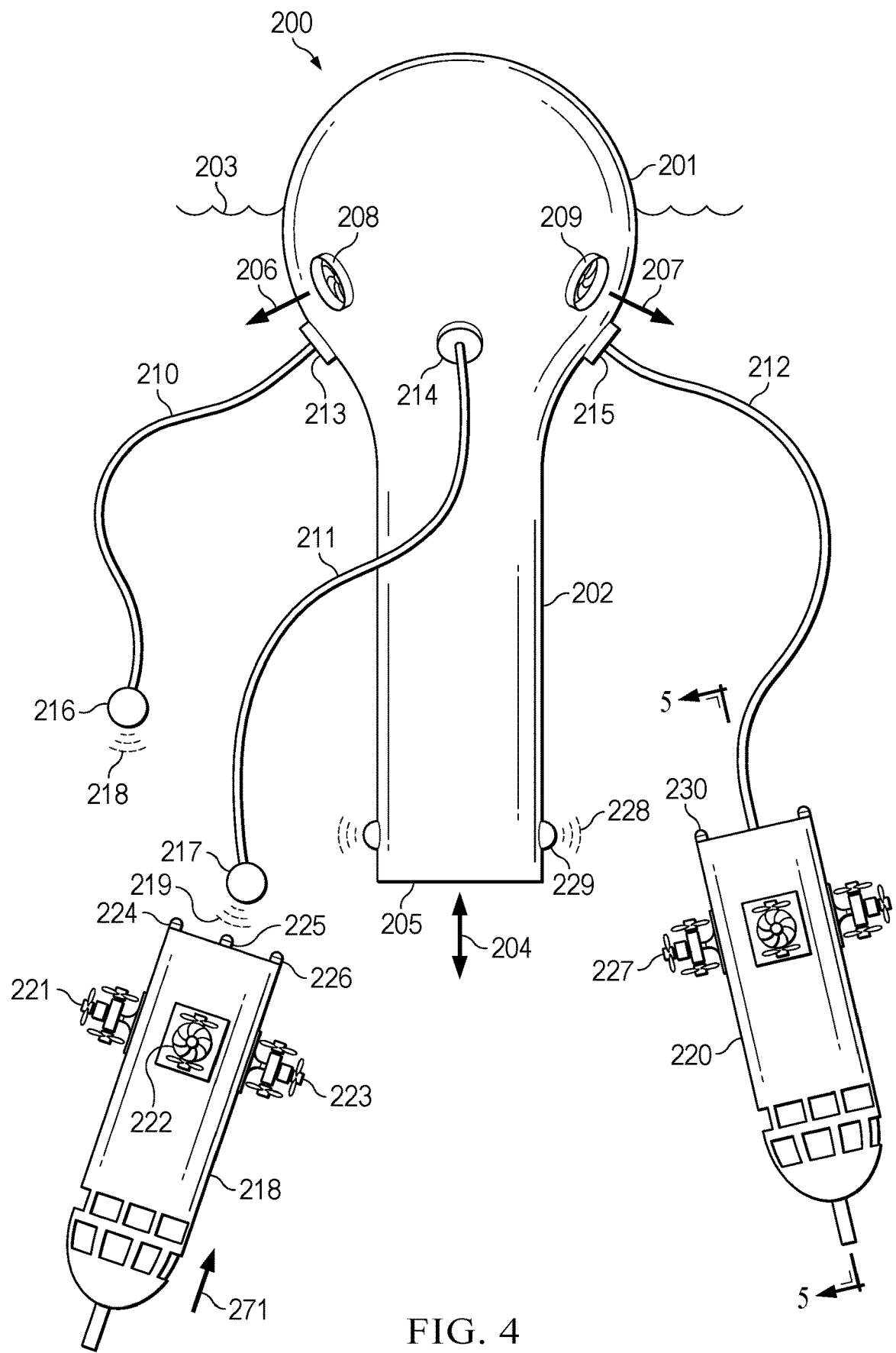
FIG. 4 is a side view of a first configuration of a second embodiment of the present invention.

FIG. 4 shows a side view of a second embodiment 200 of the present invention. A WEC 201/202, similar to the embodiment 100 illustrated in FIG. 1, and consistent with the hydrodynamic wave engine specified and disclosed in U.S. patent Ser. No. 16/789,205, floats adjacent to an upper surface 203 of a body of water over which waves pass. As the WEC 201/202 moves up and down in response to wave motion, water within the WEC's reaction tube 202 moves up and down within the reaction tube, and water flows 204 in and out of the reaction tube through a mouth 205 and/or aperture at a lower end of the reaction tube. Occasionally, water moving upward within the reaction tube interacts with a constriction in an upper portion of that reaction tube, which tends to cause an increase in the pressure within a portion of the water within the reaction tube's constriction. This periodic increase in water pressure within the constricted portion of the WEC's reaction tube tends to be associated with periodic ejections of pressurized water up to and into a pressurized interior of the WEC's upper hollow spherical portion 201 and/or buoy which tends to result in an accumulation and/or reservoir of pressurized water therein.

Pressurized water (not shown) within the interior of the WEC's 201/202 upper hollow spherical portion 201 tends to flow 206 and 207 out of the WEC's four water turbines, two 208 and 209 of which are visible in the illustration of FIG. 4. Electrical power produced by the embodiment's water turbines, and respective operatively connected generators (not shown), may be transmitted to any and/or all of four electrical power tethers. Three 210-212 of the embodiment's four electrical power tethers are visible in the illustration shown in FIG. 4. Each electrical power tether passes through the WEC's hull 201 thereby transitioning from the WEC's interior to the body of water 203 through respective bulkhead connectors, e.g., 213-215. At a distal end of each electrical power tether is an electrical power transmission node, e.g., 216 and 217. Each electrical power transmission node that is not electrically connected to an electrical power consuming mechanism, e.g., 220, emits a distinctive acoustic signal and/or "ping," e.g., 218 and 219, each emission of which facilitates the homing, and electrical connection thereto, of a self-propelled autonomous vessel, e.g., 218. The electrical power transmission nodes 216 and 217 are emitting respective acoustic signals, and/or pings, 218 and 219.

The embodiment 200 illustrated in FIG. 4 comprises, includes, incorporates, and/or utilizes, not only the electrical power producing WEC 201/202, it also comprises, includes, incorporates, and/or utilizes, a plurality, e.g., four, of autonomous hydrochloric acid producing and sequestration shuttles, e.g., 218 and 220. Autonomous hydrochloric acid producing and sequestration shuttle 218 is using its four thruster assemblies, three 221-223 of which are visible in the illustration of FIG. 4, in conjunction with its acoustic homing microphone array, e.g., 224-226, in order to locate the relative position of one 217 of the WEC's pinging 219 electrical power transmission nodes, and move toward that available, i.e., presently unconnected, electrical power transmission node 217.

The acoustic homing microphone array of the autonomous hydrochloric acid producing and sequestration shuttle 218 is comprised of four microphones, three 224-226 of which are visible in the illustration in FIG. 4, as well as an acoustic analysis control circuit (not shown). The acoustic analysis control circuit analyzes the relative latencies between the acoustic detection of each ping 219 by each respective microphone in the acoustic homing microphone array. Based, at least in part, on these relative acoustic signal detection latencies, the acoustic analysis control circuit makes alterations to the direction and magnitude of thrust(s) produced by each of the autonomous hydrochloric acid producing and sequestration shuttle's four thruster assemblies so as to move a forward end (i.e., the end at which the microphones are connected, attached, and/or mounted) of the autonomous hydrochloric acid producing and sequestration shuttle toward the respective electrical power transmission node 217 (thereby tending to reduce the relative latencies of the microphone-enabled acoustic signal detections to approximately zero).

An embodiment of the present disclosure utilizes electrical power transmission nodes, e.g., 217, each of which emits an acoustic signal, e.g., 219, of a unique frequency. Another embodiment of the present disclosure utilizes electrical power transmission nodes each of which emits acoustic signals of a unique acoustic pattern, e.g., each pattern comprised of a repeating mixture of relatively short "dots" and relatively long "dashes." And another embodiment of the present disclosure utilizes electrical power transmission nodes each of which emits acoustic signals at regular intervals but each of which offsets its acoustic signal by a phase offset, and/or interval, which temporally isolates its acoustic signal from the signals of its siblings and/or fellow embodiment-specific electrical power transmission nodes.

Autonomous hydrochloric acid producing and sequestration shuttle 220 is docked, attached, and/or electrically connected, to an electrical power transmission node (not visible) connected to the distal end of electrical power tether 212. It uses its thruster assemblies, e.g., 227, in conjunction with an accelerometer and an inertial position sensor (not shown), in order to maintain an upright orientation (i.e., oriented such that its acoustic homing microphone array is upward). The autonomous hydrochloric acid producing and sequestration shuttle also utilizes a strain and/or tension sensor to monitor the tension between the hydrochloric acid producing and sequestration shuttle and the electrical power transmission node to which it is connected. The hydrochloric acid producing and sequestration shuttle then uses its thruster assemblies so as to move toward the electrical power transmission node to which it is connected when the tension exceeds a threshold tension, and by moving and altering its relative position to the WEC 201/202, thereby reducing or eliminating such tension.

The autonomous hydrochloric acid producing and sequestration shuttle 220 uses its acoustic homing microphone array, e.g., microphone 230, to determine a baseline relative volume of each WEC 201/202 reaction tube acoustic signal, e.g., 228, emitted by each of the WEC's respective acoustic pingers, e.g., 229, at the time that the autonomous hydrochloric acid producing and sequestration shuttle connects to a respective electrical power transmission node. Afterwards, if the relative volume of any of those reaction tube acoustic signals becomes louder than when the autonomous hydrochloric acid producing and sequestration shuttle connected to the electrical power transmission node, the autonomous hydrochloric acid producing and sequestration shuttle will use its thruster assemblies, e.g., 227, to move away from the source of the reaction tube acoustic signal, i.e., to move away from the WEC's reaction tube 202, thereby reducing the risk of a collision between the autonomous hydrochloric acid producing and sequestration shuttle and the WEC. On the other hand, if the relative volume of any of those reaction tube acoustic signals becomes more muted, weaker, and/or softer than when the autonomous hydrochloric acid producing and sequestration shuttle connected to the electrical power transmission node, and/or if a tension between the autonomous hydrochloric acid producing and sequestration shuttle and the electrical power transmission node to which it is connected increases to and/or beyond a threshold tension level, then the autonomous hydrochloric acid producing and sequestration shuttle will use its thruster assemblies, e.g., 227, to move closer to the source of the reaction tube acoustic signal, i.e., to move closer to the WEC's reaction tube.

Figure 5:
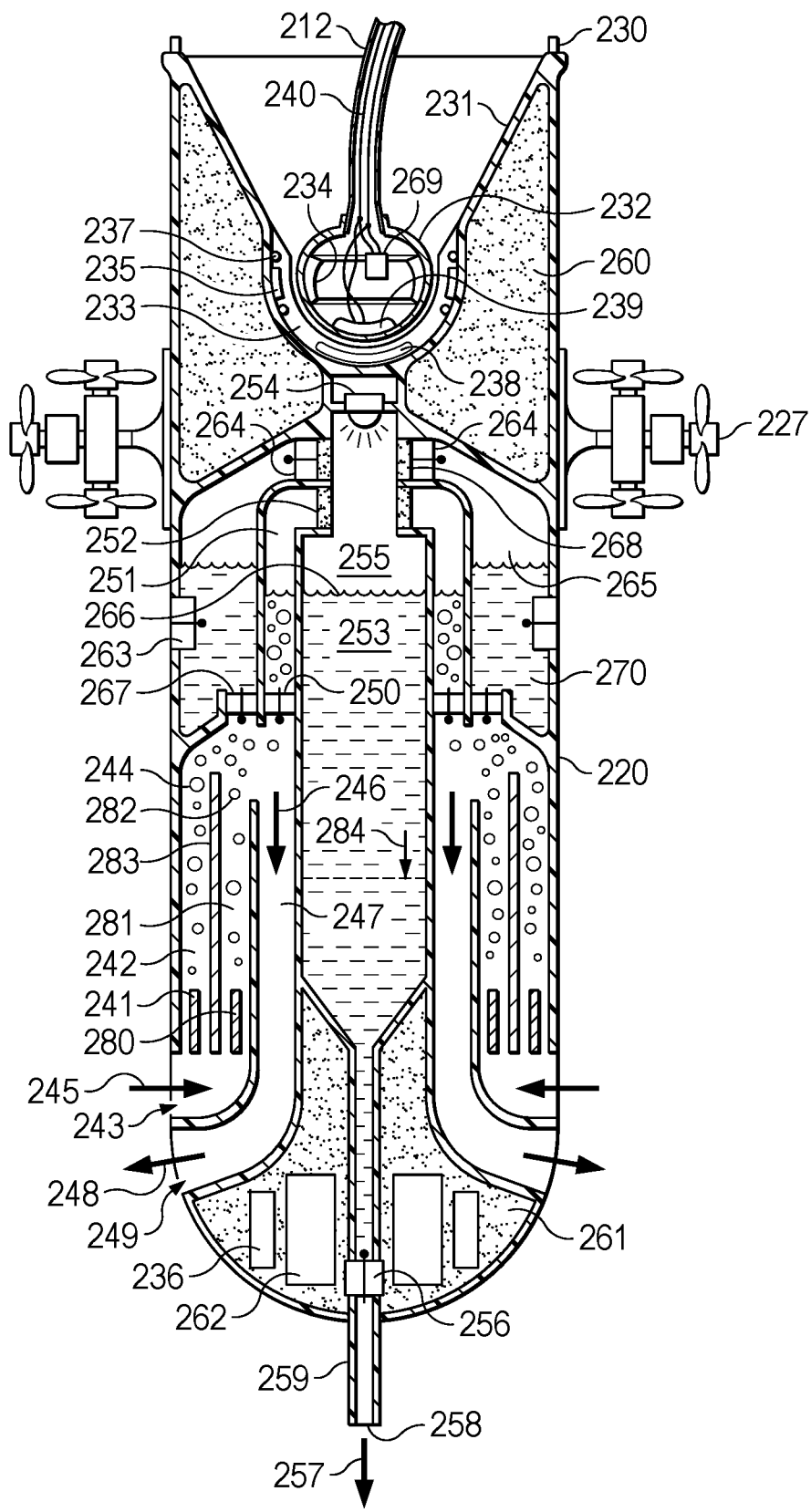
FIG. 5 is a side sectional view of an autonomous hydrochloric acid sequestration shuttle of the second embodiment.

FIG. 5 shows a side sectional view of an autonomous hydrochloric acid producing and sequestration shuttle 220

(i.e., the "shuttle" 220 in FIG. 4) of the second embodiment (200 in FIG. 4). The section plane is taken along section line 5-5 of FIG. 4.

The shuttle 220 has a frustoconical inclusion, recession, funnel, and/or scoop 231, into which an electrical power transmission node 232 (e.g., 217 in FIG. 4) can be captured by an "advancing" and/or "homing" (271 in FIG. 4) shuttle (i.e., a shuttle moving upwards with respect to the orientation of the illustration in FIG. 5) after the advancing shuttle "homes in" on the "pinging" sound emitted by the transmission node's internal pinger 269.

When an electrical power transmission node, e.g., 232, enters the shuttle's scoop 231, it comes to rest against a thin-walled magnetically-conductive node housing, "liner" and/or surface 233. An annular and/or equatorial ferrous ring 234 within the transmission node is attracted to a complementary annular and/or equatorial array of magnets 235 within the shuttle 220, and on an opposite side of the housing liner, which tends to stabilize the position and orientation of the electrical power transmission node against the housing liner 233 within the node housing.

The shuttle's 220 control system 236 is able to transmit signals to the respective WEC (201/202 in FIG. 4) through its energizing and deenergizing of a transformer coil of wire 238 the magnetic emanations of which create complementary patterns of energizing and deenergizing within a complementary, and operatively connected, transformer coil of wire 239 connected to electrical conductors and/or wires 240 inside the electrical power tether 212 that connects the electrical power transmission node 232 to the WEC and/or its control system (not shown).

Upon being notified by a signal from the shuttle 220, that the shuttle is electrically connected to the respective electrical power transmission node 232, the control system 236 of the WEC (201/202 in FIG. 4) enables the transmission of an alternating-current electrical power from the WEC, its power electronics (not shown), and/or its control system (not shown), into and/or through the electrical conductors of the respective electrical power tether 212 where they energize the transformer coil of wire 239 within the electrical power transmission node. In response to its energizing by the WEC, the transformer coil of wire 238 of the electrical power transmission node begins to emanate oscillating magnetic fields which interact with the shuttle's operatively-connected transformer coil of wire 238, thereby inducing an electrical power within that transformer coil of wires, and thereby energizing the shuttle.

A portion of the electrical power supplied to the transformer coil of wire 238 of the shuttle 220 by the WEC (201/202 in FIG. 4) through the transformer coil of wires 239 of its respective electrical power transmission node 232, is transmitted to, and consumed by, electrolyzer electrodes, e.g., by a negatively-charged cathode 241, positioned within an outer 242 annular electrolysis chamber, and by a positively-charged anode 280, positioned within an inner 281 annular electrolysis chamber. Both the inner and outer annular electrolysis chambers are fluidly connected to the body of water (203 in FIG. 4) in which the shuttle floats, moves, and/or hovers through a first upper series of annular apertures, e.g., 243. The inner and outer electrolysis chambers are separated by a semi-permeable and microporous diaphragm 283. By the time the seawater from each of the inner and outer annular electrolysis chambers mixes and/or combines, a portion of evolved chlorine has manifested as bubbles of gas.

The electrodes of the shuttle's electrolyzer give rise to bubbles. Bubbles, e.g., 244, of hydrogen evolve at, and/or rise from, the cathodic electrode, 241. Bubbles, e.g., 282, of chlorine evolve at, and/or rise from, the anodic electrode, 280. As these bubbles rise, they create a rising buoyancy-driven water current within the seawater within the inner and outer annular electrolysis chambers 242 and 281 in the manner of an airlift pump. The bubble-driven water current within the annular electrolysis chambers causes fresh seawater, from the body of water (203 in FIG. 4), to be drawn 245 into the annular electrolysis chambers through the first upper series of annular apertures, e.g., 243, and flow upward. And, the resulting inward and upward flow of seawater within the outer annular electrolysis chamber 242, causes any electrolysis-produced surplus of hydroxide ions in the seawater around the cathode to be diluted and removed from the shuttle before it can combine with any of the chlorine produced by the anodes. Likewise, the resulting inward and upward flow of seawater within the inner annular electrolysis chamber 281, causes any electrolysis-produced deficit of chloride ions to be corrected and replaced via the inflow of fresh seawater.

The bubble-driven water current within the annular electrolysis chambers causes the seawater within the shuttle to flow vertically up and out of the annular electrolysis chambers, and then horizontally around and/or over a bend in the annular electrolysis tank 247 and to then and/or therein flow 246 downward through an inner extension 247 of the consolidated annular electrolysis tank, and to thereafter flow 248 out of the annular electrolysis tank, thereby flowing back into the body of water from whence it came through a second lower series of annular apertures, e.g., 249, in the annular electrolysis tank.

When an intake valve, e.g., 250, is open, hydrogen and chlorine gas produced by the electrolyzer electrodes 241 and 280 will flow into an annular intake duct 251, and therethrough flow through an annular ring of flashback arrestors, e.g., 252, (which inhibit the passage of an ignition event), and into an upper portion of a central ignition chamber 255. When initiated by the shuttle's control system 236, an ignition light source 254, e.g., an ultraviolet light source, is energized. The light produced and/or emitted by the ignition light source is of a frequency and/or wavelength sufficient to ignite the mixture of hydrogen and chlorine gases accumulated within an upper portion of the shuttle's 200 ignition chamber 255, thereby igniting those gases after which the resulting hydrogen chloride gas will enter a reservoir 253, positioned within a lower portion of that ignition chamber, thereby forming and/or increasing, the acidity of that reservoir, through an addition of hydrochloric acid.

When the shuttle's control system 236 initiates a detachment of the shuttle from the WEC's electrical power transmission node 232 and determines to increase the depth of the shuttle, it first energizes a set of looped-wire electromagnets, e.g., 237, which counter the magnetic polarity of each respective magnet, e.g., 235, positioned within each respective looped-wire electromagnet, thereby producing a magnet polarity opposite that of the respective magnet, and thereby neutralizing the effective magnetic attraction of each respective magnet with its complementary and proximate portion of the electrical power transmission node's annular and/or equatorial ferrous ring 234, thereby releasing the respective electrical power transmission node, e.g., 232, from its magnetic attachment to the shuttle.

After separating from the electrical power transmission node 232 and descending to a greater depth (e.g., as determined by a pressure sensor, not shown), and a depth sufficient to neutralize and/or sequester the reservoir of hydrochloric acid solution for a long period of time, e.g., millennia, the shuttle's control system 236 opens discharge valve 256. The annularly-arrayed intake valves, e.g., 250, should still be open after the shuttle's descent. However, if they are closed, then the shuttle's control system opens one or more of them thereby enabling seawater within the annular electrolysis tank 242/281/247 to flow into the central ignition chamber 253/255. As a result of it having a greater density than seawater, and as a result of its hydroscopic character, the volume, pool, and/or reservoir 253, of hydrochloric acid within the shuttle's central ignition chamber 253/255 flows 257 down and out of the shuttle through an aperture 258 at a lower and/or distal end of an acid discharge tube 259.

The shuttle 220 comprises, includes, incorporates, and/or utilizes, foam-filled voids and/or chambers, e.g., 260 and 261, which provide buoyancy to offset the mass of the shuttle. The shuttle also comprises, includes, incorporates, and/or utilizes, batteries, e.g., 262, which it recharges when electrically connected to, and/or drawing electrical power from, the WEC (201/202 in FIG. 4) via one of the WEC's electrical power transmission nodes, e.g., 232.

After discharging its reservoir 253 of hydrochloric acid, and replacing that reservoir with seawater from the body of seawater (203 in FIG. 4), the shuttle's control system 236 opens an annularly-arrayed upper, e.g., 264, and lower, e.g., 263, ballast valves, which allow any gas trapped within the annular ballast chamber 265 to be evacuated into the central ignition chamber 255, after which the control system energizes the ignition light source 254 thereby igniting any such gas evacuated and/or purged from the annular ballast chamber, which converts that gas to additional hydrochloric acid thereby removing the gas, and eliminating the additional buoyancy of the gas. The buoyancy provided by the shuttle's foam-filled voids and/or chambers, e.g., 260 and 261, is sufficient to offset the mass of the shuttle and provide it with a neutral or positive buoyancy sufficient to permit the shuttle to rise and/or to control its position and orientation, through a use of its thruster assemblies, e.g., 227.

After discharging its reservoir 253 of hydrochloric acid, the shuttle 220 travels back toward the surface (203 in FIG. 4) of the body of water on which the WEC (201/202 in FIG. 4) floats, while guiding its ascent so as to locate, and physically and electrically connect with, another (or the same) electrical power transmission node, e.g., 232, after which it will produce more hydrogen and chlorine gases, ignite them, and thereby convert another reservoir of seawater to one of a hydrochloric acid solution.

When the shuttle 220 connects to an electrical power transmission node, e.g., 232, after its ascent from a deepwater discharge of hydrochloric acid solution, its control system 236 will leave open discharge valve 256, and one or more of the annularly-arrayed intake valves, e.g., 250, thereby fluidly connecting the central ignition chamber 253 to the body of water (203 in FIG. 4) outside the shuttle. It will then produce enough hydrogen and chlorine gas 255 to lower an upper surface 266 of the seawater within the central ignition chamber down to a threshold initial reservoir level 284. When the reservoir is initialized with seawater up to, and/or at, level 284, then when it has been filled through the additional of hydrochloric acid, its final acid concentration will be approximately 36% by weight (i.e., wt %). At level 284, the water within the free surface between the gas and the seawater will be positioned above the upper ends, and/or tops, of the electrolyzer electrodes 241 and 280. After driving the level of seawater within the central ignition chamber down to level 284, the shuttle's control system closes the discharge valve 256 thereby preventing the escape of any additional seawater from the ignition chamber and thereby trapping the reservoir of seawater, and the ensuing acidified reservoir of hydrochloric acid solution, that the shuttle will produce.

The central ignition chamber 255/253 is fabricated and/or lined with an acid-resistant material, coating, and/or substance. The material, coating, and/or substance, of which the central ignition chamber is fabricated and/or comprised is thermally conductive so that heat created by, and/or resulting from, the repeated combustions of hydrogen and chlorine gases, as well as the subsequent heats of dissolution of the hydrogen chloride gases into solution, may be conducted, transmitted, and/or transferred, to the seawater flowing through the annular electrolysis tank 247, thus carrying that thermal energy into the body of water (203 in FIG. 4) outside the shuttle.

Other shuttle embodiments similar to the embodiment illustrated in FIGS. 4 and 5 will initialize their respective water reservoirs so as to produce filled acidic reservoirs of other acid concentrations, e.g., of 24 wt %, 30 wt %, and 38 wt %.

As the shuttle produces and accumulates hydrochloric acid within its ignition-chamber reservoir 253, the density of the increasingly acidic reservoir 253 of hydrochloric acid solution exceeds that of the original reservoir of unadulterated seawater by an increasing degree. And, the increasing density and as the density and weight of its reservoir of hydrochloric acid solution increases to ever greater degrees, so too the density and weight of the shuttle increases to ever greater degrees. If uncorrected, a shuttle's increasingly negative density could require an increasingly great expenditure of electrical power by its thruster assemblies, e.g., 227, in order to maintain its relative position with respect to a respective WEC (201/202 in FIG. 4) and with respect to a respective electrical power transmission node, e.g., 232.

In order to moderate the destabilizing effects of an increasingly dense and heavy reservoir 253 of hydrochloric acid solution on the buoyancy of the shuttle, the shuttle's control system 236 will occasionally, and/or as needed in response to an increase in required thruster activity, initiate a "deballasting operation."

At the initiation of, and during, a deballasting operation, the shuttle's control system 236 will ensure that, and/or cause, the shuttle's 220 ignition light source 254 to remain unenergized and/or "dark", thereby preventing an ignition of hydrogen and chlorine gases produced by the shuttle's electrolyzer electrodes 241 and 281, and of the hydrogen and chlorine gases accumulated within the central ignition chamber 255.

At the initiation of, and during, a deballasting operation, the shuttle's control system 236 will also open the intake valves, e.g., 250, and/or ensure that those valves are and remain open, thereby permitting bubbles, e.g., 244 and 282, of hydrogen and chlorine gases, to flow from the annular electrolysis chambers 242 and 281 into the annular intake duct 251.

At the initiation of, and during, a deballasting operation, the shuttle's control system 236 will also open the annularly-arrayed upper ballast valves, e.g., 264, which fluidly connect the annular ballast chamber 265 to the central ignition chamber 255, and/or ensure that those valves are and remain open, thereby permitting hydrogen and chlorine gases within the central ignition chamber to flow from the central ignition chamber and into the annular ballast chamber 265.

At the initiation of, and during, a deballasting operation, the shuttle's control system 236 will also close the annularly-arrayed lower ballast valves, e.g., 263, connecting the annular ballast chamber 265 to the body of water (203 in FIG. 4) outside the shuttle 220, and/or ensure that those valves are and remain closed, thereby preventing hydrogen and chlorine gases within the annular ballast chamber 265 to flow out of that annular ballast chamber and into the body of water.

At the initiation of, and during, a deballasting operation, the shuttle's control system 236 will also open the annularly-arrayed deballasting valves, e.g., 267, and/or ensure that those valves are and remain open, thereby permitting seawater 270 within the annular ballast chamber 265 to flow from the annular ballast chamber and down and into the annular electrolysis tank 242/281/247 as gas is added to the annular ballast chamber (while also permitting bubbles, e.g., 244 and 282, of hydrogen and chlorine gases produced by the electrolyzer electrodes 241 and 280 to flow directly from the annular electrolysis chambers 242 and 281 into the annular ballast chamber).

When the control system 236 determines that the hydrogen and chlorine gases accumulated within the annular ballast chamber 265 are sufficient to adequately equilibrate the shuttle's 220 buoyancy, and to thereby re-establish a sufficiently neutral shuttle buoyancy, then the shuttle's control system will close the annularly-arrayed ballast valves, e.g., 264, connecting the annular ballast chamber 265 to the central ignition chamber 255; and close the annularly-arrayed deballasting valves, e.g., 267, thereby preventing a further inflow of hydrogen and chlorine gas bubbles, e.g., 244 and 282, from, and a further outflow of seawater 270 to, the annular electrolysis tank 247.

Any inadvertent ignition of the gas 255 within the central ignition chamber during a deballasting operation, i.e., while any one of the annularly-arrayed ballast valves, e.g., 264, is open, and hydrogen and chlorine gases are present within the annular ballast chamber 265, might damage that annular ballast chamber (and/or require the cost and/or expenditure of additional monies over-building its walls to withstand such a blast). To prevent an inadvertent ignition of hydrogen and chlorine gases within the annular ballast chamber, e.g., during a deballasting operation, each of the annularly-arrayed ballast valves is provided, outfitted, and/or equipped, with a flashback arrestor, e.g., 268, to prevent any ignition of gases 255 within the central ignition chamber from propagating into, and igniting, gases within the annular ballast chamber.

At the moment that a shuttle 220 discharges its reservoir 253 of hydrochloric acid solution, its annular ballast chamber 265 will nominally contain enough gas to at least partially offset the added weight and density of the discharged hydrochloric acid. And, at the time of discharge, especially given the absence of fluid communication with the body of water (203 in FIG. 4) outside the shuttle, and the head pressure thereof, the annular ballast chamber will typically contain its maximum amount of gas and provide its maximal amount of positive buoyancy.

At the moment of hydrochloric-acid discharge, or soon thereafter, the shuttle's control system 236 initiates a "re-ballasting operation" in which it opens the annularly-arrayed upper, e.g., 264, and lower, e.g., 263, ballast valves, as well as the annularly-arrayed deballasting valves, e.g., 267, thereby allowing seawater to flow from the water outside the shuttle and into the annular ballast chamber 265, thereby causing any hydrogen and chlorine gases trapped within the annular ballast chamber to flow, and/or to be evacuated, into the central ignition chamber 255. While forcing gases within the annular ballast chamber to flow into the central ignition chamber, and while gases within the annular intake duct 251 remain free to passively flow into the central ignition chamber, the shuttle's control system 236 energizes the ignition light source 254 thereby igniting hydrogen and chlorine gases present within the central ignition chamber, as well as those gases which flow into it from the annular ballast chamber and the annular intake duct, thereby eliminating most, if not all, of those gases, and eliminating their buoyancy.

The re-ballasting operation tends to remove all significant amounts of hydrogen and chlorine gases from the shuttle thereby restoring its nominal, e.g., "non-acidified," neutral, and/or positive buoyancy prior to, and/or during, its ascent. Another embodiment similar to the one illustrated in FIGS. 4 and 5 preserves all, or a portion, of the gases within its annular ballast chamber 265 after a discharge of its hydrochloric acid in order to speed its ascent, for a part and/or for all of its ascent.

Likewise, another shuttle embodiment, similar to the one illustrated in FIGS. 4 and 5, performs a re-ballasting operation prior to, and/or during, its descent, i.e., while its buoyancy is offset, and made maximally negative, by the added weight of its load of hydrochloric acid, thereby removing the buoyancy neutralizing and/or buoyancy restoring effect of its gas-filled, and positively buoyant, annular ballast chamber, thereby speeding its descent, for part and/or for all of its descent.

Figure 6:
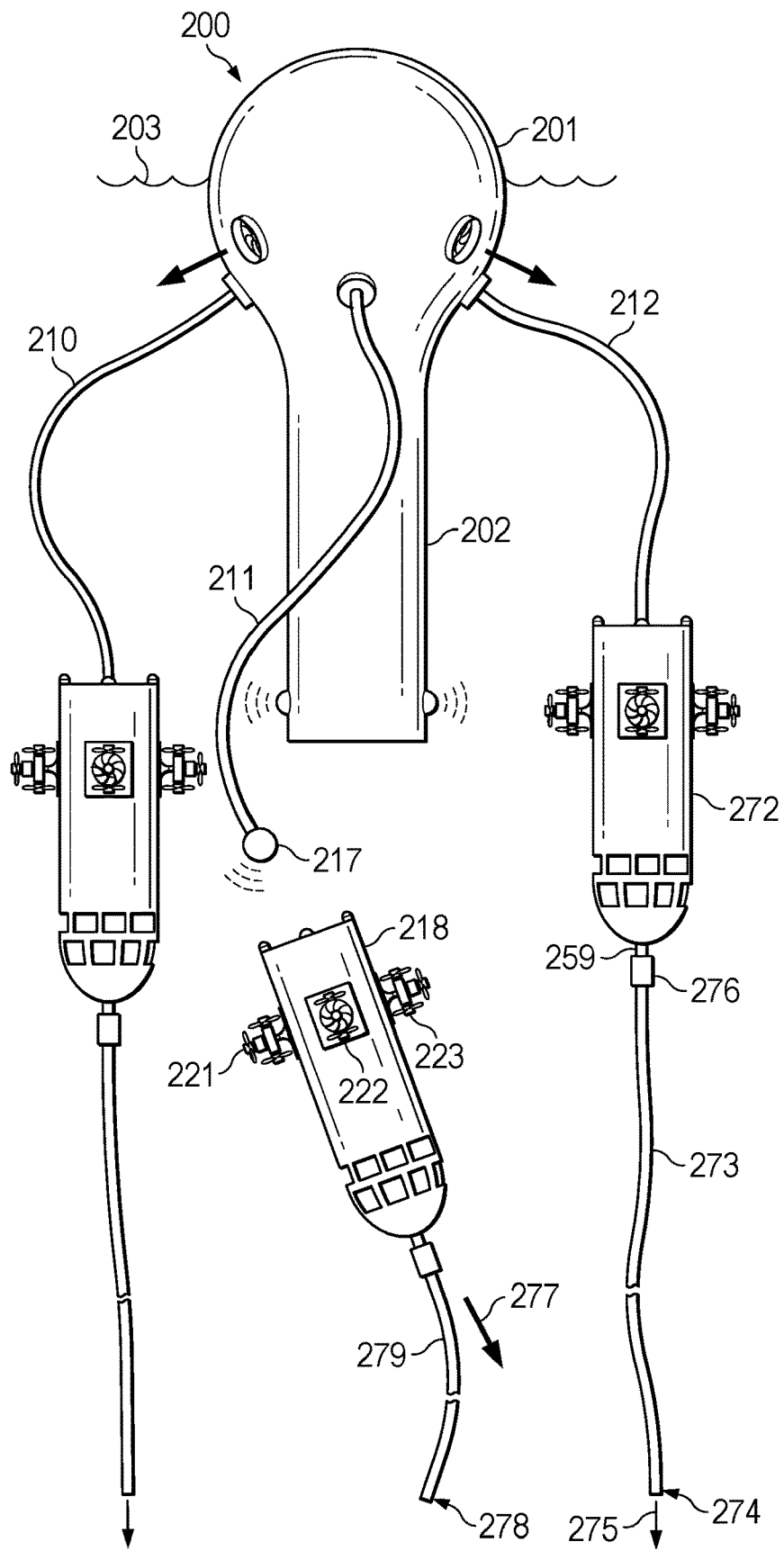
FIG. 6 is a side view of a second configuration of the second embodiment of the present invention.

FIG. 6 shows a perspective side view of a hydrochloric-acid producing and sequestration embodiment 200 similar, if not identical, to the one that is illustrated in FIGS. 4 and 5. However, unlike the embodiment of FIGS. 4 and 5, the embodiment illustrated in FIG. 6 is configured and/or adapted to maintain relatively longer-term electrical connections to its respective shuttles, e.g., 272, and its respective shuttles are adapted and/or configured to periodically discharge to depth their reservoirs of hydrochloric acid solution through permanently attached and/or fluidly connected flexible acid-resistant acid discharge hoses, e.g., 273, instead of by disconnecting the shuttles and moving those shuttles to depth so as to directly discharge their hydrochloric acid solutions into deep alkaline water.

The shuttles of both the first configuration, illustrated in FIGS. 4 and 5, and the second configuration, illustrated in FIG. 6, utilize the energy provided to them by a respective WEC 201/202 to electrolyze seawater, and to thereby produce hydrochloric acid, which they then store within respective internal hydrochloric acid reservoirs (253 of FIG. 5).

The shuttles (e.g., 220 of FIG. 4) of the first configuration, illustrated in FIGS. 4 and 5, disconnect from their respective electrical power transmission nodes (e.g., 217 of FIG. 4), when their respective reservoirs (253 of FIG. 5) of hydrochloric acid solution are sufficiently full, and/or their acidity is within a preferred range of pH, and they then descend to a depth no less than a depth required to sequester and/or neutralize their payloads of hydrochloric acid solution following discharge. After they arrive at a sufficiently great depth, the shuttles of the first configuration, illustrated in FIGS. 4 and 5 discharge their respective reservoirs of hydrochloric acid solution into the ambient seawater (thereby sequestering and neutralizing the acidity of the discharged hydrochloric acid solution) and they then return to a lesser depth and reconnect to an available electrical power transmission node (e.g., 217 of FIG. 4) of the same or another WEC 201/202 to begin another hydrochloric-acid production and sequestration cycle.

By contrast, the shuttles, e.g., 272, of the second configuration, illustrated in FIG. 6, remain operatively and electrically connected to respective electrical power transmission nodes, e.g., 217, of a respective WEC 201/202, for a relatively long period of time, i.e., they do not disconnect from their respective electrical power transmission node, in order to discharge a filled and/or full reservoir of hydrochloric acid solution to a sufficiently great depth. When a shuttle, e.g., 272, of the second configuration, illustrated in FIG. 6, fills its reservoir (253 of FIG. 5) with hydrochloric acid solution, and/or when that reservoir of hydrochloric acid solution has reached a pH within a range of desirable pH, instead of disconnecting from its respective electrical power transmission node, e.g., 217, descending to depth, and there discharging its acidic contents, it instead remains attached, and/or electrically connected, to its respective electrical power transmission node, and while connected to its respective electrical power transmission node, the shuttle discharges its reservoir of hydrochloric acid solution into an acid discharge hose, e.g., 273. The distal end, e.g., 274, of which is positioned at a significant and sufficient depth, e.g., a depth of approximately 2 kilometers, thereby causing the hydrochloric acid solution discharged, e.g., 275, from an aperture and/or mouth, e.g., 274, at the distal and/or lower end of an acid discharge hose to be sequestered, and/or neutralized, in those nominally alkaline deep-sea waters.

An acid discharge hose, e.g., 273, is attached, fluidly connected, and/or operatively connected, to a shuttle's discharge tube (259 in FIG. 5) by an acid discharge hose connector, e.g., 276.

The pattern of operations characteristic of a shuttle, e.g., 272, of the second configuration, illustrated in FIG. 6, is similar to that of a shuttle, e.g., 220 of FIG. 4, of the first configuration, with the exception that a shuttle of the second configuration does not detach from its respective WEC 201/202, and transit to a significant depth, in order to discharge its reservoir of hydrochloric acid solution.

Instead, a shuttle, e.g., 272, of the second configuration remains at a relatively shallow depth, and remains electrically connected to a respective electrical power transmission node, e.g., 217, and therefrom discharges its respective filled reservoirs of hydrochloric acid solution. The hydrochloric acid solutions discharged by a shuttle of the second configuration flow into, through, and out from, e.g., 275, an end, e.g., 274, of an acid discharge hose, e.g., 273, thereby obviating the need for the shuttle to descend so as to directly discharge its reservoirs of hydrochloric acid solution at the same or similar depth from which the reservoir of hydrochloric acid solution will be discharged upon its outflow from the lower end of a respective acid discharge hose.

When a shuttle, e.g., 272, of the second configuration, illustrated in FIG. 6, during its execution of an "acidification operation" has filled its reservoir of hydrochloric acid solution to a sufficient degree, and/or lowered the pH of that reservoir to a sufficient acidity level, then it initiates a "hose discharge operation."

In preparation for a hose discharge operation, the shuttle's control system 236 opens its discharge valve (256 in FIG. 5), thereby permitting hydrochloric acid solution within its hydrochloric acid reservoir (253 of FIG. 5) to flow into and through the shuttle's discharge tube (259 in FIG. 5), and therethrough out of an aperture (258 in FIG. 5) at a lower and/or distal end of that discharge tube, and therethrough into and through the shuttle's acid discharge hose connector, e.g., 276, and therethrough into and through the shuttle's acid discharge hose 273, and therethrough out of 275 an aperture at the distal end, e.g., 274, of the acid discharge tube. Furthermore, during a hose discharge operation, the shuttle's control system leaves "dark" and unenergized the ignition light source (254 in FIG. 5) allowing hydrogen and chlorine gases produced by the shuttle's electrolyzer electrodes (e.g., 241 in FIG. 5) to accumulate within an upper portion of the shuttle's ignition chamber (255 in FIG. 5). In order to facilitate a migration of hydrogen and chlorine gases produced by the shuttle's electrolyzer electrodes into the shuttle's ignition chamber, the shuttle's control system opens, and/or keeps open, the shuttle's intake valves (e.g., 250 in FIG. 5).

As hydrogen and chlorine gases are produced by the shuttle's electrolyzer electrodes (241 and 280 in FIG. 5), and as they accumulate within the shuttle's ignition chamber (255 in FIG. 5), the hydrochloric acid solution within the shuttle's hydrochloric acid reservoir (253 of FIG. 5) is gradually displaced downward and caused to flow into and through the shuttle's acid discharge tube (259 in FIG. 5). As the hydrochloric acid reservoir empties into the acid discharge hose, and therethrough into the depths of the ocean below the shuttle, the buoyancy of the shuttle will steadily increase, requiring the shuttle to expend an increasingly great amount of energy (transmitted electrically from the respective WEC 201/202) powering its thrusters, e.g., 221-223, in order to maintain the shuttle's nominal position and orientation adjacent to its respective WEC.

As hydrogen and chlorine gases produced by the shuttle's electrolyzer electrodes (e.g., 241 in FIG. 5) accumulate within the shuttle's hydrochloric acid reservoir (255 of FIG. 5), and the hydrochloric acid solution therein is pushed downward, the opened intake valves (e.g., 250 in FIG. 5) permit the hydrogen and chlorine gases to accumulate to an equivalent depth, level, and/or height, within the shuttle's annular intake duct (251 in FIG. 5), and within the annular electrolysis tank 242/247.

An upper pressure sensor (not shown) in an upper portion of the interior of the shuttle's hydrochloric acid reservoir tank, and a complementary lower pressure sensor (not shown) in a lower portion of the interior of the shuttle's hydrochloric acid reservoir tank, provide pressure data that permits the shuttle's control system (236 in FIG. 5) to determine the position, level, height, and/or depth, of the free surface (266 in FIG. 5) of the hydrochloric acid solution within the shuttle's hydrochloric acid reservoir (253 of FIG. 5). When, during the execution of a hose discharge operation, the level of the free surface of the hydrochloric acid solution within the shuttle's hydrochloric acid reservoir has reached a threshold level that is below the level of the intake valves (e.g., 250 in FIG. 5), but above the top of an electrode (e.g., 241 in FIG. 5) within the shuttle's annular electrolysis tank, then the shuttle's control system halts the hose discharge operation, and initiates a "discharge dilution operation," in order to maintain a complete seawater immersion of the electrodes in the shuttle's annular electrolysis tank. This discharge dilution operation results in a temporary cessation of any further discharge of hydrochloric acid solution, and results in an addition of seawater to the interior of the central ignition chamber (255 in FIG. 5) which dilutes and/or diminishes the acidity of the remaining hydrochloric acid solution therein.

In preparation for a discharge dilution operation, the shuttle's control system (236 in FIG. 5) closes the discharge valve (256 in FIG. 5) thereby halting the further discharge of hydrochloric acid solution from the shuttle's hydrochloric acid reservoir (253 of FIG. 5). The shuttle's control system ensures that the annularly-arrayed deballasting valves (e.g., 267 in FIG. 5) are closed. The shuttle's control system closes the intake valves (e.g., 250 in FIG. 5), and opens the annularly-arrayed upper (e.g., 264 in FIG. 5), and lower (e.g., 263 in FIG. 5), ballast valves. The shuttle's control system then activates, and/or energizes, the ignition light source (254 in FIG. 5) in order to create a flash of ultraviolet light, thereby combusting the hydrogen and chlorine gases within the central ignition chamber (255 in FIG. 5), i.e., combusting the gases that the control system routed to, and accumulated within, the central ignition chamber (255 in FIG. 5) while pushing hydrochloric acid solution from the hydrochloric acid reservoir (253 in FIG. 5) and into the acid discharge hose, e.g., 273.

The hydrogen chloride gas resulting from the combustion of the hydrogen and chlorine gases within the central ignition chamber (255 in FIG. 5) makes contact with, and is absorbed and/or dissolved into, the hydrochloric acid solution remaining within the hydrochloric acid reservoir (253 in FIG. 5) and positioned in a lower portion of the central ignition chamber (255 in FIG. 5), the combustion of the hydrogen and chlorine gases within the central ignition chamber creates a partial vacuum therein. This partial vacuum draws into an upper portion of the central ignition chamber (255 in FIG. 5), first hydrogen and chlorine gases located within an upper portion of the annular ballast chamber (265 in FIG. 5), gases that were protected from combustion by the flashback arrestors (e.g., 268 in FIG. 5), and then seawater within that annular ballast chamber. As gases and seawater flow from the annular ballast chamber into the central ignition chamber, the annular ballast chamber becomes substantially, if not completely, filled with seawater, including seawater drawn into the annular ballast chamber through the shuttle's annularly-arrayed lower ballast valves (e.g., 263 in FIG. 5). This replacement of hydrogen and chlorine gases within the annular ballast chamber (265 in FIG. 5) with seawater helps to balance the buoyancy of the shuttle following the discharge of hydrochloric acid solution from its hydrochloric acid reservoir (253 in FIG. 5).

As (the relatively modest) volume of hydrogen and chlorine gases, and the virtually endless supply of seawater, are transferred from the annular ballast chamber (265 in FIG. 5) to the central ignition chamber (255 in FIG. 5), the free surface (266 in FIG. 5) of the hydrochloric acid solution within the shuttle's hydrochloric acid reservoir (253 of FIG. 5) tends to rise. When the data and/or sensor readings provided to the shuttle's control system (236 in FIG. 5) by the shuttle's upper (not shown) and lower (not shown) ignition-chamber pressure sensors indicate that the free surface of the hydrochloric acid reservoir has risen to a level near, but still below, the annular ring of flashback arrestors (e.g., 252 in FIG. 5), and/or the annularly-arrayed upper ballast valves (e.g., 264 in FIG. 5), that fluidly connect the central ignition chamber to the annular ballast chamber (265 in FIG. 5), then the shuttle's control system closes the annularly-arrayed upper (e.g., 264 in FIG. 5), and lower (e.g., 263 in FIG. 5), ballast valves; re-opens the intake valves (e.g., 250 in FIG. 5); and leaves "dark" and/or unenergized the ignition light source (254 in FIG. 5).

The hydrogen and chlorine gases accumulated within the annular electrolysis tank (242/281/247 in FIG. 5) during the initial phase of the hose discharge operation, and trapped therein while the intake valves (e.g., 250 in FIG. 5) were closed, are now released and flow upward into and through the annular intake duct (251 in FIG. 5), and therethrough into the central ignition chamber (255 in FIG. 5), thereby tending to pressurize the now-significantly-diluted hydrochloric acid solution within the shuttle's hydrochloric acid reservoir (253 of FIG. 5).

The shuttle's control system (236 in FIG. 5) reinitiates the hose discharge operation by reopening the discharge valve (256 in FIG. 5), thereby permitting the pressurized hydrochloric acid solution within the shuttle's hydrochloric acid reservoir (253 of FIG. 5) to again flow downward through the shuttle's discharge tube (259 in FIG. 5), and therefrom into and through the shuttle's acid discharge hose, e.g., 273. And, as the shuttle continues to produce hydrogen and chlorine gases, and as those gases continue to accumulate within the central ignition chamber (255 in FIG. 5), the diluted hydrochloric acid solution within the shuttle's hydrochloric acid reservoir (253 of FIG. 5) will be pushed down and out of the central ignition chamber.

When the shuttle's control system (236 in FIG. 5) again determines that the free surface (266 in FIG. 5) of the hydrochloric acid solution within the shuttle's hydrochloric acid reservoir (253 of FIG. 5) has again fallen to a level approaching that of the top of one of the electrodes (e.g., 241 and 280 in FIG. 5) within the annular electrolysis chambers (242 and 281 in FIG. 5), then the control system halts the hose discharge operation, and initiates and executes another discharge dilution operation.

When, during a hose discharge operation, the shuttle's control system (236 in FIG. 5) determines that no subsequent discharge dilution operation is required before initiating another acidification operation (e.g., because the hydrochloric acid solution is sufficiently dilute and/or of sufficiently neutral pH and/or acidity), it initiates and executes an "initialization operation." This operation is similar to a hose discharge operation, and, during an initialization operation, the shuttle pumps diluted hydrochloric acid solution from the shuttle's hydrochloric acid reservoir (253 of FIG. 5) as it would during any other hose discharge operation. However, during an initialization operation, the discharge of fluid from the shuttle's hydrochloric acid reservoir is halted when the free surface (266 in FIG. 5) of the fluid within the hydrochloric acid reservoir reaches the level (284 in FIG. 5) marking the height of the reservoir free surface appropriate to the start of an acidification operation.

In other words, instead of halting a hose discharge operation, and initiating a discharge dilution operation, when the shuttle's control system (236 in FIG. 5) determines that the free surface (266 in FIG. 5) of the hydrochloric acid solution within the shuttle's hydrochloric acid reservoir (253 of FIG. 5) has fallen to a first level approaching that of the top of one of the electrodes (e.g., 241 and 280 in FIG. 5), the control system instead halts the executing hose discharge operation, and initiates an initialization operation, when the shuttle's control system determines that the free surface of the (diluted) hydrochloric acid solution within the shuttle's hydrochloric acid reservoir (253 of FIG. 5) has fallen to a second level (284 in FIG. 5), wherein the second level denotes a nominal, desired, and/or threshold, level of the free surface of the (diluted) hydrochloric acid solution within the shuttle's hydrochloric acid reservoir suitable for the addition of an amount of hydrochloric acid required to acidify the fluid within the hydrochloric acid reservoir to the desired pH and/or acidity with the resulting properly acidified hydrochloric acid solution having a volume not in excess of the volume provided by the central ignition chamber (255 in FIG. 5).

The control system (236 in FIG. 5) halts the hose discharge operation when the free surface (266 in FIG. 5) of the hydrochloric acid solution within the shuttle's hydrochloric acid reservoir (253 of FIG. 5) has fallen to the second level (284 in FIG. 5) so that the increase in the volume of the fluid within the hydrochloric acid reservoir that will occur during its acidification, during an acidification operation, will bring the free surface of the fully acidified hydrochloric acid solution within the shuttle's hydrochloric acid reservoir (253 of FIG. 5) to a nominal, desired, and/or threshold, level, where it will be appropriate to initiate another hose discharge operation.

When the initialization operation has brought the level (266 of FIG. 5) of the fluid within the hydrochloric acid reservoir (253 of FIG. 5) to the second level (284 in FIG. 5), the shuttle's control system (236 in FIG. 5) closes the discharge valve and initiates and/or resumes an acidification operation.

The operation of shuttles, e.g., 272, of the second configuration, as illustrated in FIG. 6, are characterized by four operational modalities. When such a shuttle initiates and executes an acidification operation, it uses energy extracted from the motion of ocean waves to convert hydronium (H3O+) and chloride (Cl−) ions in seawater into hydrogen and chlorine gases. It then combusts those gases to convert them into hydrogen chloride gas which then dissolves into aqueous solution to form hydrochloric acid. When the resulting reservoir of hydrochloric acid solution in such a shuttle has reached a requisite volume and/or a requisite pH and/or acidity, the shuttle initiates and executes a hose discharge operation. And, when, during that hose discharge operation, a requisite and/or threshold volume of hydrochloric acid solution has been discharged (and before the electrodes (e.g., 241 and 280 in FIG. 5) are exposed to gas, and/or removed from their respective seawater baths) the shuttle initiates and executes a discharge dilution operation to restore the free surface (266 of FIG. 5) of the fluid within the hydrochloric acid reservoir (253 of FIG. 5) to a level greater than the first and/or second levels (i.e., level 284 in FIG. 5, that denotes, marks, and/or specifies, a fluid volume great enough to permit a continuation of a hose discharge operation or of an initialization operation). The shuttle may then conduct one or more, or none, additional hose-discharge and discharge-dilution pairs of operations. On what would otherwise be a last iteration of a hose discharge operation, the control system initiates and executes an initialization operation in which it halts the discharge of fluid from the shuttle's hydrochloric acid reservoir (253 of FIG. 5) so that the resulting level (284 of FIG. 5) of the free surface (266 in FIG. 5) of the fluid remaining in the hydrochloric acid reservoir is appropriate for the initiation and execution of another acidification operation.

Periodically, e.g., once every year, a shuttle, e.g., 218, of the second configuration, illustrated in FIG. 6, will initiate and execute a "hose replacement operation," which it will initiate by disconnecting from its respective electrical power transmission node, e.g., 217, and using its thrusters, e.g., 221-223, to move, e.g., 277, away from the respective WEC 201/202. When it disconnects from the WEC, its access to electrical power produced by the WEC will end and it will rely on its internal batteries (e.g., 262 in FIG. 5) to power its thrusters. During a hose replacement operation, the shuttle will stop producing hydrogen and chlorine gases by electrolysis of seawater. And, during a hose replacement operation there will be no active pumping of hydrochloric acid solution from the distal and/or lower end, e.g., 278, of its respective acid discharge hose, e.g., 279.

During a hose replacement operation, the shuttle will travel to a support vessel, a port facility, a sea platform, etc., wherefrom it can be fitted with a new acid discharge hose, e.g., 279, and whereat it can be examined, tested, repaired, and/or rebuilt, as needed. After which, the shuttle, e.g., 218, will travel to the same, or to a new, WEC 201/202 having an available, open, and/or unoccupied, electrical power transmission node, e.g., 217, and will there connect to that available electrical power transmission node and initiate an acidification operation.

Figure 7:
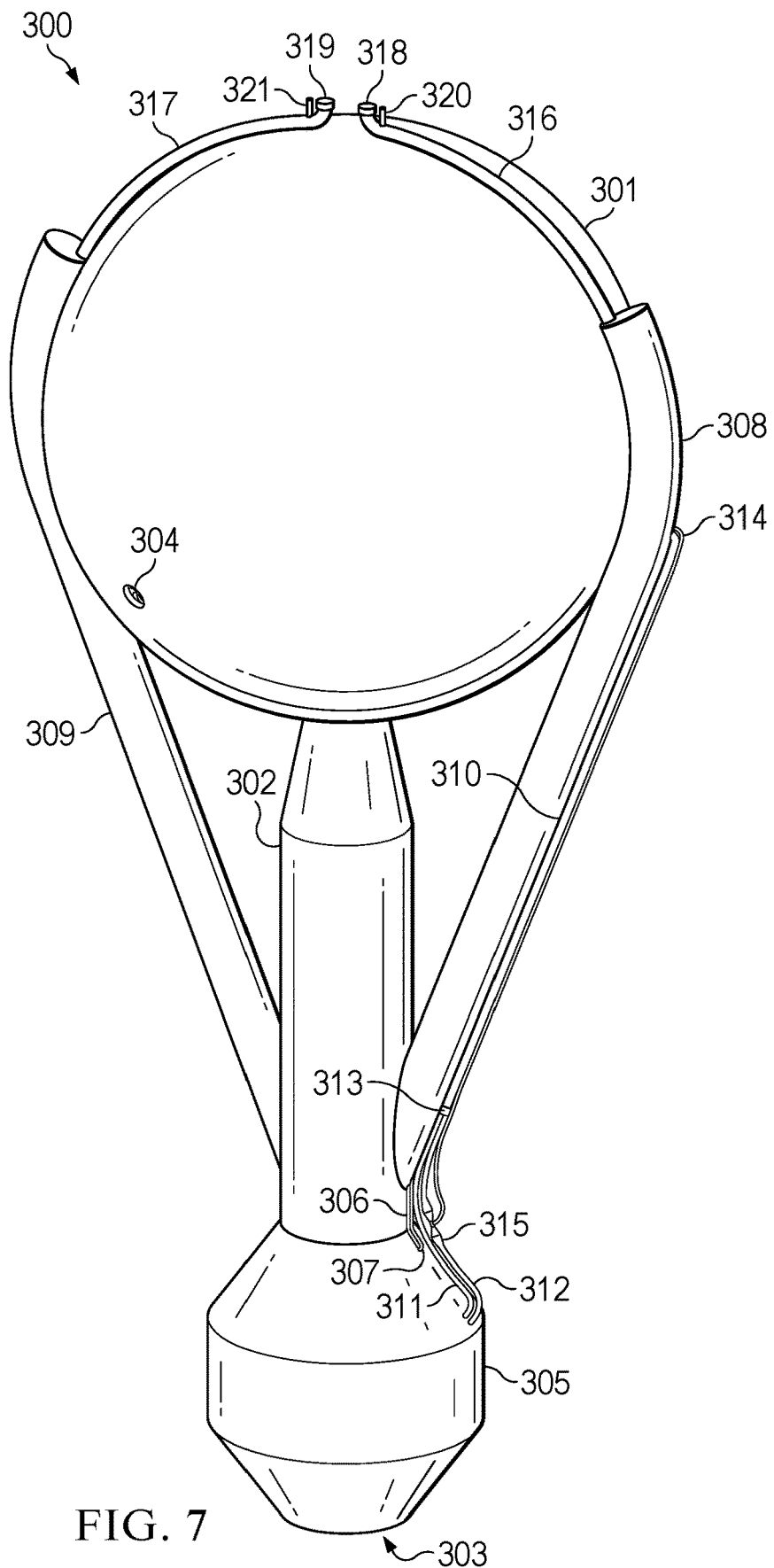
FIG. 7 is a side perspective view of a third embodiment of the present invention.

FIG. 7 shows a perspective side view of a third embodiment 300 of the present disclosure. The embodiment comprises, in part, a wave energy converter (WEC) 301/302 that is an embodiment of the type of inertial hydrodynamic wave engine disclosed in U.S. patent Ser. No. 16/789,205. The WEC produces electrical power in response to wave motion as explained in U.S. patent Ser. No. 16/789,205.

In summary, as the WEC floats at the surface of a body of water (not shown), and moves up and down in response to waves moving across the surface of that body of water, water within the WEC's hollow reaction tube 302 moves up and down within the reaction tube, and concomitantly water moves in and out of the tube via a mouth 303 or aperture at a lower end of the reaction tube. Periodically, water moving up within the reaction tube encounters and flows into and through a constriction therein, causing a resultant increase in fluid pressure and a subsequent ejection of pressurized water up and into a pressurized reservoir (not visible) within the WEC's pressurized upper hollow spherical buoy 301. Pressurized water from the WEC's reservoir flows out, and back into the body of water, through a pair of water turbines, e.g., 304, thereby causing a rotation of those water turbines. A pair of generators (not shown), each of which is operatively connected to a respective one of the pair of water turbines, produces electrical power in response to the rotations of the water turbines caused by the outflow of water therethrough.

An annular electrolysis chamber 305 attached to a lower portion of the embodiment's reaction tube 302 houses, incorporates, encloses, and/or includes, a seawater electrolyzer (not visible) which receives electrical power from the generators (not shown) operatively connected to respective water turbines. At a cathodic electrode, the seawater electrolyzer reduces hydronium ions (H3O+) to produce hydrogen gas ($H_2$). And, at an electrically connected anodic electrode, the seawater electrolyzer oxidizes chloride ions (Cl−) to produce chlorine gas ($Cl_2$). The hydrogen and chlorine gases flow upward from the seawater electrolyzer and into and through respective hydrogen 306 and chlorine 307 gas tubes.

One 308 of a pair of fluidly connected, and/or interconnected, hydrochloric acid storage tanks, chambers, and/or vessels 308 and 309 contains, includes, and/or incorporates, a combustion chamber (not visible) into which hydrogen and chlorine gases produced by the seawater electrolyzer (not visible), are received from respective hydrogen and chlorine gas tubes 306 and 307. An ultraviolet-light emitting ignition source (not visible) within the combustion chamber causes hydrogen and chlorine gases therein to ignite, burn, combust, ignited, and/or react. Hydrogen chloride gas resulting from a combustion of the hydrogen and chlorine gases combines with seawater and/or hydrochloric acid solution within the hydrochloric acid storage tanks thereby dissolving as hydrochloric acid and thereby increasing the acidity of that solution.

The embodiment's seawater electrolyzer (not visible) receives seawater from a pressurized reservoir (not visible) of seawater within a hollow interior of the embodiment's buoy portion 301. Seawater from the pressurized reservoir flows into an internal portion of a feed pipe 310 and then into a heat exchanger (not visible) contained, positioned, and/or incorporated within, the embodiment's combustion chamber (not visible), which, in turn, is contained, positioned, and/or incorporated within one of the embodiment's hydrochloric acid storage tanks 308.

As seawater from the embodiment's pressurized reservoir (not visible) flows through the feed pipe 310, which passes through a heat exchanger (not visible) within the combustion chamber (not visible), it receives, through a wall of the thermally conductive feed pipe, a portion of the thermal energy and/or heat produced by hydrogen and chlorine gases burning therein, as well a portion of the thermal energy and/or heat produced when the reaction product hydrogen chloride gas, that results from the combustion of the hydrogen and chlorine gases within the combustion chamber, comes into contact with, dissolves into, and/or enters solution within, a relatively smaller "receiving" reservoir within the combustion chamber, the receiving reservoir being fluidly connected to the relatively larger reservoir, nominally acidified with hydrochloric acid, positioned and/or contained within the hydrochloric acid storage tanks 308 and 309.

The feed pipe 310 then passes out of the combustion chamber and the warmed and pressurized seawater therein flows out of the respective hydrochloric acid storage tank 308 and into an external portion of the feed pipe. That warmed seawater flowing through feed pipe 310 is then split at a fluidic junction 313 into two subsidiary and/or secondary streams, one of which flows into and/or through a cathodic feed pipe 311, and another which flows into and/or through an anodic feed pipe 312.

A portion of the hydrochloric acid solution produced within the combustion chamber (not visible) flows from the combustion chamber and into the warmed seawater flowing through the anodic feed pipe 312. The hydrochloric acid solution flows from the combustion chamber into and through acidification pipe 314. Hydrochloric acid solution from the acidification pipe is drawn into the warmed seawater flowing through the anodic feed pipe through the use of a constricted portion (e.g., a Venturi tube) 315 of the anodic feed pipe. The static pressure of the flowing warmed seawater is reduced when, and/or as, it flows through the constricted portion of the anodic feed pipe. And, that localized reduction in static pressure causes the relatively more highly pressurized hydrochloric acid solution to be injected, and/or drawn, into the flowing warmed seawater.

Hydrochloric acid solution is periodically removed from the fluidly connected hydrochloric acid storage tanks 308 and 309 via and/or through respective offtaking replacement 316 and effluent 317 pipes, and via and/or through respective offtaking replacement 318 and effluent 319 valves, e.g., by an adjacent vessel (not shown) that makes a fluid connection to those offtaking pipes. Gas (e.g., air) vents 320 and 321 allow the volume of hydrochloric acid solution within the hydrochloric acid storage tanks to change while keeping the pressure of any gases within those tanks (e.g., the air, if any, above the hydrochloric acid solution within the hydrochloric acid storage tanks) equilibrated with an atmospheric pressure.

The hydrochloric acid storage tanks 308 and 309 provide structural support and strength to the embodiment, as well as storing hydrochloric acid solutions therein.

Figure 8:
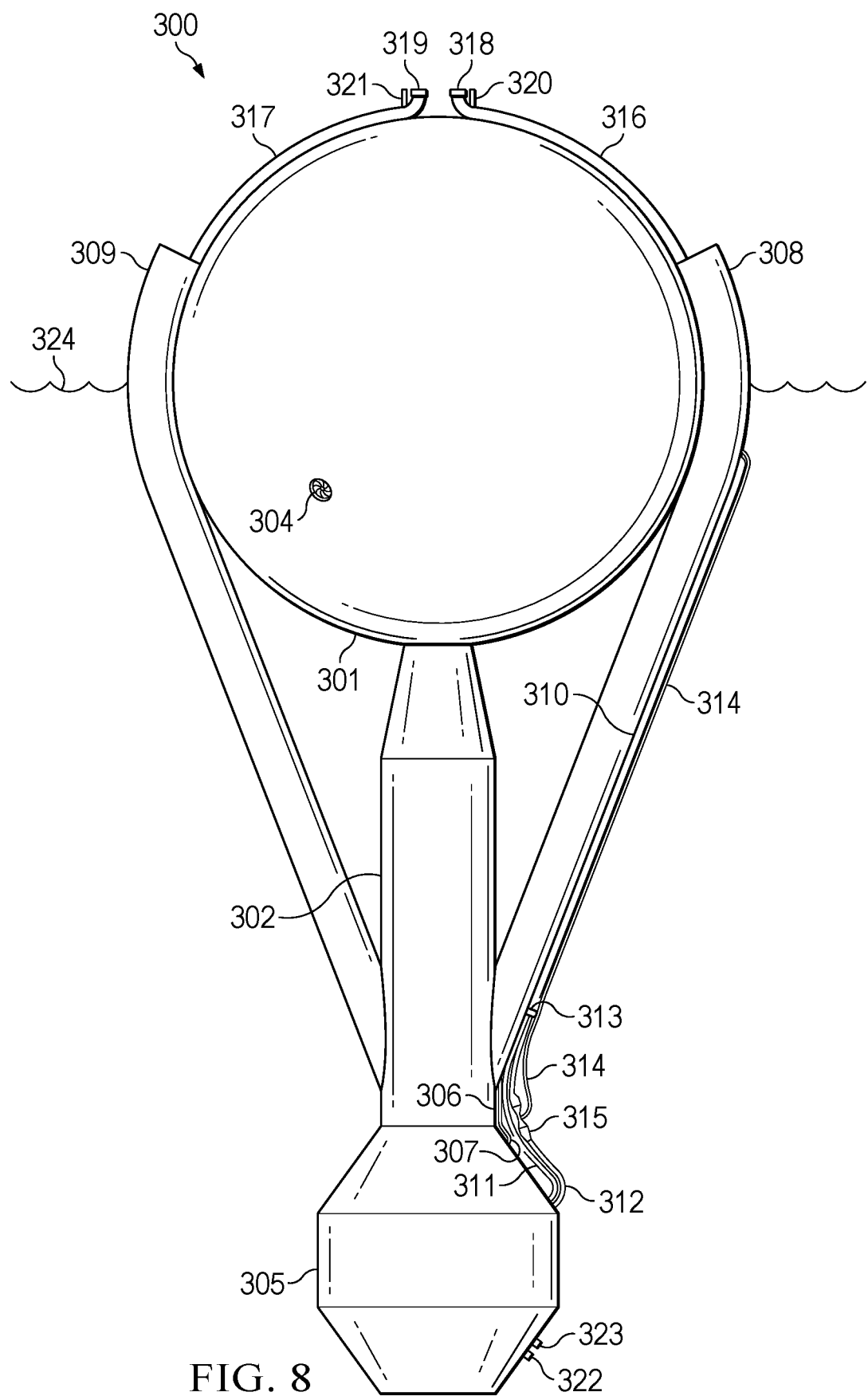
FIG. 8 is a side view of the third embodiment.

FIG. 8 shows a side view of the same embodiment 300 that is illustrated in FIG. 7. The embodiment 300 floats adjacent to an upper surface 324 of a body of seawater over which waves tend to pass. And the embodiment extracts energy from such waves, it converts a portion of that incident wave energy into electrical power which it then uses to electrolyze seawater into hydrogen and chlorine gases. The embodiment then reacts those gases within its combustion chamber (not visible) thereby producing hydrogen chloride gas, a solution of which it captures (as hydrochloric acid), stores, caches, and/or accumulates, within hydrochloric acid storage tanks 308 and 309.

After flowing through the embodiment's seawater electrolyzer (not visible) water (e.g., of increased alkalinity and reduced chloride ion content) flows out of the electrolysis chamber, and back into the body of seawater 324, through a cathodic effluent pipe 322 and an anodic effluent pipe 323.

Figure 9:
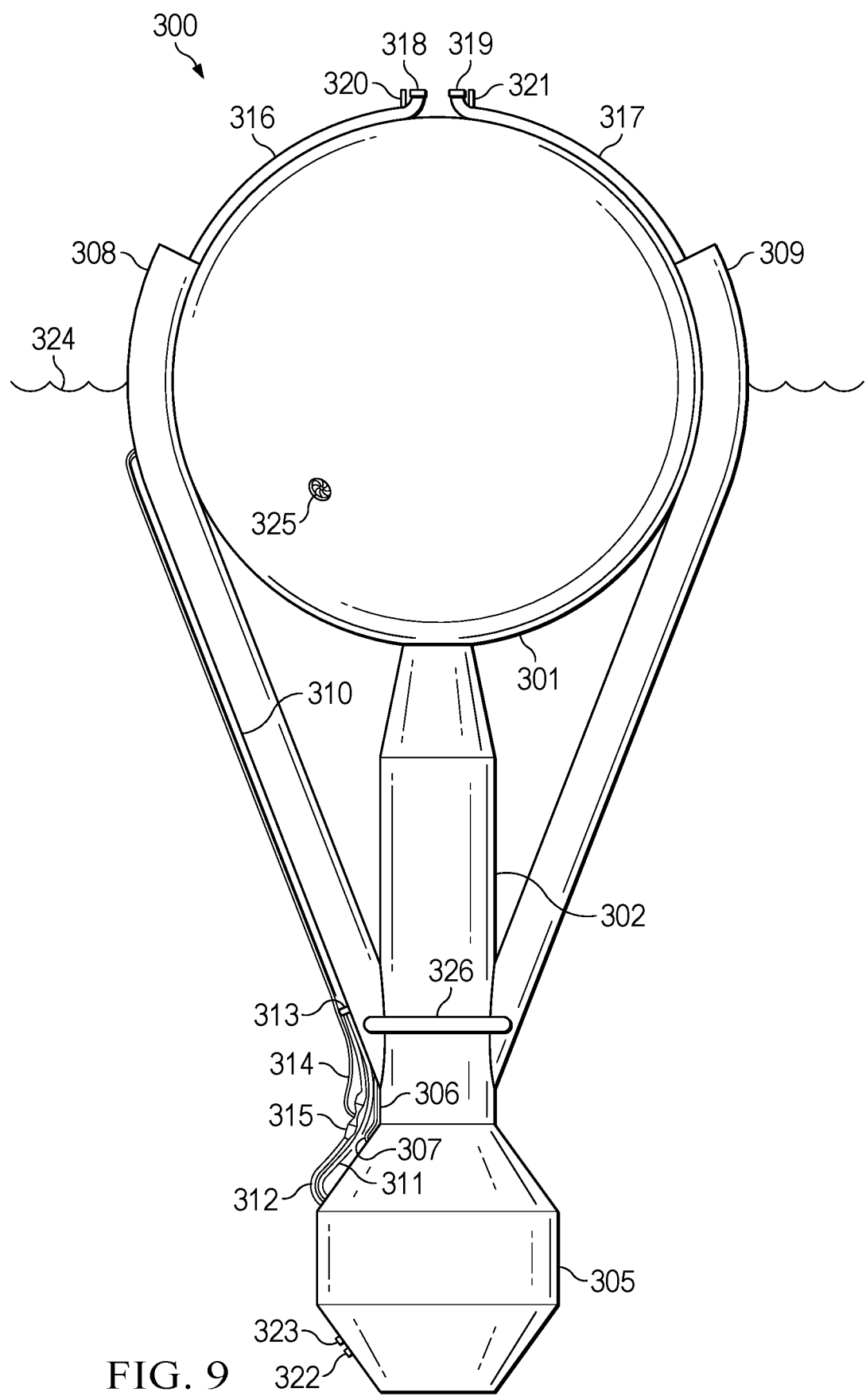
FIG. 9 is a side view of the third embodiment.

FIG. 9 shows a side view of the same embodiment 300 that is illustrated in FIGS. 7 and 8. The side view of FIG. 9 is of the side of the embodiment opposite that of the side illustrated in FIG. 8. And, while the embodiment's first water turbine 304 is visible in the views of FIGS. 7 and 8, the embodiment's second water turbine 325 is visible in the view of FIG. 9.

Hydrochloric acid storage tanks 308 and 309 are fluidly connected and/or interconnected via a tank connecting pipe 326.

Figure 10:
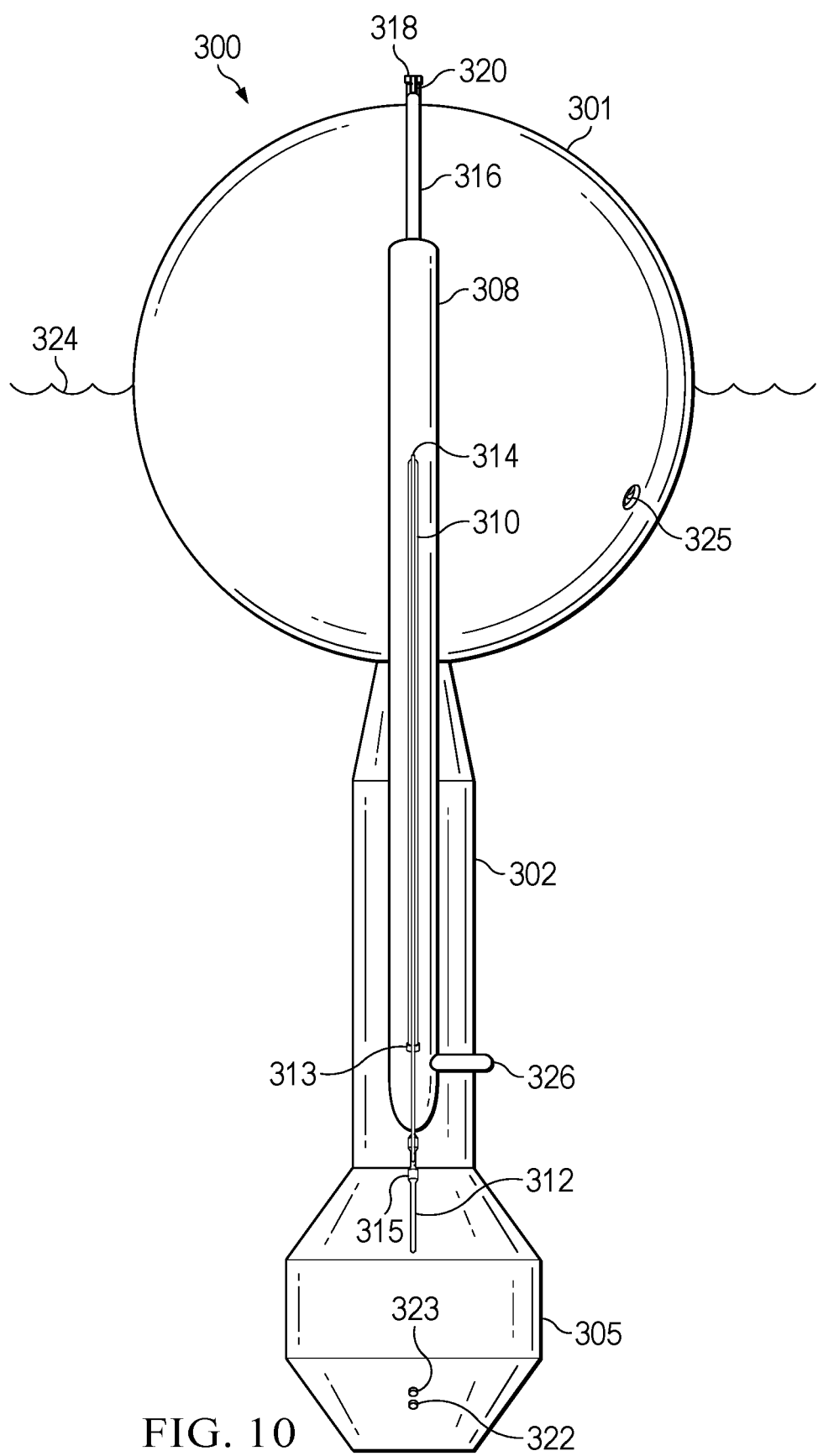
FIG. 10 is a side view of the third embodiment.

FIG. 10 shows a side view of the same embodiment 300 that is illustrated in FIGS. 7-9.

Figure 11:
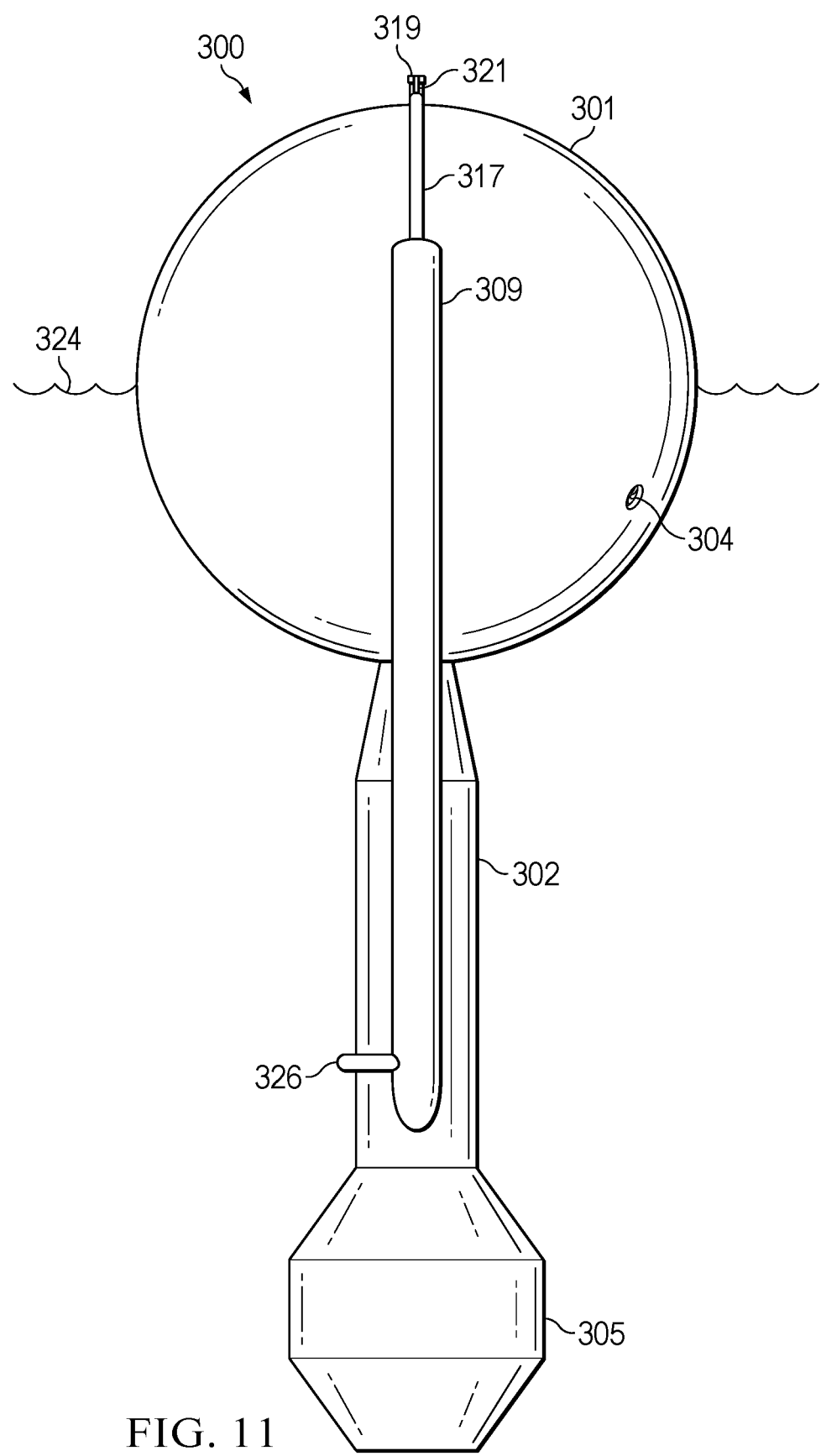
FIG. 11 is a side view of the third embodiment.

FIG. 11 shows a side view of the same embodiment 300 that is illustrated in FIGS. 7-10.

Figure 12:
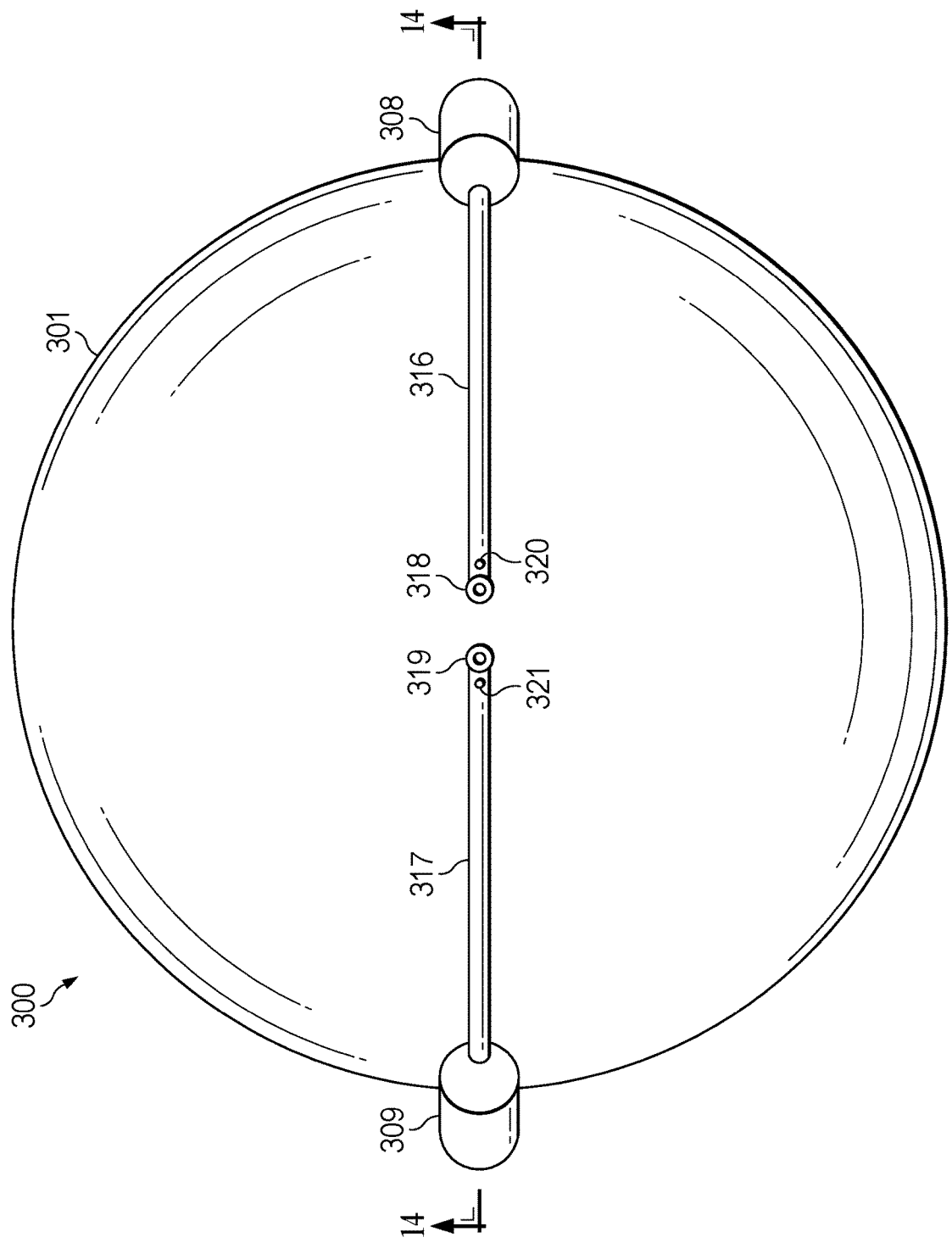
FIG. 12 is a top-down view of the third embodiment.

FIG. 12 shows a top-down view of the same embodiment 300 that is illustrated in FIGS. 7-11.

Figure 13:
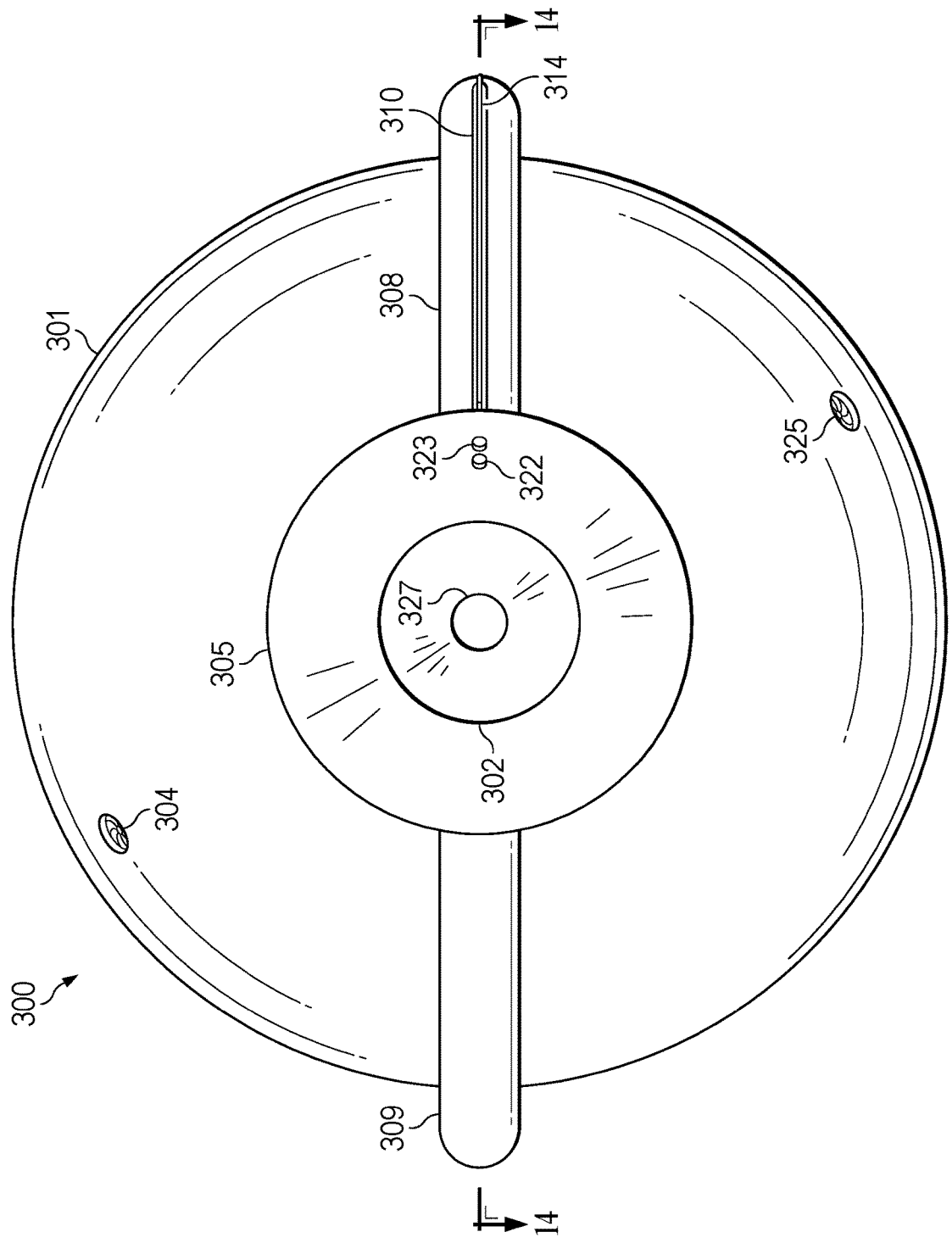
FIG. 13 is a bottom-up view of the third embodiment.

FIG. 13 shows a bottom-up view of the same embodiment 300 that is illustrated in FIGS. 7-12. Visible within the interior of the embodiment's reaction tube 302 is an upper mouth 327 of that reaction tube, positioned within the embodiment's hollow buoy 301, through which water is periodically, intermittently, and/or occasionally, ejected and deposited into the pressurized reservoir (not visible) within the interior of the hollow buoy 301.

Figure 14:
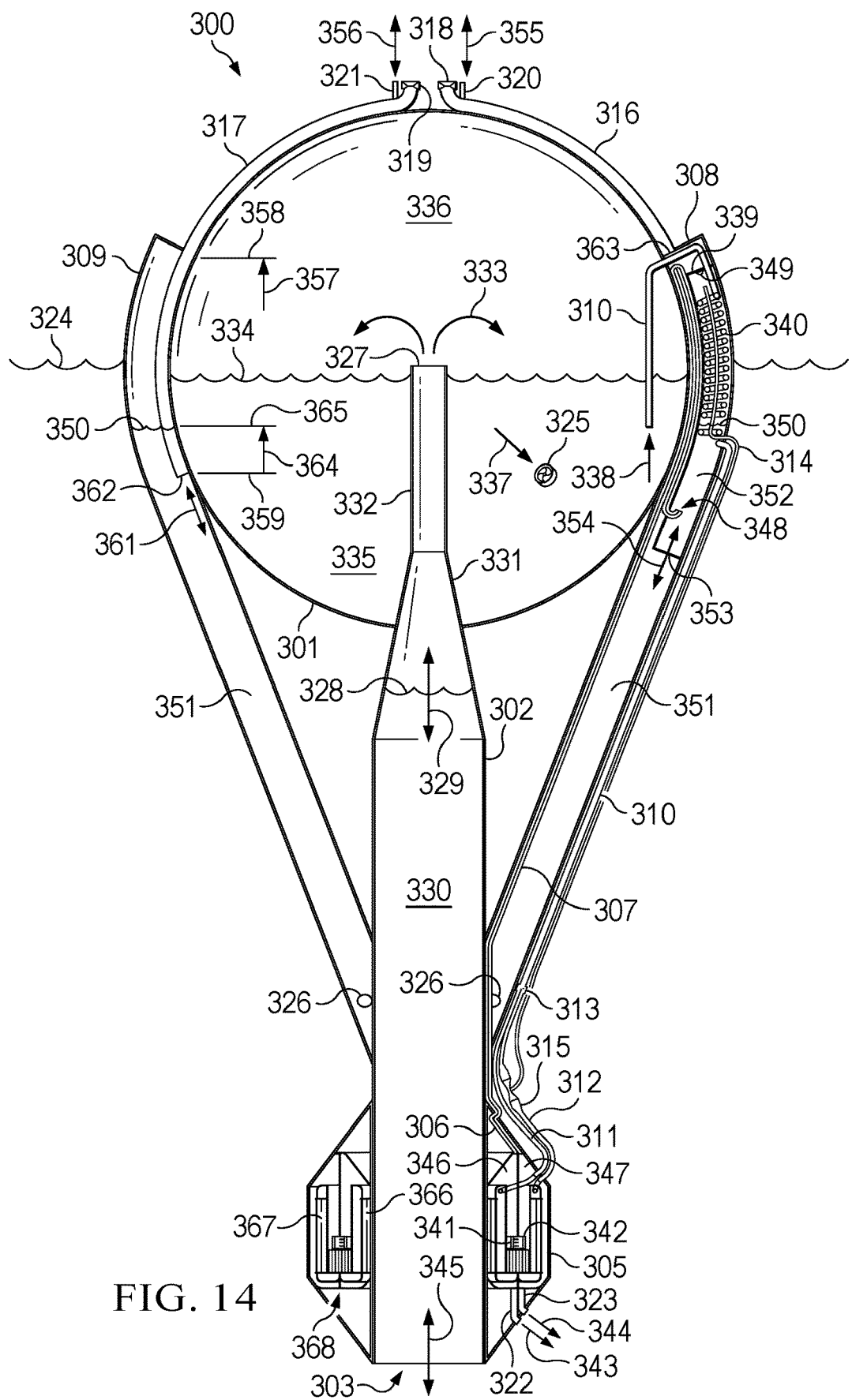
FIG. 14 is a side sectional view of the third embodiment.

FIG. 14 shows a side sectional view of the same embodiment 300 that is illustrated in FIGS. 7-13. The section plane is taken along section line 14-14 of FIGS. 12 and 13.

As explained in detail in U.S. patent Ser. No. 16/789,205, the inertial hydrodynamic wave engine portion of the embodiment 300 illustrated in FIGS. 7-13 moves up and down in response to waves moving across the surface 324 of the body of water on which the embodiment nominally floats. As the embodiment moves up and down in response to wave action at the embodiment, an upper surface 328 of water within the embodiment's reaction tube 302 tends to move 329 up and down as well (typically out of phase with the movements of the embodiment). As the water 330 within the embodiment's reaction tube moves up and down, water tends to move between the interior of the reaction tube and the body of water by flowing 345 in and out of a lower mouth 303 of the reaction tube, with a net upward flow.

Occasionally, an upward welling and/or flowing of water 330 within the reaction tube interacts with a constricted portion 331 of the reaction tube, which tends to pressurize a portion of that upwelling water and cause it to be forced and/or accelerated upward through an upper cylindrical portion 332 of the reaction tube, and then up to and through an upper mouth 327 of the reaction tube, resulting in an ejection 333 of a portion of that water from the reaction tube, whereafter the ejected water tends to fall down, onto, and through, an upper surface 334 of a reservoir 335 of water, and thereby to be deposited into that reservoir. A pressurized pocket of air 336 above, and fluidly continuous with, the reservoir tends to increase the pressure (e.g., head pressure) of the reservoir thereby imparting to that water a pressure potential energy relative to the body of water 324 outside the embodiment. Not shown is a valve and an associated pump with which the embodiment (through a pressure sensor and a control circuit, also not shown) regulates the pressure and volume of the gas(es) in the air pocket 336.

Pressurized water within the reservoir 335 flows 337 out of the reservoir through a pair of water turbines, e.g., 325, only one 325 of which is visible in the sectional view of FIG. 14, thereby tending to cause the water turbines to rotate. A pair of generators, each operatively connected to a respective water turbine, produce electrical power in response to outflows of water through, and consequent rotations of, their respective water turbines.

Water from the pressurized reservoir 335 flows 338 into a mouth and/or aperture at a lower end of feed pipe 310 positioned within the reservoir. The feed pipe, and the water flowing therein, then enters an upper portion of hydrochloric acid storage tank 308. Within the hydrochloric acid storage tank, the feed pipe, and the water flowing therein, then enters an interior of a combustion chamber 339 positioned within the hydrochloric acid storage tank, whereupon the feed pipe is configured in a spiral fashion to act as a heat exchanger 340 causing it to facilitate the transfer of heat generated and/or present within the combustion chamber to the water flowing through the heat-exchanging portion of the thermally-conductive feed pipe. Water flowing within the feed pipe 310 is, in this heat-exchanger region, kept separate from liquid and gas in hydrochloric acid storage tank 308 by the walls of feed pipe 310.

Hydrogen and chlorine gases combusted within the combustion chamber 339 form hydrogen chloride gas which then tends to come into contact with a fluid reservoir 352 within a lower portion of the combustion chamber. Upon contact with the fluid reservoir 352, the hydrogen chloride gas tends to dissolve into that fluid reservoir and upon its dissolution release a latent heat of dissolution which tends to warm and/or heat the fluid reservoir 352. Due to its relative separation from the solution 351 within the hydrochloric acid storage tank 308, the increase in the temperature of the fluid reservoir 352 caused by both the combustion of the hydrogen and chlorine gases, as well as the subsequent hydrogen-chloride's heat of dissolution, tends to warm and/or heat the hydrogen and chlorine gases waiting for combustion within the upper portion of the combustion chamber. Thus, the heat exchanger 340 within the combustion chamber tends to warm the water flowing through the heat-exchanging portion of the thermally-conductive feed pipe through thermal contributions produced by the both the combustion of the hydrogen and chlorine gases, and the dissolution of the combustion-produced hydrogen chloride gas.

The feed pipe 310 then exits the combustion chamber 339 and the respective hydrochloric acid storage tank 308, and travels, adjacent to an outer surface and/or wall of the of the hydrochloric acid storage tank 308, down to a fluidic junction 313, flow-splitter, and/or flow manifold. At the fluidic junction, the feed pipe, and the stream of warmed pressurized seawater flowing therethrough, splits into two subordinate and/or secondary feed pipes, and into two subordinate and/or secondary streams of warmed pressurized seawater. A first subordinate feed pipe, i.e., the cathodic feed pipe 311, carries warmed reservoir water into a first and/or innermost annular portion 346 of the embodiment's seawater electrolyzer 368 (within the electrolysis chamber 305) which surrounds the cathodic electrode 341 of the seawater electrolyzer from which hydrogen gas is evolved and/or produced. A second subordinate feed pipe, i.e., the anodic feed pipe 312, carries warmed reservoir water into a second and/or outermost annular portion 347 of the embodiment's seawater electrolyzer (within the electrolyzer chamber) which surrounds the anodic electrode 342 of the seawater electrolyzer from which chlorine gas is evolved and/or produced.

An acidification pipe 314 has an open upper end into which hydrogen and chlorine gases may flow, even as an upper portion of the combustion chamber 339 fills with hydrogen and chlorine gases prior to a combustion event, causing a subsequent reaction of such gases to produce hydrogen chloride within an upper portion of that acidification pipe. When combined with the humidity present within the combustion chamber as a consequence of the warm fluid reservoir therein, the hydrogen chloride present within the upper portion of that acidification pipe tends to become a highly concentrated solution of hydrochloric acid. If there is insufficient humidity to immediately dissolve the hydrogen chloride gas formed within the acidification pipe, or even if there is sufficient humidity to dissolve a portion of that gas, a portion, if not all, of the hydrogen chloride gas formed within an upper portion of the acidification pipe is able to flow down through the acidification pipe to the Venturi injector 315 of the anodic feed pipe 312 where it will be exposed to, and dissolve into, the warmed reservoir water flowing therethrough.

This supply, source, and/or stream of hydrogen chloride gas, and/or hydrochloric acid solution, tends to flow down through the acidification pipe and to be drawn into the warmed reservoir water flowing through the anodic feed pipe 312 by a constricted and/or venturi tube segment 315 of and/or within the anodic feed pipe. Thus, the acidity of the warmed reservoir water flowing to the anodic electrode 342 of the seawater electrolyzer 368 (within the electrolysis chamber 305) is increased, and/or the pH of that water is reduced, which tends to facilitate the production of chlorine gas at the anodic electrode, e.g., by inhibiting, if not eliminating, the conversion of chlorine in solution into hypochlorite within the anodic, second, and/or outermost, annular portion 347 of the seawater electrolyzer 368.

Water flowing into the first 346 and second 347 annular portions of the seawater electrolyzer 368 (within the electrolysis chamber 305) flows past respective heat-exchanging panels 366 and 367 which facilitate the transfer of some of the heat and/or thermal energy within the effluent of the respective cathodic 341 and anodic 342 electrodes to, and/or into, the pressurized reservoir water flowing to those respective electrodes.

Effluent from the cathodic electrode 341 flows 343 out of the seawater electrolyzer 368 (within the electrolysis chamber 305), and back into the body of water 324 from which it was captured, through the cathodic effluent pipe 322. Effluent from the anodic electrode 342 flows 344 out of the seawater electrolyzer (within the electrolysis chamber 305), and back into the body of water 324 from which it was captured, through the anodic effluent pipe 323.

Hydrogen gas is produced at the cathodic electrode 341 in response to a provision by either or both of the embodiment's generators (not shown) of electrical energy, e.g., a direct current (DC) voltage and current, to the electrode. Bubbles of hydrogen gas produced at the cathodic electrode tend to rise within the water surrounding the cathodic electrode and are collected and/or gathered in a hydrogen collection baffle 346 of the respective first portion of the embodiment's seawater electrolyzer 368 (within the electrolysis chamber 305) which surrounds the cathodic electrode of the seawater electrolyzer. Hydrogen gas that rises to, and accumulates within, the top of the upper portion of the respective first portion of the embodiment's seawater electrolyzer thereafter tends to flow up and through the respective hydrogen gas tube 306.

Chlorine gas is produced at the anodic electrode 342 in response to a provision by either or both of the embodiment's generators (not shown) of electrical energy to the electrode. Bubbles of chlorine gas produced at the anodic electrode tend to rise within the water surrounding the anodic electrode and are collected and/or gathered in a chlorine collection baffle 347 of the respective second portion of the embodiment's seawater electrolyzer 368 (within the electrolysis chamber 305) which surrounds the anodic electrode of the seawater electrolyzer. Chlorine gas that rises to, and accumulates within, the top of the upper portion of the respective second portion of the embodiment's seawater electrolyzer thereafter tends to flow up and through the respective chlorine gas tube 307.

The hydrogen 306 and chlorine 307 gas tubes pass out of the electrolysis chamber 305 and then pass into the hydrochloric acid storage tank 308 which contains the combustion chamber 339. The hydrogen and chlorine gas tubes travel up through an interior of the hydrochloric acid storage tank to a position at an upper end of that hydrochloric acid storage tank. They then bend by about 180 degrees and travel downward to positions adjacent to a lower end of the combustion chamber where they enter the combustion chamber and there release any respective gases that reach those distal ends 348 of the respective gas tubes.

Hydrogen and/or chlorine gases released within the combustion chamber 339 from their respective hydrogen and/or chlorine gas tubes will tend to bubble up toward an upper portion of the interior of the combustion chamber and there accumulate. An ultraviolet lamp 349 positioned at an upper interior position within the combustion chamber is periodically illuminated, thereby periodically tending to ignite any mixture of hydrogen and chlorine gases adjacent to the lamp and/or accumulated within an upper portion of the interior of the combustion chamber. The hydrogen chloride gas resulting from an ignition and/or combustion of a mixture of hydrogen and chlorine gases adjacent to the ultraviolet lamp tends to reach an upper surface 350 of the water 352 present within the combustion chamber and therein dissolve thereby changing, forming, and/or separating, so as to form hydrochloric acid. An aperture 353 at a bottom wall of the combustion chamber provides fluid communication of the solution 352 within the combustion chamber and the solution 351 within the hydrochloric acid storage tanks 308 and 309.

In another embodiment, a spark ignition source is used instead of a lamp. And in another embodiment, a heat ignition source is used instead of a lamp. And, in another embodiment, an ultraviolet lamp is continuously illuminated. And, in another embodiment, a lamp emitting electromagnetic radiation of a wavelength other than ultraviolet is used to ignite the hydrogen and chlorine gases.

Acids within, and/or added to, water 352 within the combustion chamber tend to be exchanged 354, and/or to equilibrate with, the water 351 outside the combustion chamber via an aperture 353 in a lower portion of the wall of the combustion chamber 339.

As the embodiment 300 extracts energy from passing waves, and uses that energy to produce hydrochloric acid, the volume of the increasingly acidic solution 351 within the embodiment's hydrochloric acid storage tanks 308 and 309 increases. As the volume of acidic solution within the hydrochloric acid storage tanks increases, gas may be expelled 355 and 356 from those tanks through respective gas vents 320 and 321 thereby maintaining an atmospheric pressure in the gas pocket (if any) at the upper end of each respective hydrochloric acid storage tank.

When, or before, the volume of acidic solution fills the hydrochloric acid storage tanks 308 and 309, e.g., by an upper surface 350 of that acidic solution reaching 357 a resting level 358, an offtaking vessel (not shown) may connect an offtaking replacement hose (not shown) to offtaking replacement valve 318 and an offtaking effluent hose (not shown) to offtaking effluent valve 319.

With respect to the embodiment illustrated in FIGS. 7-14, the offtaking vessel (not shown) pumps and/or draws 361 hydrochloric acid solution from, and/or out of, the second offtaking hose that is connected to offtaking effluent valve 319, thereby drawing hydrochloric acid solution into a lower mouth and/or aperture 362 of the second offtaking effluent pipe 317 and thereby removing hydrochloric acid solution from the fluidly connected hydrochloric acid storage tanks 308 and 309.

And, with respect to the embodiment illustrated in FIGS. 7-14, the offtaking vessel (not shown) pumps a replacement fluid (e.g., fresh water or seawater) into and through the first offtaking replacement hose (not shown) that is connected to offtaking replacement valve 318, thereby pumping the replacement fluid into the first offtaking replacement pipe 316 and into the hydrochloric acid storage tank 308 through a lower mouth and/or aperture 363 of the offtaking replacement pipe, thereby replacing the acidic fluid that is being, and/or has been, removed through offtaking effluent valve 319 with the added replacement fluid. Thus, by pumping a replacement fluid (e.g., seawater) into the hydrochloric acid storage tanks 308 and 309 via offtaking replacement valve 318, hydrochloric acid solution may be "pushed" through the fluid circuit that includes tanks 308 and 309, and tank connecting pipe 326, and retrieved as it leaves said tanks via an offtaking effluent hose (not shown) connected to offtaking effluent valve 319.

When a sensor on the offtaking vessel (not shown) detects that the acidity of the fluid being removed from the embodiment 300 through offtaking effluent valve 319 has fallen to, or below, a threshold value (e.g., because it has begun removing replacement fluid rather than acidic solution, and/or because it has begun removing an acidic solution that has been progressively diluted through the addition of replacement fluid), then the offtaking vessel opens the offtaking replacement hose and/or the offtaking replacement valve 318 to the atmosphere (or begins pumping air into that offtaking replacement hose) while continuing to remove fluid from and/or through the offtaking effluent hose and offtaking effluent valve 319. The replacement of removed fluid with a gas (e.g., with air) tends to lower the level of fluid within the hydrochloric acid storage tanks 308 and 309 to a level 359 approximately equal to the level of the lower mouth 362 of the offtaking effluent pipe 317, leaving the portions of the hydrochloric acid storage tanks above that level filled with the gas (e.g., air or nitrogen) introduced by the offtaking vessel.

After an offtaking vessel (not shown) has disconnected its offtaking hoses from the embodiment, and/or from the respective offtaking replacement 318 and effluent 319 valves, the embodiment will continue its production of hydrochloric acid, thereby progressively increasing both the acidity and the volume of the acidic solution stored within the hydrochloric acid storage tanks 308 and 309, and thereby progressively raising 364 the level 365 of an upper surface 350 of the fluid within the hydrochloric acid storage tanks.

The tubular connection 326 that fluidly connects the interiors of the embodiment's two hydrochloric acid storage tanks 308 and 309 can be seen in FIG. 14 as a pair of complementary apertures 326 within the respective hydrochloric acid storage tanks.

Another embodiment similar to the one illustrated in FIGS. 7-14 includes a third offtaking pipe fluidly connected to tank connecting pipe 326. With respect to this other embodiment, an offtaking vessel (not shown) initially pumps out hydrochloric acid solution from the hydrochloric acid storage tanks 308 and 309 via the third offtaking pipe via the tank connecting pipe. And, after the desired amount of hydrochloric acid solution has been removed from the hydrochloric acid storage tanks, a replacement fluid (e.g., seawater) is pumped into offtaking pipes 316 and 317.

Figure 15:
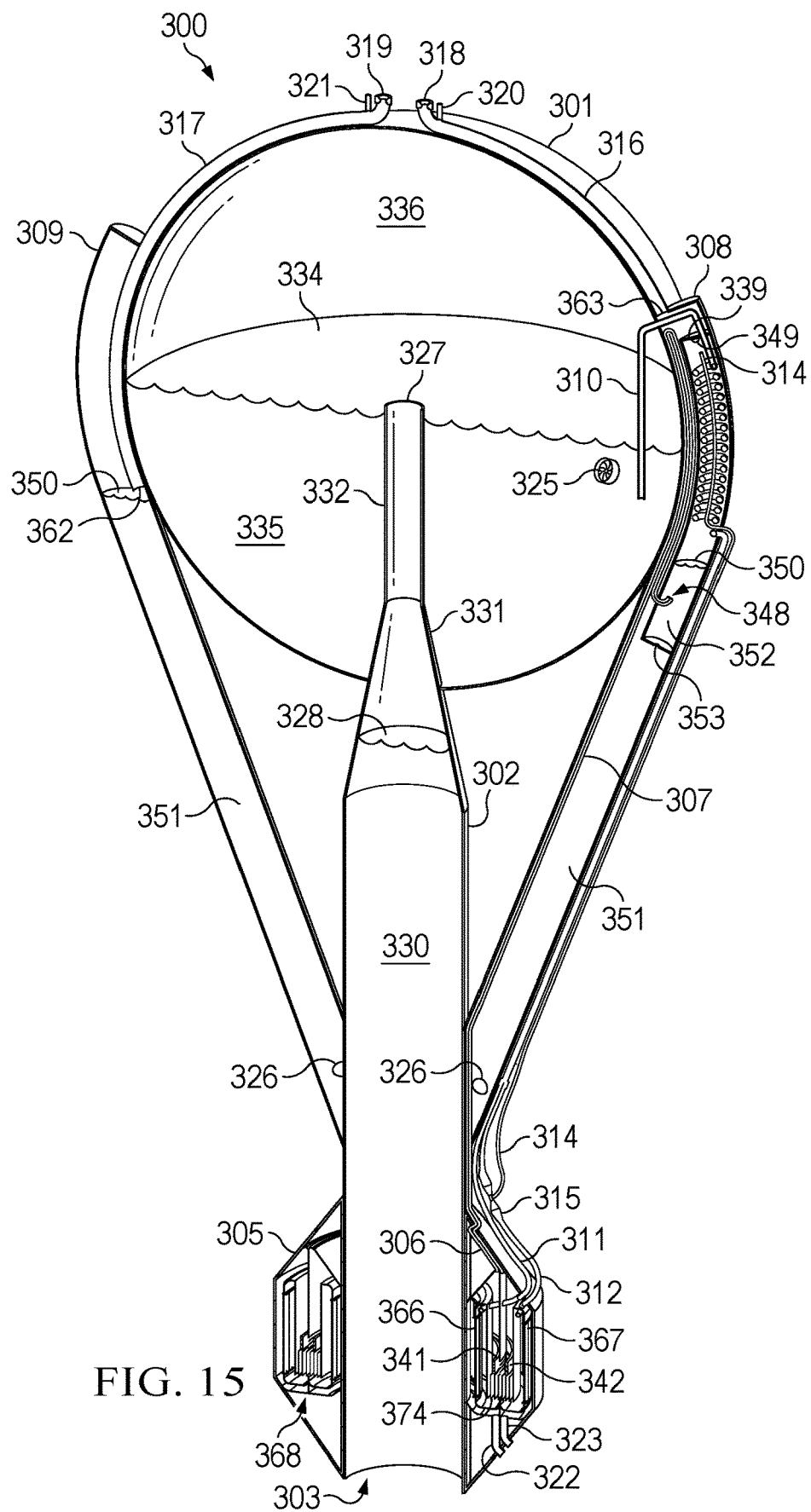
FIG. 15 is a perspective view of the side sectional view of FIG. 14.

FIG. 15 is a perspective view of the side sectional view of FIG. 14.

Figure 16:
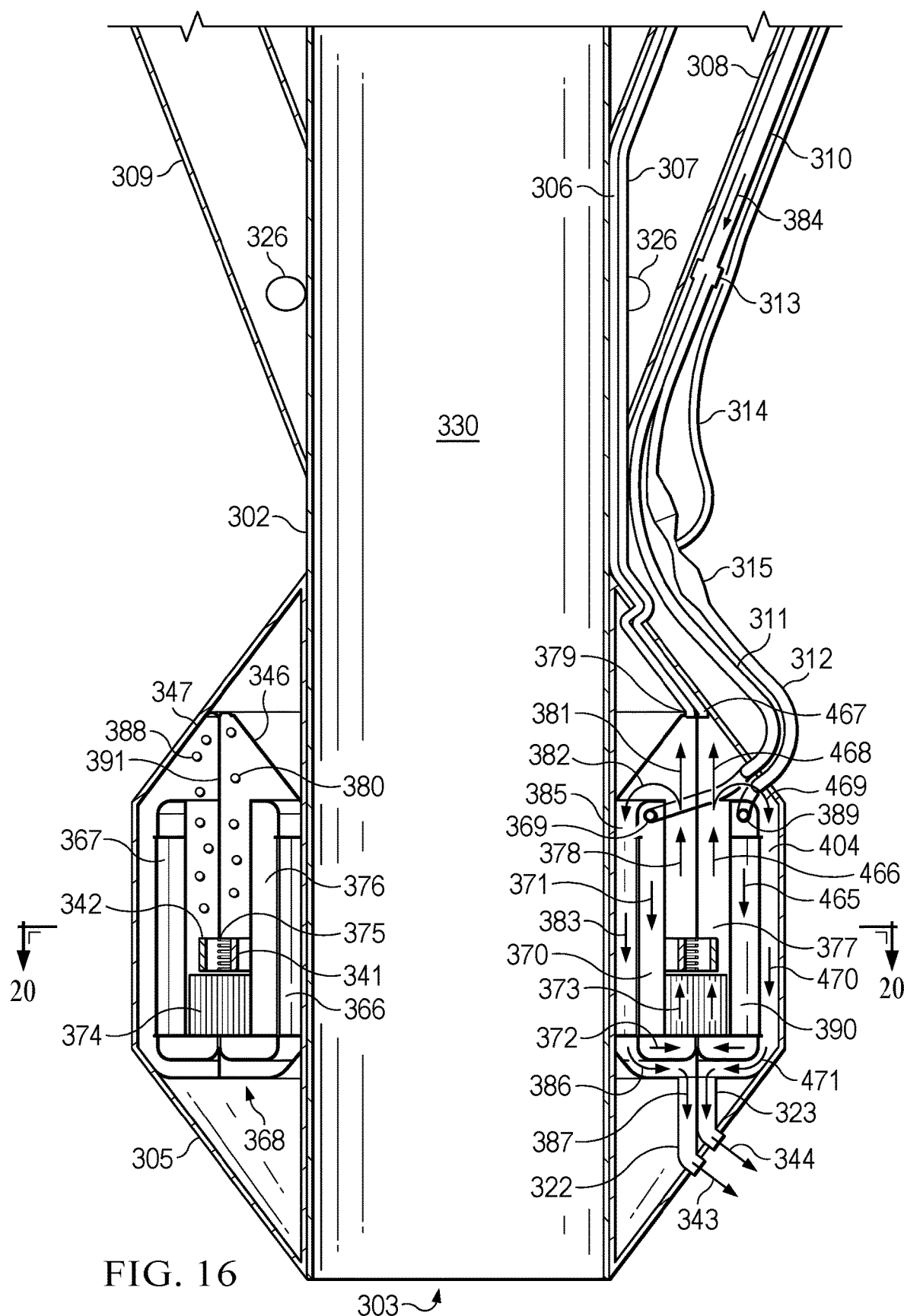
FIG. 16 is a close-up view of a portion of the side sectional view of FIG. 14.

FIG. 16 is a close-up sectional view of the seawater electrolyzer 368 of the same embodiment illustrated in FIGS. 7-15. The section plane is taken along section line 14-14 of FIGS. 12 and 13.

Pressurized water from the embodiment's reservoir (not visible, 335 in FIG. 14) flows 384 into and through feed pipe 310 to the fluidic junction 313 where the stream is split with one split stream flowing into the cathodic feed pipe 311 and the other split stream flowing into the anodic feed pipe 312. The water flowing through the anodic feed pipe passes and/or flows through a constricted tube segment 315 and/or venturi tube with the drop in the water's static pressure therein causing an acidic solution to be drawn into that flow from acidification pipe 314.

Warmed reservoir water flows out of the cathodic feed pipe 311 through cathodic-feed-pipe mouth and/or aperture 369 and enters an annular pre-cathodic channel and/or conduit 370 through which it flows 371 downward and away from the cathodic-feed-pipe mouth. At a distal and/or lower end of the annular cathodic channel, the water flows 372 radially outward, and/or away from the embodiment's reaction tube 302, through a horizontal portion of the annular cathodic channel and then flows 373 upward toward the cathodic electrode 341 of the seawater electrolyzer 368, and flows through a flow-straightener 374 therein comprised of a plurality of coaxial cylindrical surfaces which both reduces turbulence in the flowing 373 water and which maintains a separation of the adjacent cathodic and anodic water streams.

The warmed reservoir water then flows over, past, and/or around the seawater electrolyzer's 368 cathode 341. Note that the cathodic and anodic electrodes are separated by a semi-permeable microporous mesh diaphragm 375 which tends to permit the passage of certain dissolved ions while inhibiting a more substantial and/or liberal exchange of water (and ions) between the annular cathodic 376 and anodic 377 flow channels. This diaphragm inhibits a migration of hydroxide ions created at or by the cathode 342 to the anode 341, and thereby inhibits the conversion of freshly-oxidized chlorine atoms into hypochlorite rather than chlorine gas.

Another embodiment similar to the one illustrated in FIGS. 7-16, incorporates, utilizes, and/or includes, a semi-permeable membrane rather than a diaphragm. And this embodiment relies upon the membrane to inhibit a migration of hydroxide ions from the annular cathodic 376 and anodic 377 flow channels.

After flowing past the cathodic electrode 341, the water and/or cathodic effluent flows 378 upward, within the cathodic flow channel 376, toward the inlet 379 to the hydrogen gas tube 306. Upon entering the hydrogen collection baffle 346 of the seawater electrolyzer 368, bubbles of hydrogen gas, e.g., 380, flow and/or rise 381 upward toward the inlet to the hydrogen gas tube, and thereafter flow into and through the hydrogen gas tube to the combustion chamber (not visible, 339 in FIG. 14). The bulk of the upward-flowing 378 cathodic effluent flows 382 radially across, over, and around an upper end of the annular pre-cathodic channel 370. The cathodic effluent then flows 383 downward through an annular post-cathodic channel 385 and adjacent to an annular cathodic heat-exchanging panel 366 which facilitates a transfer of heat and/or thermal energy from the cathodic effluent flowing 383 away from the cathodic electrode to the water flowing 371 through the annular pre-cathodic channel 370 toward the cathodic electrode 341.

The downward-flowing 383 cathodic effluent flows 386 radially across, over, and around a lower end of the annular pre-cathodic channel 370. The cathodic effluent then flows 387 into and through cathodic effluent pipe 322 from where it flows 343 into the body of water on which the embodiment floats.

In similar fashion to the manner and mechanism by which water from the cathodic feed pipe 311 flows out of the cathodic-feed-pipe mouth and/or aperture 369 and then flows to and through the cathodic electrode 341, so too does water from the anodic feed pipe 312 flow out of the anodic-feed-pipe mouth and/or aperture 389 to and through the anodic electrode 342, thereby giving rise to bubbles of chlorine, e.g., 388, which rise upward to, into, and through the chlorine gas tube 307 after which they flow to and enter the combustion chamber (not visible, 339 in FIG. 14).

The anodic effluent flows adjacent to an annular anodic heat-exchanging panel 367 which facilitates a transfer of heat and/or thermal energy from the anodic effluent flowing away from the anodic electrode to the water flowing out of the anodic feed pipe 312 and into and through the annular pre-anodic channel 390 toward the anodic electrode. Finally, the anodic effluent flows into and through anodic effluent pipe 323 and therethrough flows 344 into the body of water on which the embodiment floats.

Warmed and acidified reservoir water flows out of the anodic feed pipe 312 through anodic-feed-pipe mouth and/or aperture 389 and enters an annular pre-anodic channel and/or conduit 390 through which it flows 465 downward and away from the anodic-feed-pipe mouth. At a distal and/or lower end of the annular anodic channel, the water flows radially inward, and/or toward the embodiment's reaction tube 302, through a horizontal portion of the annular anodic channel and then flows upward toward the anodic electrode 342 of the seawater electrolyzer 368, and flows through a flow-straightener 374 therein comprised of a plurality of coaxial cylindrical surfaces which both reduces turbulence in the flowing water and which maintains a separation of the adjacent anodic and cathodic water streams.

The warmed and acidified reservoir water then flows over, past, and/or around the seawater electrolyzer's 368 anode 342. Note that the anodic and cathodic electrodes are separated by a permeable mesh or diaphragm 375 which tends to permit the passage of ions while inhibiting a more substantial and/or liberal exchange of water and/or gas between the annular anodic 377 and cathodic 376 flow channels. Above the permeable mesh, the anodic 377 and cathodic 376 flow channels are separated by a medial wall 391 that prevents any flow between the flow channels.

After flowing past the anodic electrode 342, the water and/or anodic effluent flows 466 upward, within the anodic flow channel 377, toward the inlet 467 to the chlorine gas tube 307. Upon entering the chlorine collection baffle 347 of the seawater electrolyzer 368, bubbles of chlorine gas, e.g., 388, flow 468 and/or rise upward toward the inlet to the chlorine gas tube, and thereafter flow into and through the chlorine gas tube to the combustion chamber (not visible, 339 in FIG. 14). The bulk of the upward-flowing anodic effluent flows 469 radially across, over, and around an upper end of the annular pre-anodic channel 390. The anodic effluent then flows 470 downward through an annular post-anodic channel 404 and adjacent to an annular anodic heat-exchanging panel 367 which facilitates a transfer of heat and/or thermal energy from the anodic effluent flowing away from the anodic electrode to the water flowing through the annular pre-anodic channel 390 toward the anodic electrode 342.

The anodic effluent flowing downward through the annular post-anodic channel 404 then flows 471 radially across, over, and around a lower end of the annular pre-anodic channel 390. The anodic effluent then flows into and through anodic effluent pipe 323 from where it flows 344 into the body of water on which the embodiment floats.

The cathodic and anodic channels of the seawater electrolyzer 368 are separated by a wall 391, and an embedded diaphragm 375, which keeps the water flowing to, through, and away from each electrode separated except to the degree that water, and/or ions therein, are exchanged through the semi-permeable mesh diaphragm.

With the exception of pipes fluidly connected to the seawater electrolyzer 368, the seawater electrolyzer is substantially axisymmetric and is arrayed about the reaction tube 302 of the embodiment in an annular fashion.

Figure 17:
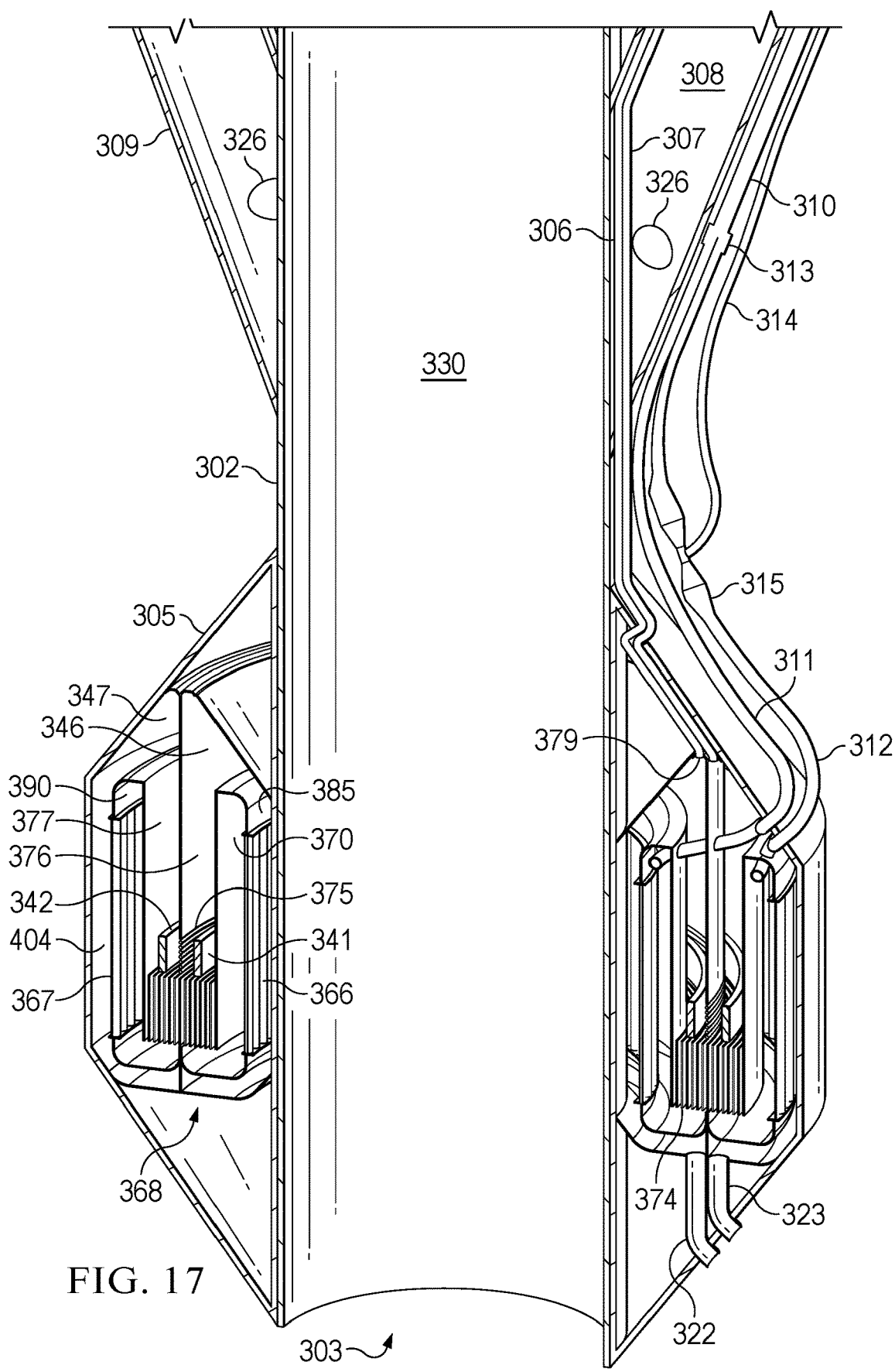
FIG. 17 is a perspective view of the close-up view of FIG. 16.

FIG. 17 is a perspective view of the close-up side sectional view of FIG. 16.

Figure 18:
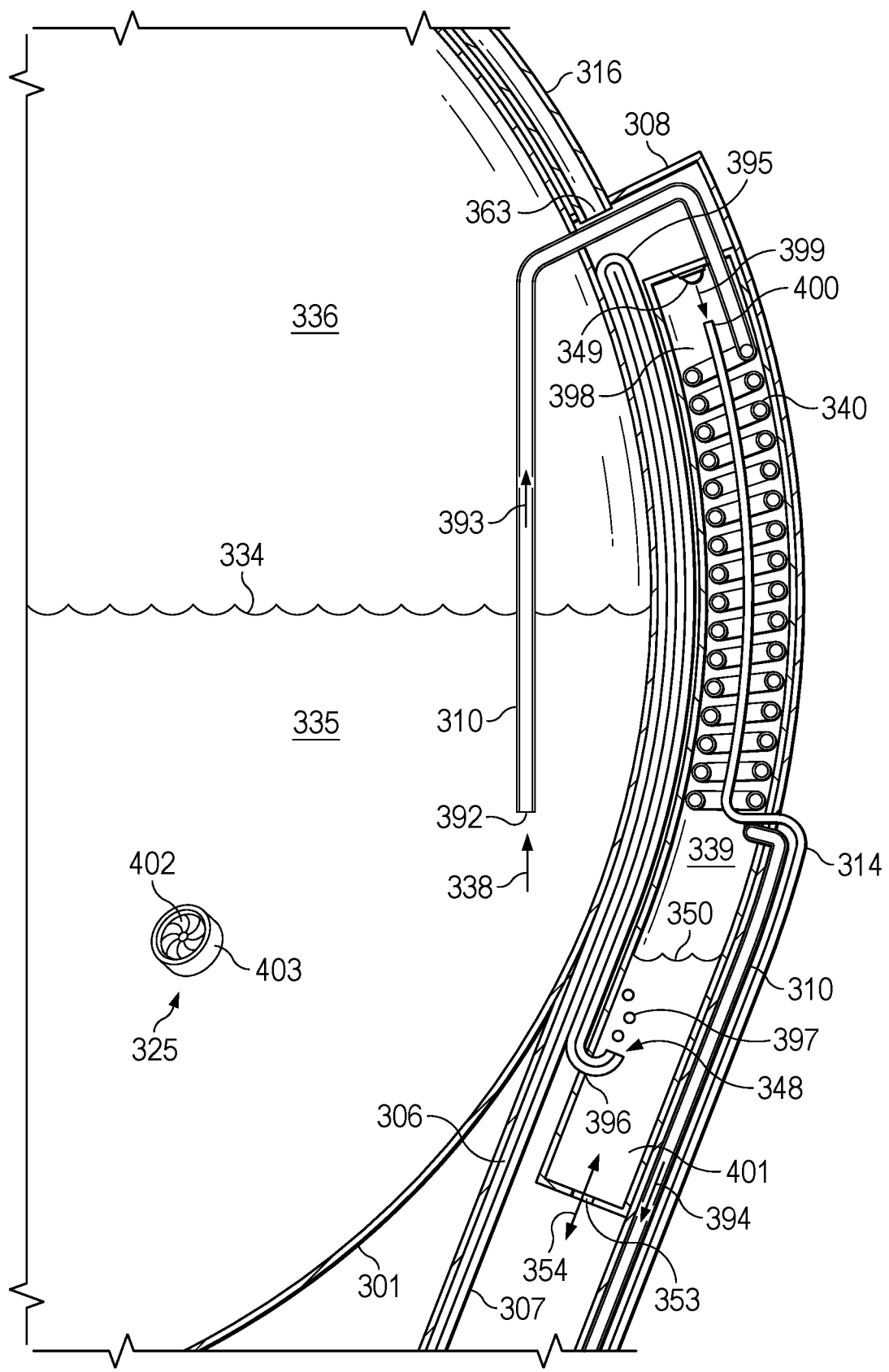
FIG. 18 is a close-up view of a portion of the side sectional view of FIG. 14.

FIG. 18 is a close-up sectional view of the combustion chamber 339 of the same embodiment illustrated in FIGS. 7-17. The section plane is taken along section line 14-14 of FIGS. 12 and 13.

Pressurized water from within the embodiment's reservoir 335 flows 338 into a mouth and/or aperture 392 at an end of feed pipe 310 and thereafter flows 393 through the feed pipe into hydrochloric acid storage tank 308 and then into the combustion chamber 339 positioned therein. In an upper portion of the combustion chamber, the feed pipe assumes and/or adopts a spiral configuration 340, i.e., a heat-exchanging configuration, in order to facilitate a transfer of heat from the combustion of hydrogen and chlorine gases, and a latent heat of dissolution of hydrogen chloride into a hydrochloric acid solution, within the combustion chamber into the water flowing 393 through the feed pipe. After passing through the combustion chamber, the feed pipe passes to the outside of the hydrochloric acid storage tank and continues downward to the fluidic junction (not visible, 313 in FIG. 16). The water flowing 394 within the feed pipe following its passage through and from the spiral configuration 340 is nominally warmer than the water in the reservoir 335.

Hydrogen gas flows from the seawater electrolyzer (not visible, 368 in FIG. 16) to the combustion chamber 339 through hydrogen gas tube 306. Similarly, chlorine gas flows from the seawater electrolyzer to the combustion chamber through chlorine gas tube 307. Both the hydrogen and chlorine gas tubes continue upward until they are adjacent to an uppermost end and/or part of the combustion chamber and the respective hydrochloric acid storage tank 308 at which point they bend 395 so as to continue, and/or thereafter continuing, downward to a position near a lowermost end and/or part of the combustion chamber where, and/or at which position 396 and/or location they pass through the wall of the combustion chamber to an interior of the combustion chamber. The hydrogen and chlorine gas tubes pass through a lateral wall of the combustion chamber at 396. Hydrogen and chlorine gas that has flowed from the seawater electrolyzer to the combustion chamber then tends to bubble, e.g., 397, from the ends 348 of their respective gas tubes, thereby becoming trapped within an upper portion of the combustion chamber and joining other hydrogen and chlorine gases within a pocket 398 (if any) of hydrogen and chlorine gases positioned at an uppermost end of the interior of the combustion chamber.

A relatively small fraction of the hydrogen and chlorine gases trapped within the pocket 398 (if any) of such gases will flow 399 into an upper mouth 400 of, and thereby occupy an uppermost portion of, acidification pipe 314. When ultraviolet lamp 349 is energized, and thereby illuminated so as to emit ultraviolet light, any hydrogen and chlorine gases present within the pocket 398 at the uppermost end of the interior of the combustion chamber 339, as well as any such gases present within an upper part of the acidification pipe, will be ignited and combine exothermically producing a hydrogen chloride gas. While most of the resulting hydrogen chloride gas will dissolve within water 401 present within a lower portion of the combustion chamber thereby dissolving, releasing a latent heat of dissolution, and transforming into hydrochloric acid (thereby acidifying that water), the small portion of the hydrogen chloride gas that forms within the acidification pipe will flow down through that acidification pipe (as either hydrogen chloride gas or, if dissolved into water present within the acidification pipe, as hydrochloric acid) until it is drawn into the stream of reservoir water flowing to the anode of the seawater electrolyzer (not visible, 368 in FIG. 16).

Any increase in the acidity of the water 401 within the combustion chamber 339 tends to equilibrate with the water within the hydrochloric acid storage tanks 308 and 309 as the water 401 diffuses 354 into that water within the hydrochloric acid storage tanks through an aperture 353 in the wall of a lower part of the combustion chamber.

Each of the embodiment's two water turbines, e.g., 325, (only one 325 of which is visible in FIG. 18) is comprised of an inner turbine rotor, e.g., 402, which rotates within an outer turbine housing, e.g., 403, forming a rim-drive generator. With respect to the embodiment illustrated in FIGS. 7-18, the turbine rotor contains, incorporates, and/or includes magnets about a peripheral surface, and the turbine housing contains generator stator coils which are energized by, and/or produce electrical currents and voltages in response to, a rotation of the complementary and/or respective turbine rotor. Wires (not shown) connect the generators to the requisite loads, e.g., the electrolyzer.

Figure 19:
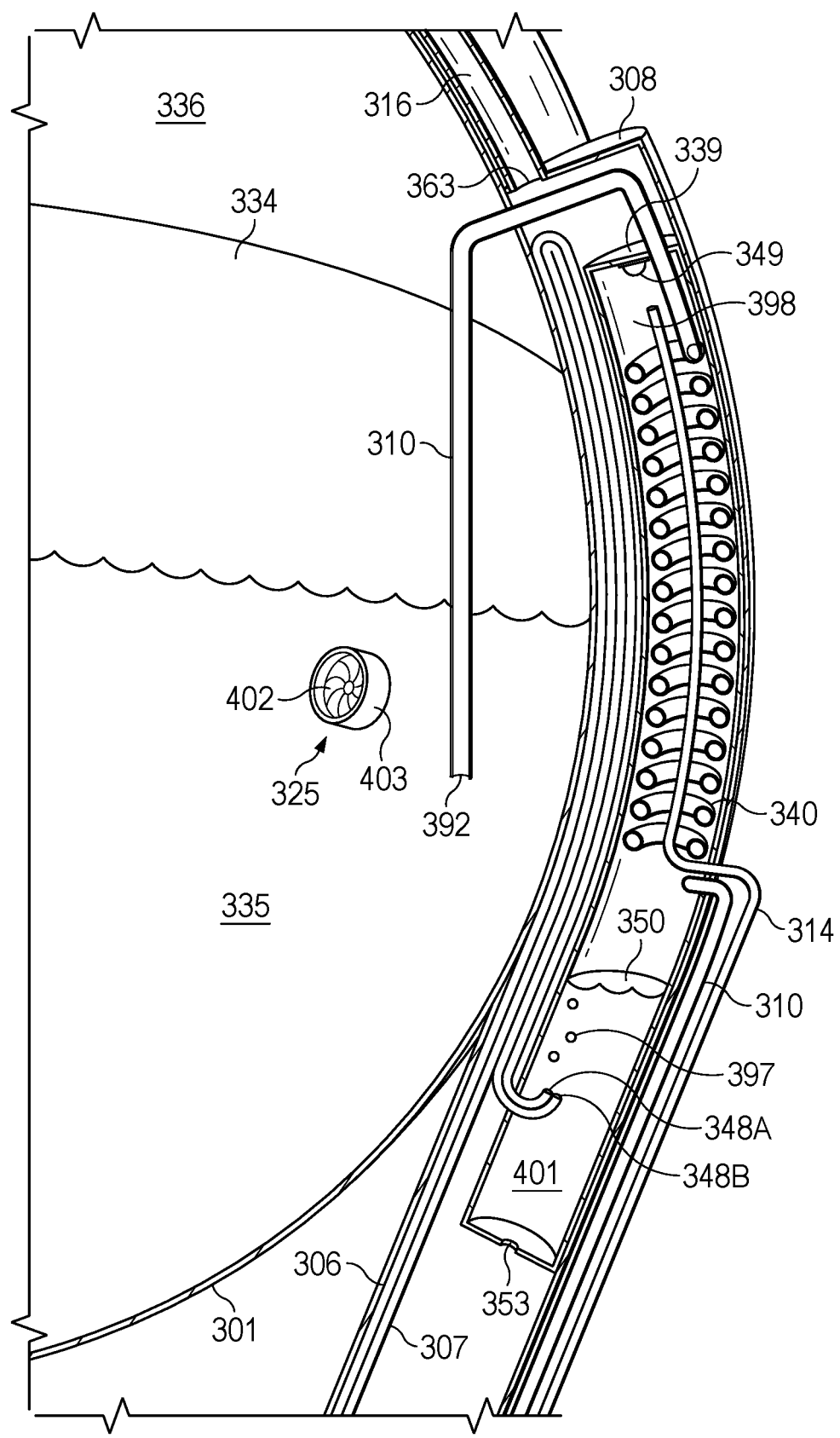
FIG. 19 is a perspective view of the close-up view of FIG. 18.

FIG. 19 is a perspective view of the close-up side sectional view of FIG. 18.

Hydrogen gas produced at the cathode of the seawater electrolyzer (not visible, 368 in FIG. 16) flows up and through hydrogen gas tube 306 and is released, and/or emitted from a mouth 348A at an upper end of the hydrogen gas tube positioned within the combustion chamber 339. Chlorine gas produced at the anode of the seawater electrolyzer flows up and through chlorine gas tube 307 and is released, and/or emitted from a mouth 348B at an upper end of the chlorine gas tube positioned within the combustion chamber.

Figure 20:
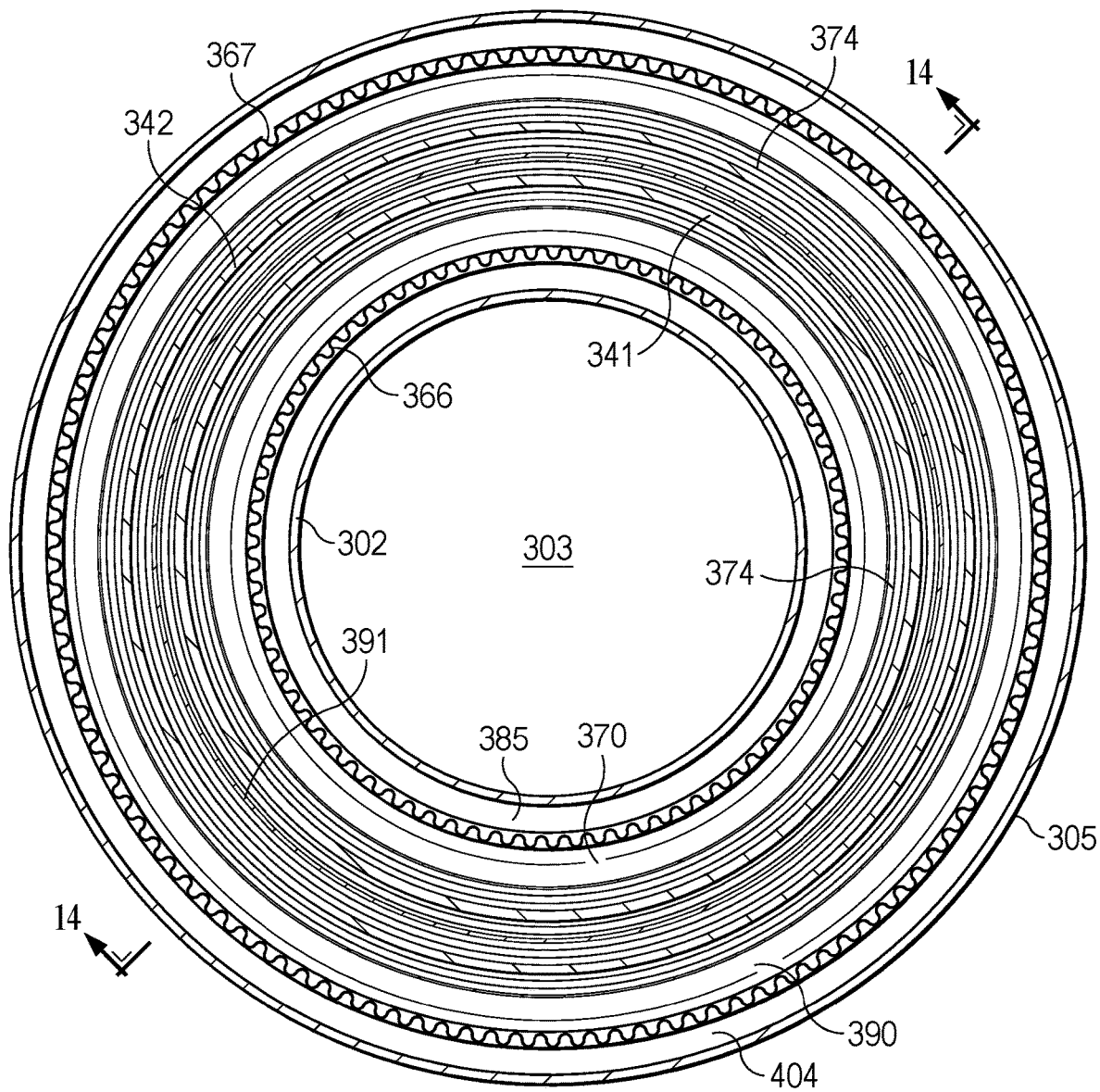
FIG. 20 is a top-down sectional view of the third embodiment.

FIG. 20 shows a top-down sectional view of the same embodiment that is illustrated in FIGS. 7-19. The section plane is taken along section line 20-20 of FIG. 16.

Figure 21:
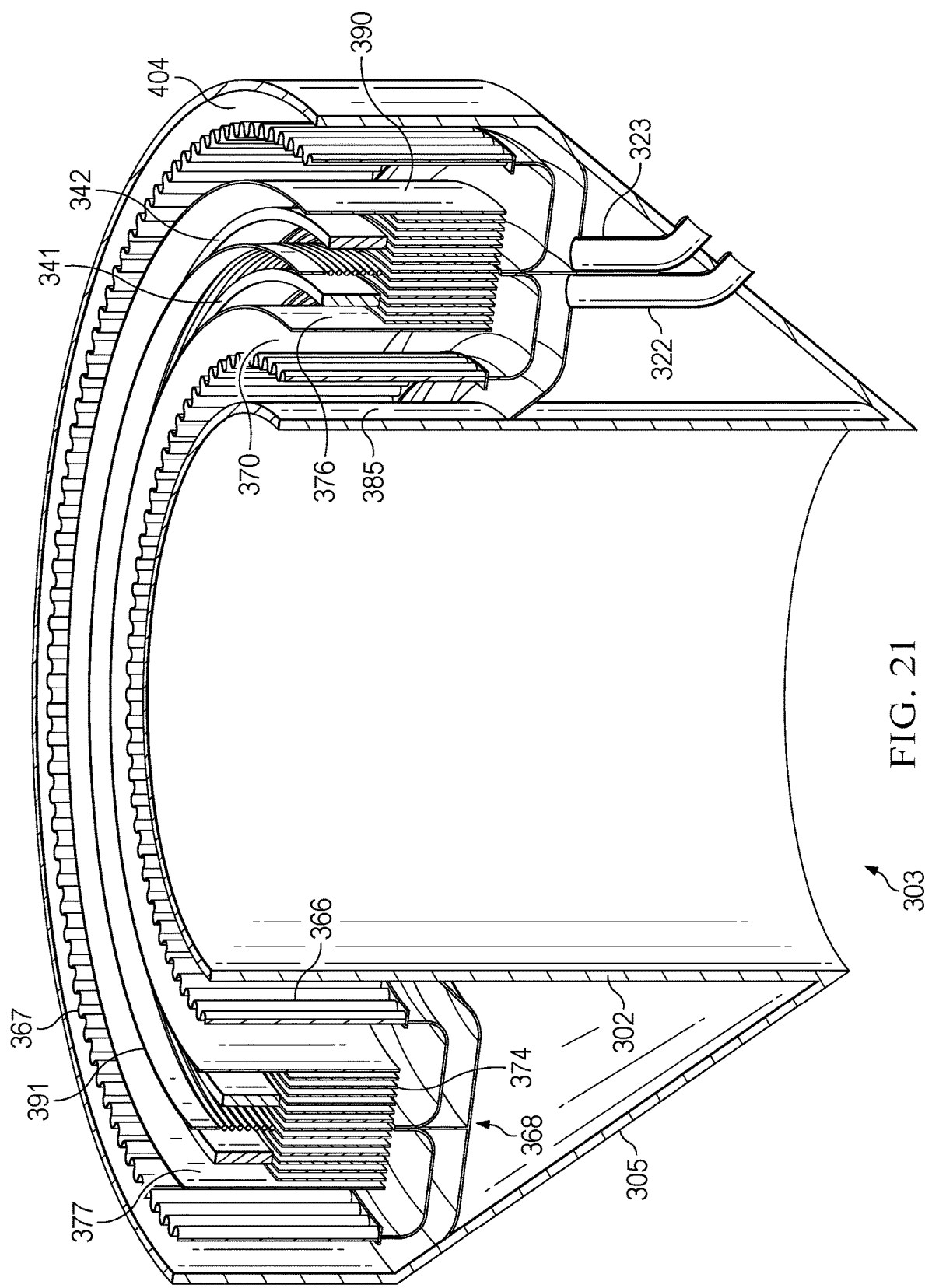
FIG. 21 is a perspective top-down and side sectional view of the third embodiment.

FIG. 21 shows a perspective sectional view of the same embodiment that is illustrated in FIGS. 7-20. The section planes are taken along section line 14-14 of FIGS. 12, 13, and 21, and along section line 20-20 of FIG. 16.

Figure 22:
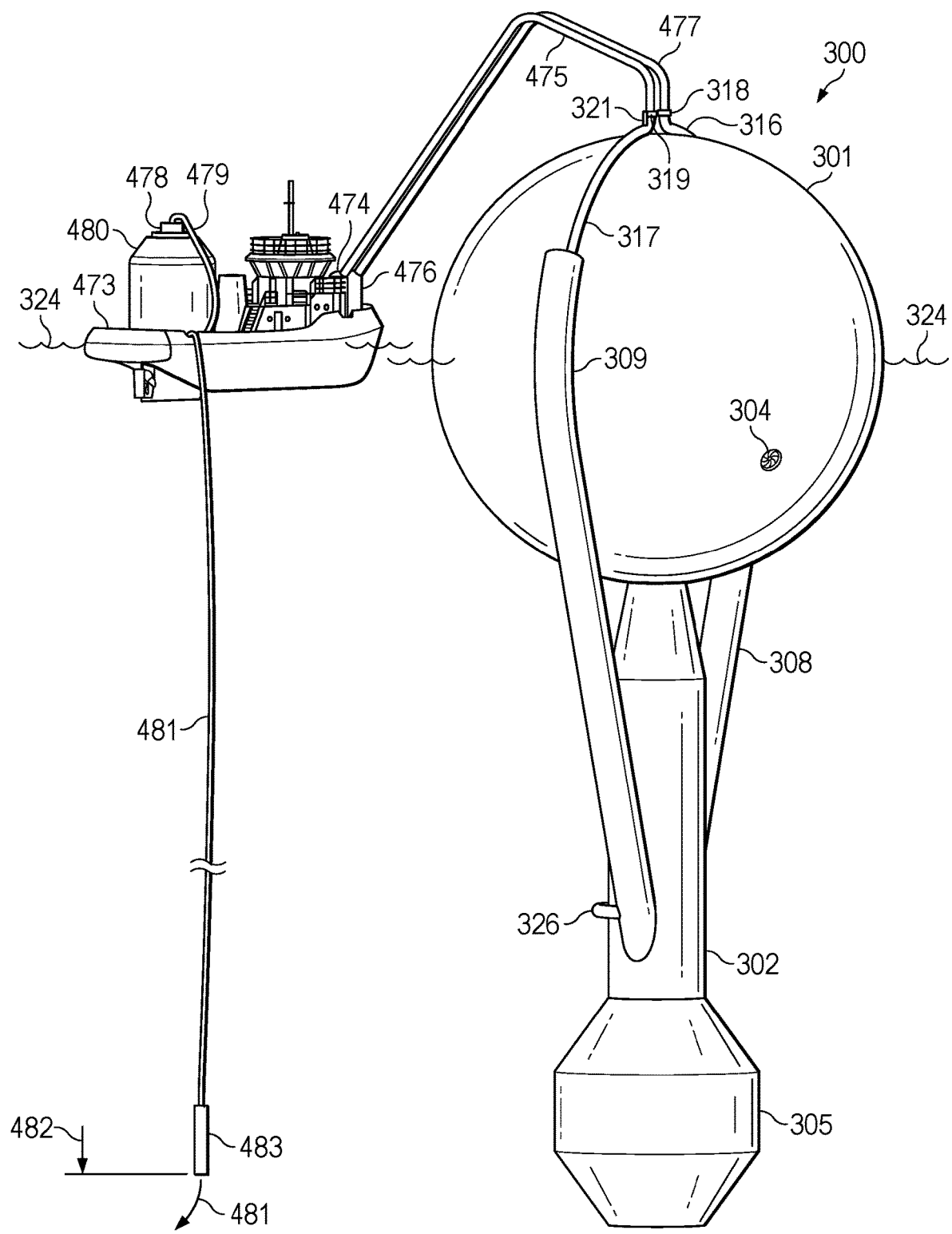
FIG. 22 is a perspective side view of an offtake ship removing hydrochloric acid from the third embodiment.

FIG. 22 is a perspective side view of another embodiment comprising an offtake ship 473 removing hydrochloric acid from the embodiment that is illustrated in FIGS. 7-21.

An offtake ship 473 approaches, and holds a position relative to, an embodiment 300 of the present disclosure. By adjusting the orientation of a rotatable effluent hose-crane base 474, in combination with adjustments of motorized articulating joints (not shown), an operator of the offtake ship positions a crane-supported offtake effluent hose 475 so that, and/or until, the hose's offtake effluent valve (at a distal end of offtake effluent hose 475, and not visible in its connected position within the embodiment's offtaking effluent valve 319) is aligned with, and mates to, its complementary offtaking effluent valve 319), thereby creating a fluid connection between the offtaking ship's offtake effluent hose 475 and an interior of the embodiment's offtaking effluent pipe 317, which, in turn, is fluidly connected to a hollow interior of, and the hydrochloric acid solution contained within, the hydrochloric acid storage tank 309.

Likewise, the operator of the offtake ship 473 adjusts the orientation of a rotatable replacement hose-crane base 476, in combination with adjustments of motorized articulating joints (not shown), in order to position a crane-supported offtake replacement hose 477 so that, and/or until, the hose's offtake replacement valve (at a distal end of offtake replacement hose 477, and not visible in its connected position within the embodiment's offtaking replacement valve 318) is aligned with, and mates to, its complementary offtaking replacement valve 318), thereby creating a fluid connection between the offtaking ship's offtake replacement hose 477 and an interior of the embodiment's offtaking replacement pipe 316, which, in turn, is fluidly connected to a hollow interior of, and the hydrochloric acid solution contained within, the hydrochloric acid storage tank 308.

The offtake ship 473, after fluidly connecting its offtake effluent hose 475 to the embodiment's offtaking effluent pipe 317 (via the fluid connection of the offtake effluent valve (not visible) of the offtake effluent hose 475 and the embodiment's offtaking effluent valve 319), and after fluidly connecting its offtake replacement hose 477 to the embodiment's offtaking replacement pipe 316 (via the fluid connection of the offtake replacement valve (not visible) of the offtake replacement hose 477 and the embodiment's offtaking replacement valve 318), then initiates a pumping of seawater into and through the offtake replacement hose 477, thereby displacing hydrochloric acid solution within the hydrochloric acid storage tank 308, while, at approximately the same time, initiates a hydrochloric acid pump 478 which draws hydrochloric acid solution from a hydrochloric acid feed pipe 479 which is fluidly connected to the ship's offtake effluent hose 475 and deposits that hydrochloric acid solution into a hydrochloric acid storage tank 480. The combination of the ship's pumping of seawater into the embodiment's offtaking replacement pipe 316, and its pumping of hydrochloric acid solution from the embodiment's offtaking effluent pipe 317, results in a transfer of hydrochloric acid solution from an interior of the embodiment's hydrochloric acid storage tanks 308 and 309 (which are fluidly interconnected by tank connecting pipe 326) to an interior of the offtake ship's hydrochloric acid storage tank 480.

Due to the "pushing" of hydrochloric acid solution from the hydrochloric acid storage tanks 308 and 309 of the embodiment through an introduction and/or pumping of seawater into hydrochloric acid storage tank 308, the hydrochloric acid solution removed from the embodiment will experience some dilution (as the hydrochloric acid solution within the hydrochloric acid storage tanks 308 and 309 mixes with the seawater introduced to hydrochloric acid storage tank 308). When a sensor (not shown) onboard the offtake ship 473 determines that the concentration of the hydrochloric acid solution being removed from the embodiment has fallen to or below a threshold minimum concentration, the operator of the offtake ship will end the pumping of seawater into and through offtake replacement hose 477, and will instead pump atmospheric air into that hose, thereby continuing the displacement of hydrochloric acid solution within the hydrochloric acid storage tanks 308 and 309, and facilitating a removal and/or transfer of that hydrochloric acid solution by and/or to the offtake ship.

After the offtake ship has removed a sufficient amount and/or volume of hydrochloric acid solution from the hydrochloric acid storage tanks 308 and 309, an upper surface (350 in FIG. 14) of the hydrochloric acid solution falls to a point that is below the lower mouth (362 in FIG. 14) of the embodiment's offtaking effluent pipe 317 after which the offtake ship can no longer remove hydrochloric acid solution from the hydrochloric acid storage tanks 308 and 309 and continued pumped removal of fluid from those hydrochloric acid storage tanks draws air into the offtake ship's 473 offtake effluent hose 475.

After the desired and/or requisite amount of hydrochloric acid solution has been removed from the hydrochloric acid storage tanks 308 and 309 of the embodiment, the offtake ship 473 disconnects the offtake effluent valve (not visible) of its offtake effluent hose 475 from the offtaking effluent valve 319 of the embodiment (thereby causing that valve to close), and it disconnects the offtake replacement valve (not visible) of its offtake replacement hose 477 from the offtaking replacement valve 318 of the embodiment (thereby causing that valve to close).

The offtake ship is equipped with a discharge hose 481 through which hydrochloric acid solution from an interior of the offtake ship's hydrochloric acid storage tank 480 is passively and continuously discharged 481 at and/or to a significant depth 482, e.g., a depth of approximately 2 kilometers, thereby sequestering the acid in the nominally alkaline depths of the sea. A discharge nozzle 483 at a distal and/or lower end of the discharge hose 481 inhibits degradation of the lower end of the flexible portion of the discharge hose as well as provides weight and a corresponding downward tension in the discharge hose that tends to inhibit excessive lifting and bending of the discharge hose, e.g., as might occur in response to, and/or as a consequence of, strong underwater currents.

An alternate embodiment of the offtake ship lacks a discharge hose, and/or lacks a discharge hose of significant length. This alternate offtake ship, after offloading hydrochloric acid solution from a hydrochloric-acid producing embodiment, e.g., 300, transports and/or delivers the offloaded hydrochloric acid solution stored in its hydrochloric acid storage tank 480 to another vessel, a seafloor-mounted platform, a floating platform, a barge, and/or a seaside port.

Another alternate embodiment of the offtake ship is autonomous. This alternate offtake ship automatically locates, approaches, and maintains its position adjacent to a hydrochloric-acid producing embodiment, e.g., 300, and then automatically offloads hydrochloric acid solution from the embodiment, before automatically disconnecting from that embodiment and processing the offloaded hydrochloric acid, e.g., discharging it to depth, and/or delivering it to a receiving vessel or port.

Figure 23:
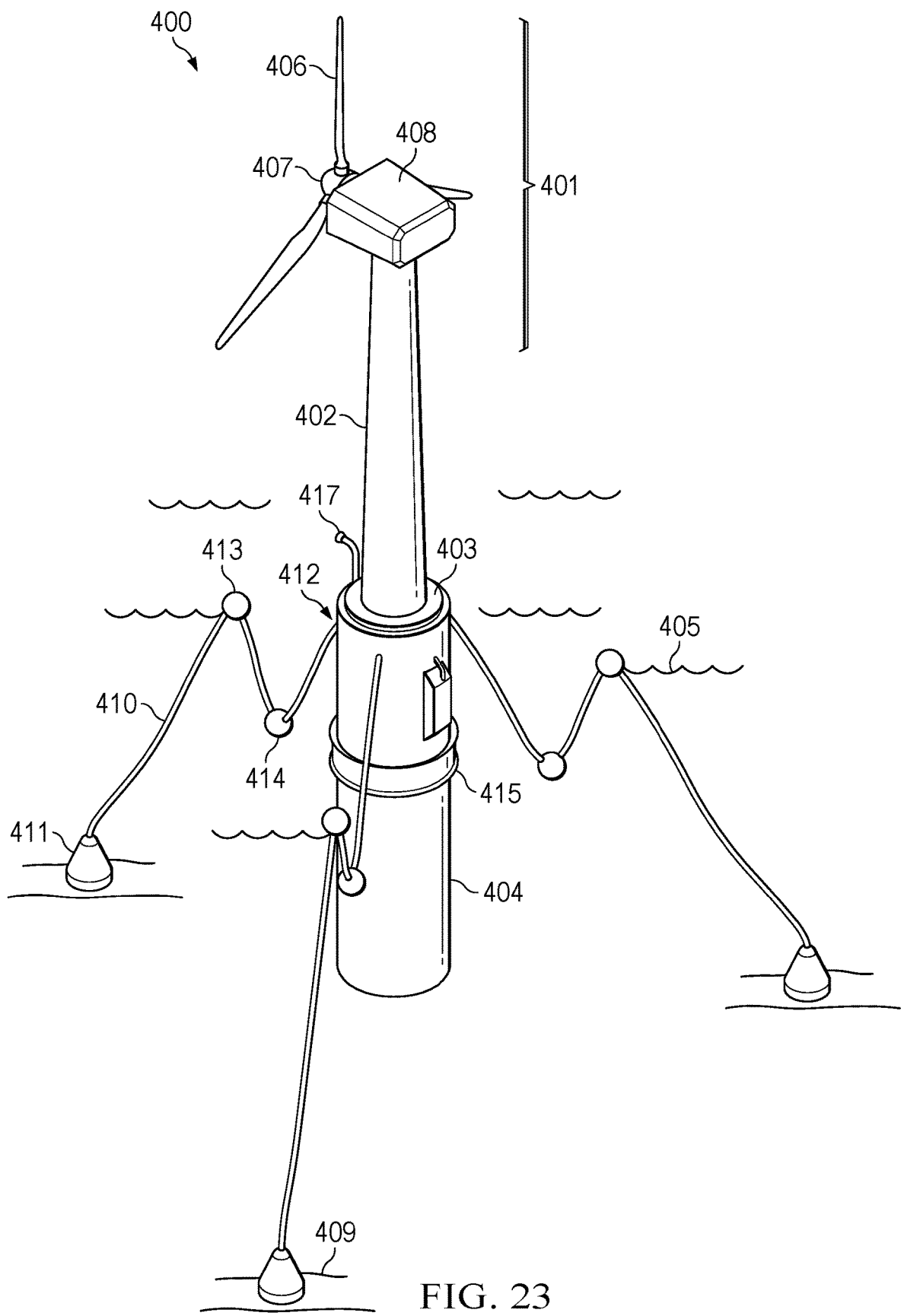
FIG. 23 is a perspective side view of a fourth embodiment of the present invention.

FIG. 23 shows a perspective side view of a fourth embodiment 400 of the present disclosure. The embodiment illustrated in FIG. 23 is a wind-energy-to-hydrochloric-acid conversion device, and it includes, incorporates, utilizes, and/or comprises, a wind turbine 401 rotatably mounted to an upper end of an approximately vertical turbine support strut 402. A turbine-strut mounting plate 403 affixed to a lower end of the turbine support strut, is affixed to an upper end of an approximately and/or nominally vertical and buoyant spar buoy 404 which floats adjacent to an upper surface 405 of a body of seawater and/or brackish water.

The embodiment's wind turbine 401 is a horizontal-axis wind turbine. The wind turbine comprises three turbine blades, e.g., 406, that are rotatably connected to a turbine hub 407. In response to a blowing of wind through the blades of the wind turbine, the turbine hub rotates thereby energizing an electrical generator (not visible) inside the wind turbine's nacelle 408, causing the electrical generator to produce electricity.

Because the wind turbine 401 is rotatably mounted to an upper end of the turbine support strut 402, the wind turbine tends to rotate so as to align the rotational axis of the wind turbine's hub 407 with the wind direction, i.e., the wind turbine tends to rotate so as to position the rotational axis of the wind turbine's hub to be parallel to the wind direction.

The embodiment 400 is moored to a seafloor 409 by three mooring cables, e.g., 410. A distal end of each mooring cable is attached to an anchor, e.g., 411, that rests upon the seafloor. A proximal end, e.g., 412, of each mooring cable is attached to an upper part and/or portion of the spar buoy 404. Intermediate floats, e.g., 413, and weights, e.g., 414, help to position, and/or to flexibly and/or elastically maintain and/or restore the position of, the embodiment 400 at a geospatial position above the seafloor, especially when it is buffeted by ocean waves, currents, and/or winds.

The embodiment 400 includes, incorporates, utilizes, and/ or comprises, a seawater electrolyzer (not visible) positioned within a hollow interior of the buoyant spar buoy 404. An electrolyzer cowling, manifold, and/or shroud 415 surrounds a plurality of coaxial cylindrical flow-straightening baffles (not visible), and passively directs a portion of the surrounding seawater 405 into and through those flow-straightening baffles when the spar buoy moves up and down in response to a passing wave, and/or as in response to a wave heave.

Mounted and/or affixed to an exterior surface of the embodiment's spar buoy 404 is a combustion chamber 416 in which hydrogen and chlorine gases produced by the seawater electrolyzer (not visible) are exothermically reacted so as to produce hydrogen chloride gas, which upon its dissolution into water reservoir becomes, and/or transforms into, hydrochloric acid therein. A portion of the hydrochloric acid produced within the combustion chamber is diluted and stored within a hydrochloric acid storage tank (not visible, positioned within a hollow interior of the spar buoy). A hydrochloric acid removal valve 417 is fluidly connected to a bottom portion of the hydrochloric acid storage tank and a hydrochloric removal vessel (not shown) periodically removes hydrochloric acid from the embodiment's hydrochloric acid storage tank by fluidly connecting a hydrochloric acid removal hose to the embodiment's hydrochloric acid removal valve.

Figure 24:
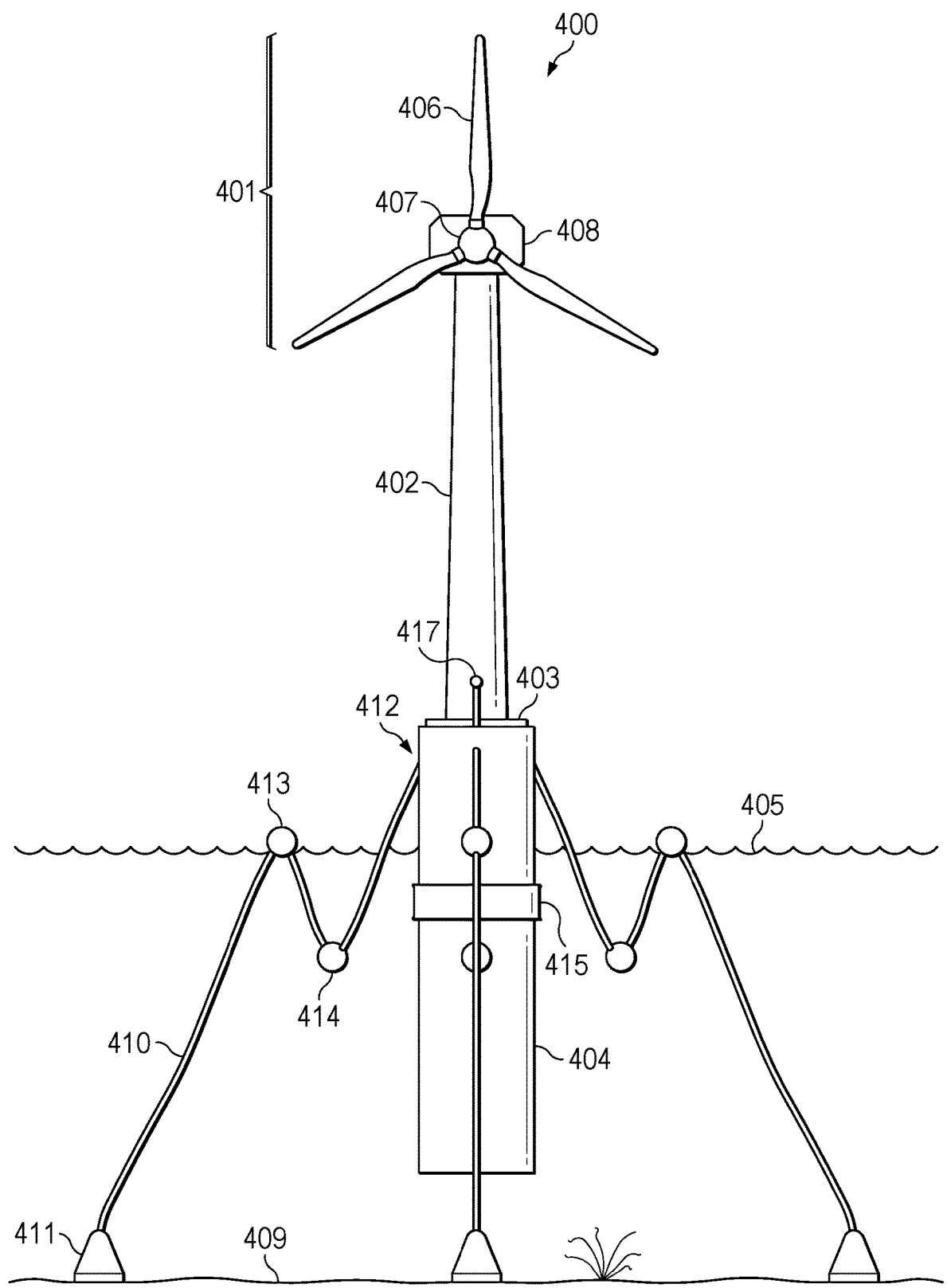
FIG. 24 is a side view of the fourth embodiment.

FIG. 24 shows a side view of the same embodiment 400 that is illustrated in FIG. 23.

Figure 25:
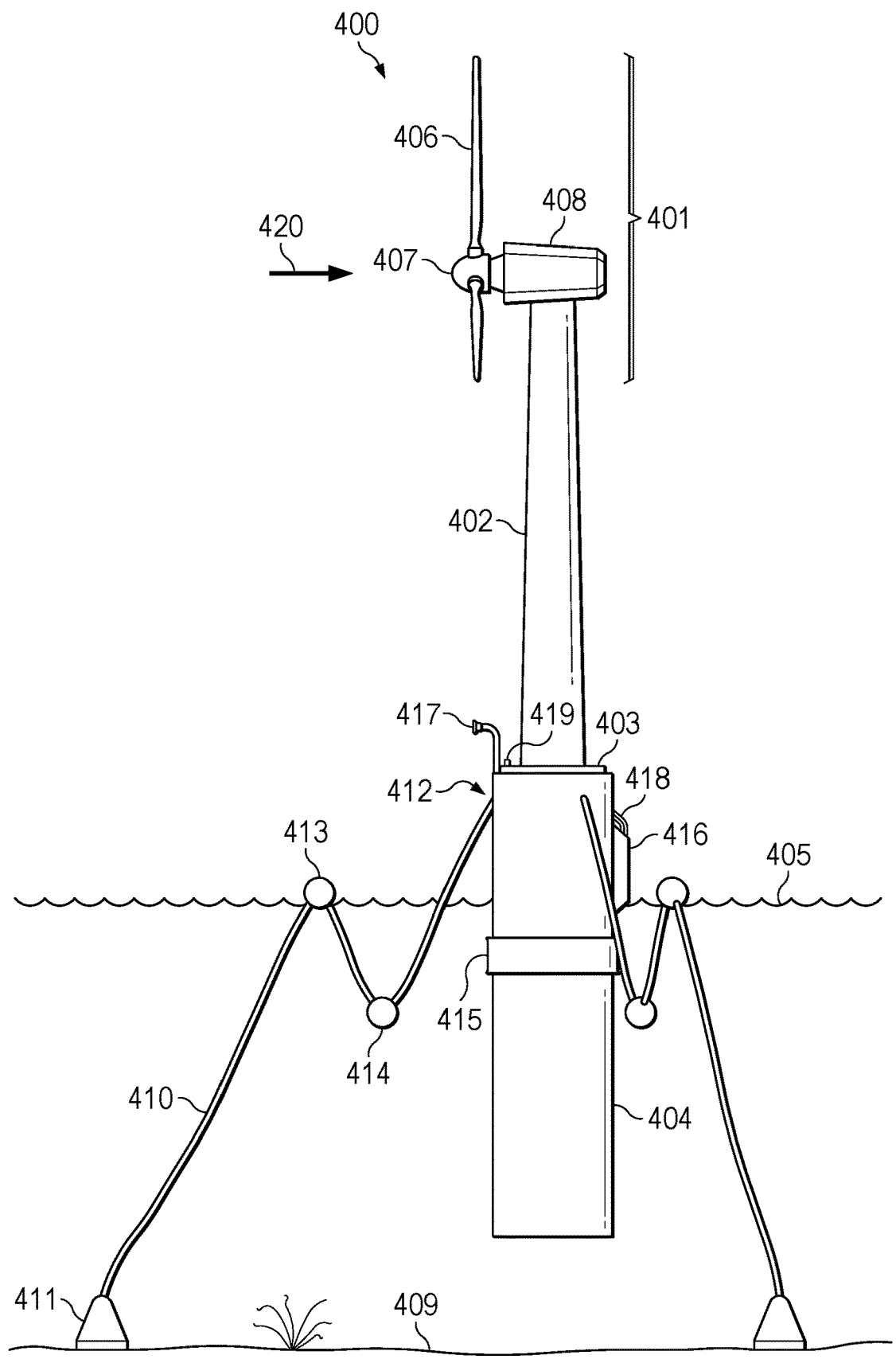
FIG. 25 is a side view of the fourth embodiment.

FIG. 25 shows a side view of the same embodiment 400 that is illustrated in FIGS. 23 and 24.

Hydrogen and chlorine gases produced and/or synthesized in the embodiment's seawater electrolyzer (not visible, and positioned within a hollow interior of the spar buoy 404) flow from the seawater electrolyzer to an interior of the combustion chamber 416 through a pair of electrolyzer gas pipes 418: a hydrogen gas pipe (not distinguishable), and a chlorine gas pipe (not distinguishable).

As hydrochloric acid is produced within the embodiment's combustion chamber 416 and flows into, and is diluted within, the embodiment's hydrochloric acid storage tank (not visible, and positioned within a hollow interior of the spar buoy 404), the volume of hydrochloric-acid solution within the hydrochloric acid storage tank increases. A pressure relief pipe 419 vents air from inside the hydrochloric acid storage tank to the atmosphere outside the embodiment.

When wind 420 flows and/or blows through the blades, e.g., 406, of the embodiment's wind turbine 401, a generator operatively connected to the wind turbine hub 407 and positioned inside the wind turbine's nacelle 408 is energized and produces electrical power that is transmitted via an electrical cable (not visible) to the embodiment's seawater electrolyzer (not visible). And, when so energized, the embodiment's seawater electrolyzer synthesizes hydrogen gas from hydronium ions in the seawater, and it synthesizes chlorine gas from chloride ions in the seawater, which gases flow separately and without mixing to the combustion chamber 416 through a pair of electrolyzer gas pipes 418.

Figure 26:
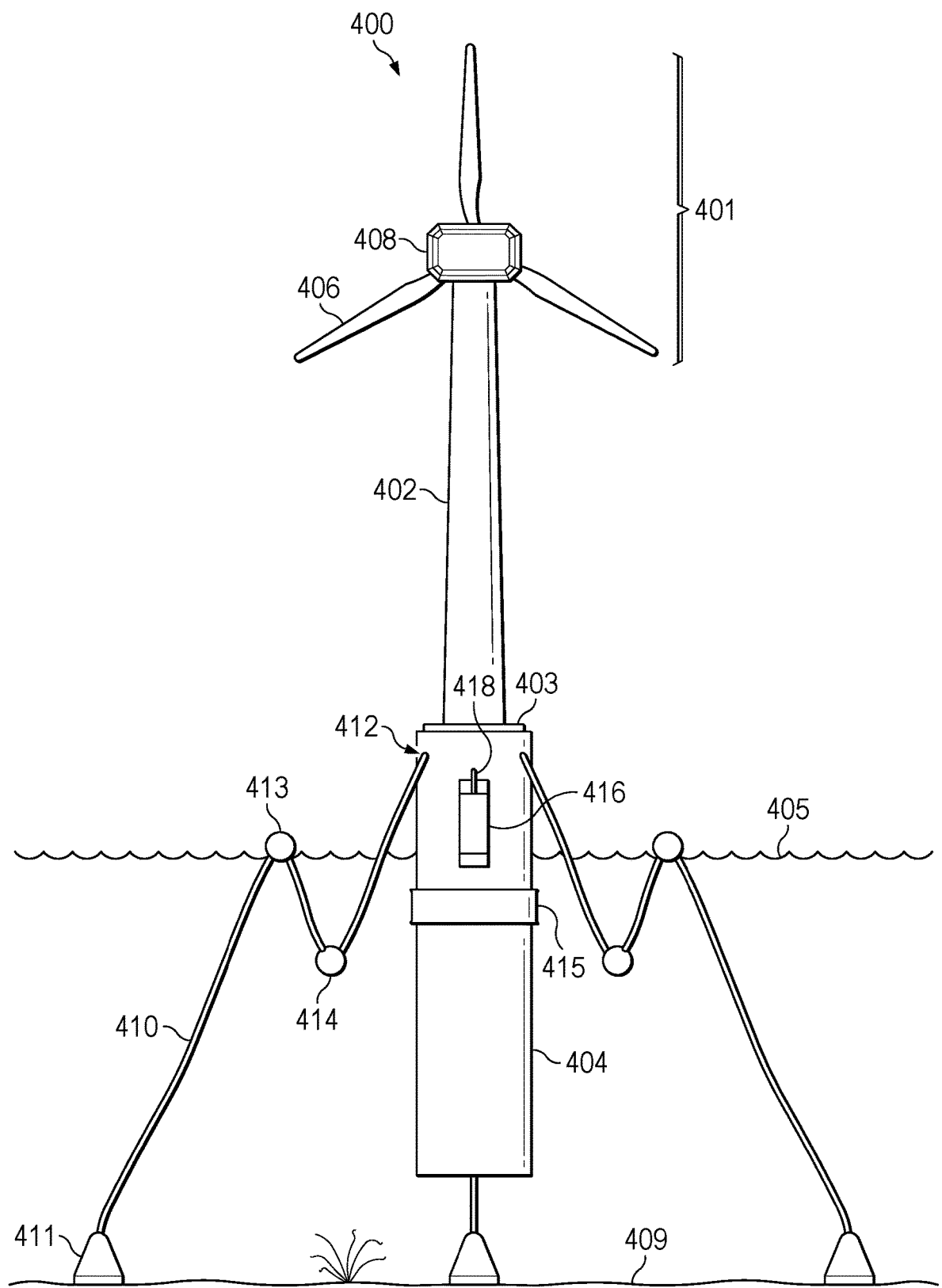
FIG. 26 is a side view of the fourth embodiment.

FIG. 26 shows a side view of the same embodiment 400 that is illustrated in FIGS. 23-25.

Figure 27:
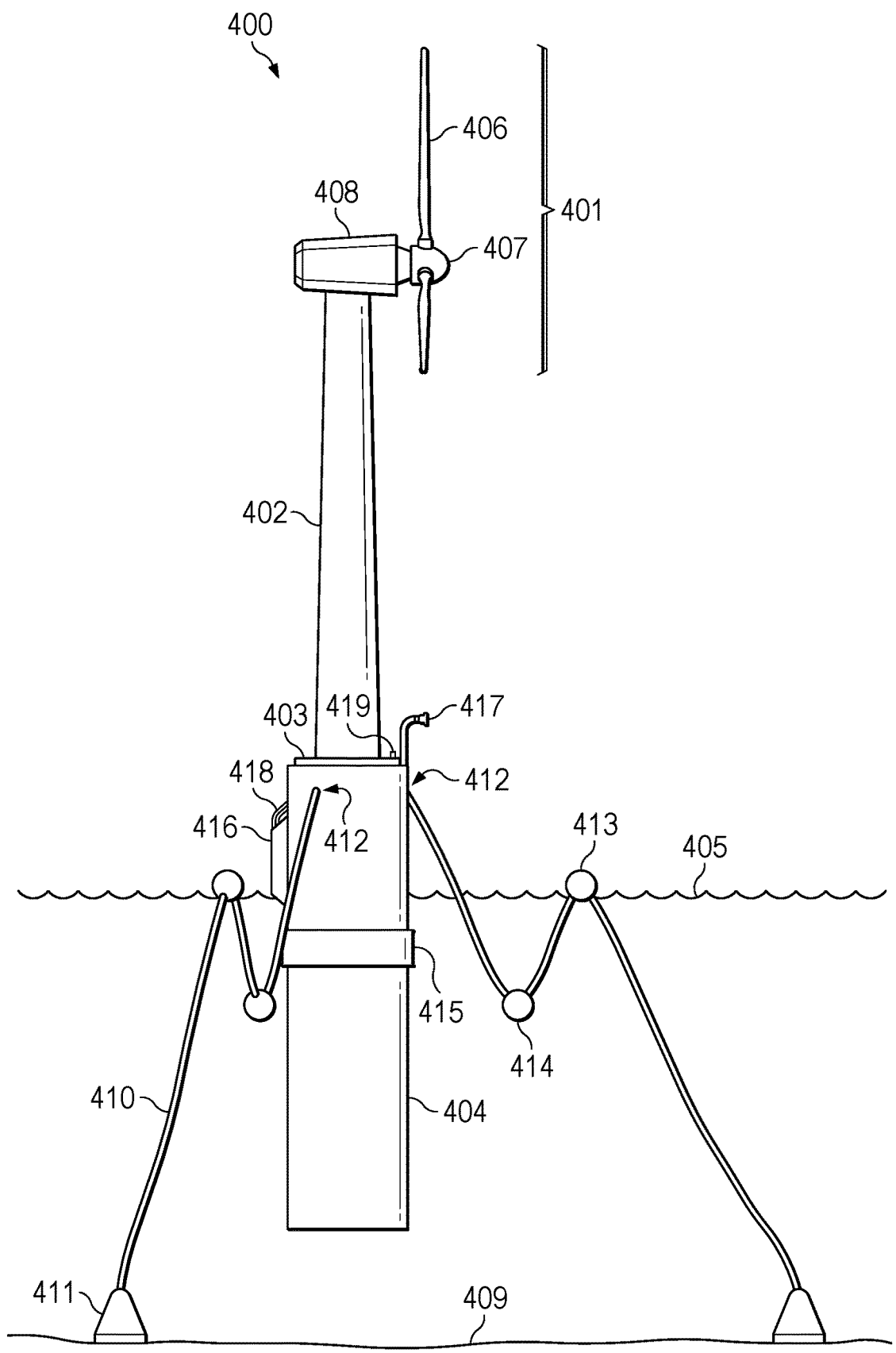
FIG. 27 is a side view of the fourth embodiment.

FIG. 27 shows a side view of the same embodiment 400 that is illustrated in FIGS. 23-26.

Figure 28:
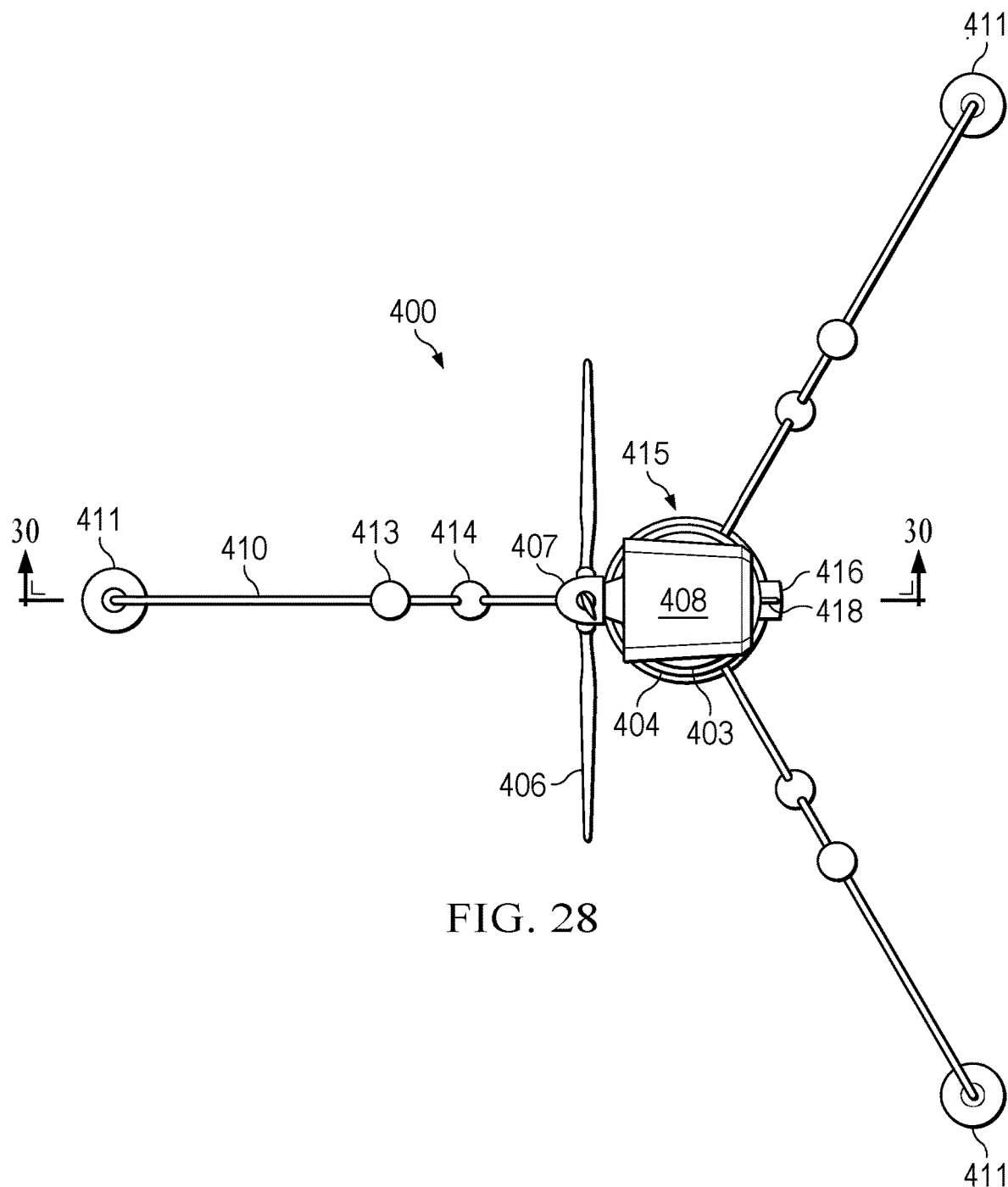
FIG. 28 is a top-down view of the fourth embodiment.

FIG. 28 shows a top-down view of the same embodiment 400 that is illustrated in FIGS. 23-27.

Figure 29:
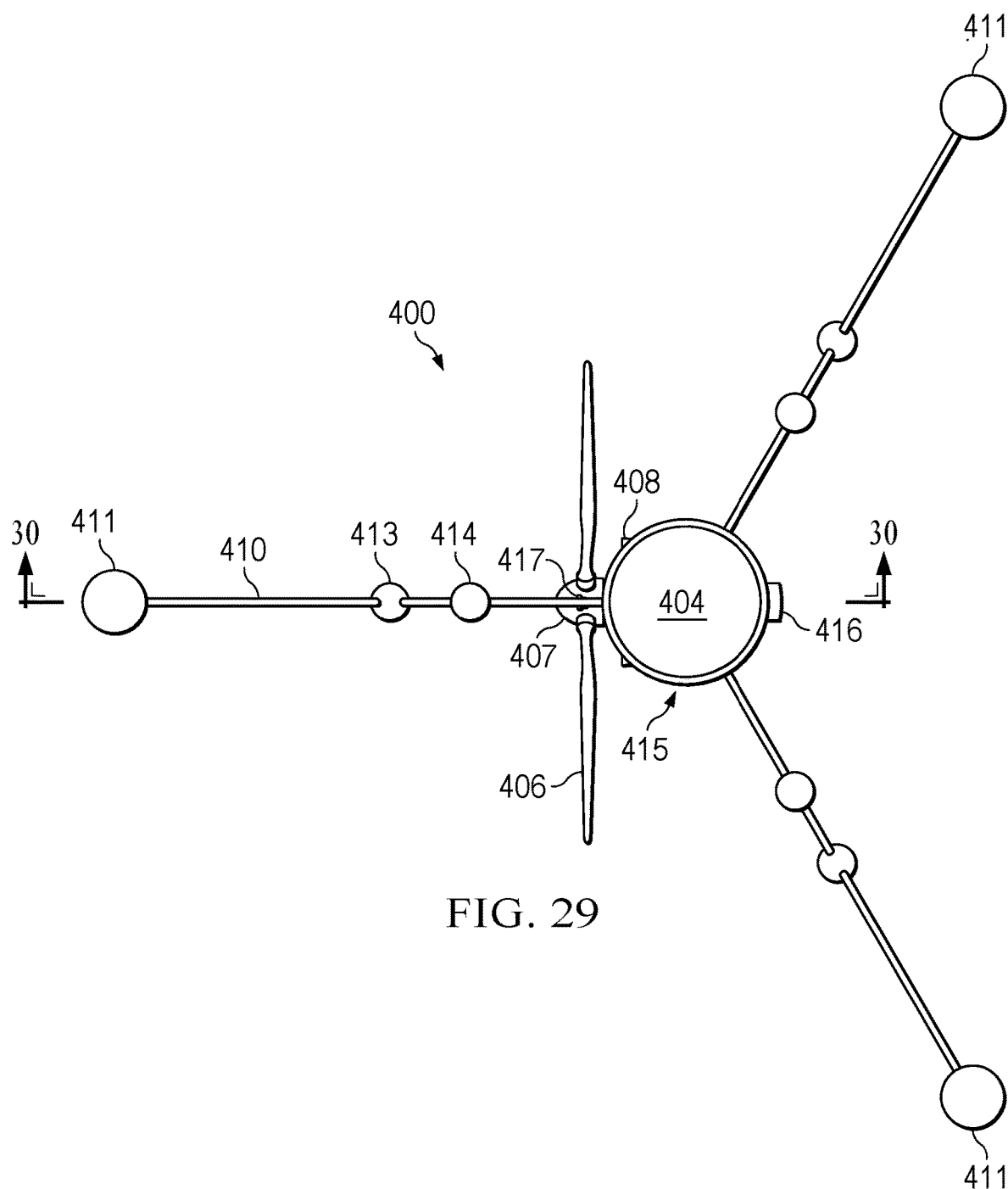
FIG. 29 is a bottom-up view of the fourth embodiment.

FIG. 29 shows a bottom-up view of the same embodiment 400 that is illustrated in FIGS. 23-28.

Figure 30:
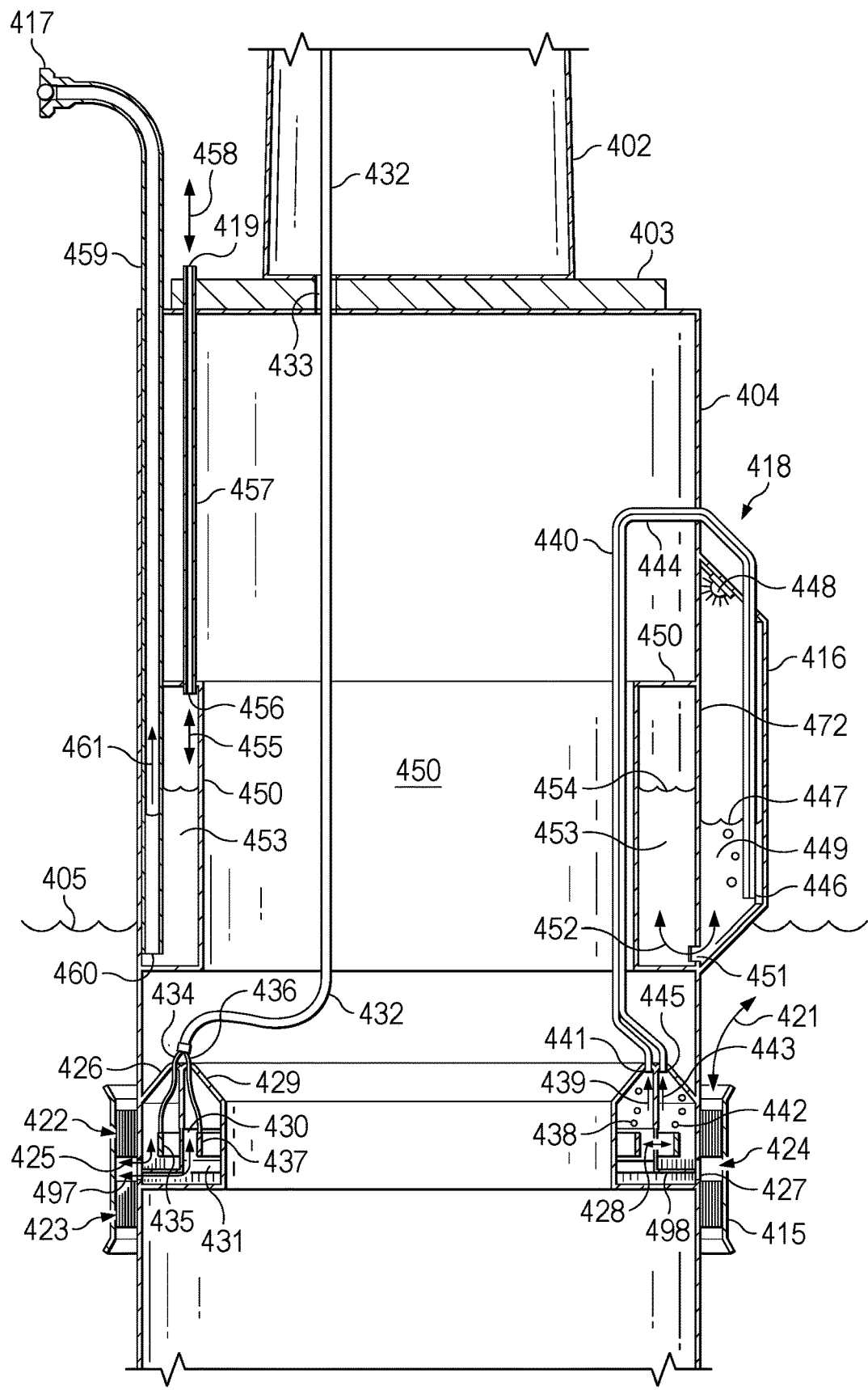
FIG. 30 is a close-up view of a portion of a side sectional view of the fourth embodiment.

FIG. 30 shows a close-up portion of a side sectional view of the same embodiment that is illustrated in FIGS. 23-29. The section plane is taken along section line 30-30 of FIGS. 28 and 29.

As waves heave at the embodiment (400 in FIGS. 23-27), seawater 405 tends to flow 421 in and out of the annular electrolyzer cowling 415, thereby tending to flow through the upper 422 and lower 423 annular vertical flow-straighteners, and therethrough into and out of a flow-straightened electrolyte-refresh pocket 424. Each of the upper and lower annular flow-straighteners is comprised of a plurality of vertically-oriented cylindrical surfaces, plates, and/or sheets, coaxial with a vertical longitudinal axis of the spar buoy 404, and each of the upper and lower annular flow-straighteners reduces turbulence in the water flowing from the body of water 405 into and out of the electrolyte-refresh pocket.

Each of the electrolyzer's two chambers, i.e., the cathodic electrolyzer chamber 429, and the anodic electrolyzer chamber 426, is independently and/or separately fluidly connected to the electrolyte-refresh pocket 424. So, as seawater flows in and out of that electrolyte-refresh pocket, it also flows 425, independently, in and out of the anodic electrolyzer chamber 426, thereby refreshing the chloride ion content of the water around the anode (enabling an oxidation of chloride ion to chlorine gas), and it flows 497, independently, in and out of the cathodic electrolyzer chamber 429, thereby preventing a buildup, and/or accumulation, of hydroxide ions (which if they were to flow to the anodic chamber could interfere with the production of chlorine gas).

The independent flows of seawater from the electrolyte-refresh pocket top each of the anodic and cathodic electrolyzer chambers is facilitated by an approximately horizontal plate 498 that separates the two electrolyzer chambers and divides the in and out flow of seawater between those electrolyzer chambers and the electrolyte-refresh pocket.

As seawater 405 flows into and out from the embodiment's electrolyte-refresh pocket 424, it also tends to flow 425 into and out from the anodic electrolyzer chamber 426 through an annular array of seawater refresh apertures, e.g., 427. Some ions within the anodic electrolyzer chamber are able to flow 428 into the embodiment's cathodic electrolyzer chamber 429, and some ions within the cathodic electrolyzer chamber 429 are able to flow 428 into the embodiment's anodic electrolyzer chamber, through an annular semipermeable and/or microporous mesh or diaphragm 430 incorporated within the medial electrolyzer wall 431. The semipermeable microporous mesh allows certain ions to flow freely back and forth between the anodic and cathodic electrolyzer chambers, while inhibiting a more substantial and/or liberal exchange of water or gas therethrough. The relatively rapid rate at which the seawater within the anodic electrolyzer chamber 426 is refreshed, e.g., 425, tends to quickly restore a concentration of chloride (Cl−) ions depleted during the anode's oxidation of chloride ions to chlorine gas, and to quickly remove any hydroxide ions which may have migrated to, and/or into, the anodic electrolyzer chamber from the cathodic electrolyzer chamber. The relatively rapid rate at which the seawater within the cathodic electrolyzer chamber 429 is refreshed, e.g., 497, tends to quickly remove any hydroxide ions (OH−) which may accumulated during the cathode's reduction of hydronium ions (H3O+) to hydrogen gas.

The embodiment's wind-powered generator (not shown), that is positioned inside the embodiment's nacelle (not visible, 408 in FIGS. 23-28) and operatively connected to the embodiment's wind-turbine hub (407 in FIGS. 23-29) and wind-turbine blades (e.g., 406 in FIGS. 23-29), produces electrical power in response a blowing of a wind through its wind-turbine blades. A portion of the electrical power generated by the embodiment's generator is transmitted to the embodiment's electrolyzer 426 and 429 via and/or through an electrical cable 432 which passes from the generator to the electrolyzer through a via, conduit, and/or aperture 433 in a base of the embodiment's turbine support strut 402 and its turbine-strut mounting plate 403.

At an end of the electrical cable 432 proximate to the electrolyzer 426 and 429, the electrical cable splits with one portion, part, and/or conductor, i.e., the anodic electrical cable 434, being electrically connected to the electrolyzer's anodic electrode 435, and another portion, part, and/or conductor, i.e., the cathodic electrical cable 436, being electrically connected to the electrolyzer's cathodic electrode 437.

When the embodiment's generator (not shown) transmits electrical power to the anodic 435 and cathodic 437 electrodes of the embodiment's electrolyzer, the electrolyzer tends to produce, synthesize, and/or generate, hydrogen and chlorine gases. In response to electrical power from the embodiment's generator, the electrolyzer's cathodic electrode tends to produce, evolve, and/or generate, bubbles, e.g., 438, of hydrogen gas, which tend to rise 439 within the water inside the cathodic electrolyzer chamber 429 and thereby and therethrough flow into a hydrogen effluent pipe 440 through an aperture and/or mouth 441 in the hydrogen effluent pipe, said mouth 441 positioned inside an upper part and/or portion of the cathodic electrolyzer chamber. In response to electrical power from the embodiment's generator, the electrolyzer's anodic electrode tends to produce, evolve, and/or generate, bubbles, e.g., 442, of chlorine gas, which tend to rise 443 within the water inside the anodic electrolyzer chamber 426 and thereby and therethrough flow into a chlorine effluent pipe 444 through an aperture and/or mouth 445 in the chlorine effluent pipe, said mouth 445 positioned inside an upper part and/or portion of the anodic electrolyzer chamber.

The hydrogen and chlorine gases flow upward, and away from the electrolyzer 426 and 429, separately through respective hydrogen effluent 440 and chlorine effluent 444 pipes, with those gases tending to bubble out from respective apertures and/or mouths 446 in those gas effluent pipes, said mouths distal to the electrolyzer and positioned within the embodiment's annular combustion chamber 416. The hydrogen and chlorine gas bubbles released, emitted, and/or ejected, from the respective hydrogen effluent and chlorine effluent pipes bubble up to, and then through, an upper surface 447 of water within a lower part and/or portion of the combustion chamber, thereby combining, and/or mixing, with other hydrogen and chlorine gases produced within the embodiment's electrolyzer. An ultraviolet lamp 448 mounted at an upper end of an interior of the combustion chamber tends to ignite the chlorine and hydrogen gases therein, causing them to react, combust, and/or burn, thereby creating, producing, synthesizing, and/or making, from those chlorine and hydrogen gases, hydrogen chloride gas which quickly, if not immediately, dissolves in and/or into a combustion-chamber water reservoir 449 at a bottom end of the interior of the combustion chamber thereby becoming, producing, and/or creating, hydrochloric acid, the dissolution of which acidifies that combustion-chamber water reservoir.

The acidified combustion-chamber water reservoir is fluidly connected to an annular hydrochloric acid storage tank 450 via a hydrochloric-acid-equilibration aperture 451 at a bottom end of a wall 472 separating the combustion chamber and the hydrochloric acid storage tank. The water 453 (typically acidified) within the hydrochloric acid storage tank is able to, and does, receive hydrochloric acid from the relatively highly-acidified water 449 within the combustion-chamber water reservoir, through a free flow 452 of waters between the combustion-chamber water reservoir and the hydrochloric acid storage tank water.

As hydrogen and chlorine gases are combusted within the combustion chamber 416 thereby adding hydrochloric acid to the combustion-chamber water reservoir 449, and indirectly adding hydrochloric acid to the water 453 within the hydrochloric acid storage tank, the upper free surfaces 447 and 454 of water respectively within both the combustion-chamber water reservoir and the hydrochloric acid storage tank, rise as the respective volumes of acidified water within the combustion-chamber water reservoir and the hydrochloric acid storage tank increase. As the free surface 454 of the aqueous hydrochloric acid solution 453 within the hydrochloric acid storage tank rises, air within the hydrochloric acid storage tank flows 455 into a lower aperture 456 of a hydrochloric-acid-storage-tank vent pipe 457, and therethrough flows 458 into the atmosphere outside the embodiment through an upper aperture 419 of the hydrochloric-acid-storage-tank vent pipe, thereby tending to equilibrate the air pressure within the hydrochloric acid storage tank.

When a hydrochloric acid removal hose (not shown), e.g., deployed from a hydrochloric acid removal vessel (not shown), is fluidly connected to the embodiment's hydrochloric acid removal valve 417, then a pump fluidly connected to an end of the hydrochloric acid removal hose can reduce a pressure within that hydrochloric acid removal hose, and within the fluidly connected hydrochloric acid removal valve, and the fluidly connected hydrochloric acid effluent pipe 459, thereby tending to cause aqueous hydrochloric acid solution 453 to flow from the hydrochloric acid solution 453 within the hydrochloric acid storage tank 450 and into a lower aperture and/or mouth 460 of the hydrochloric acid effluent pipe, and therethrough to flow 461 up and through the hydrochloric acid effluent pipe, through the hydrochloric acid removal valve, through the hydrochloric acid removal hose, and to the hydrochloric removal vessel, e.g., where it is stored in a hydrochloric acid storage tank on and/or aboard the hydrochloric removal vessel.

Note that an interior of the spar buoy 404 of the embodiment illustrated in FIGS. 23-30 is hollow, e.g., and filled with air, in order to provide the embodiment with sufficient buoyancy to float adjacent to an upper surface 405 of the body of water on which it floats. However, a similar embodiment has an interior in which the otherwise empty and hollow spaces, e.g., excluding the electrolyzer and hydrochloric acid storage tank, is filled with a polyurethane foam or other substance, material, and/or filler, capable of excluding water in case a leak develops in an outer hull of the spar buoy.

Figure 31:
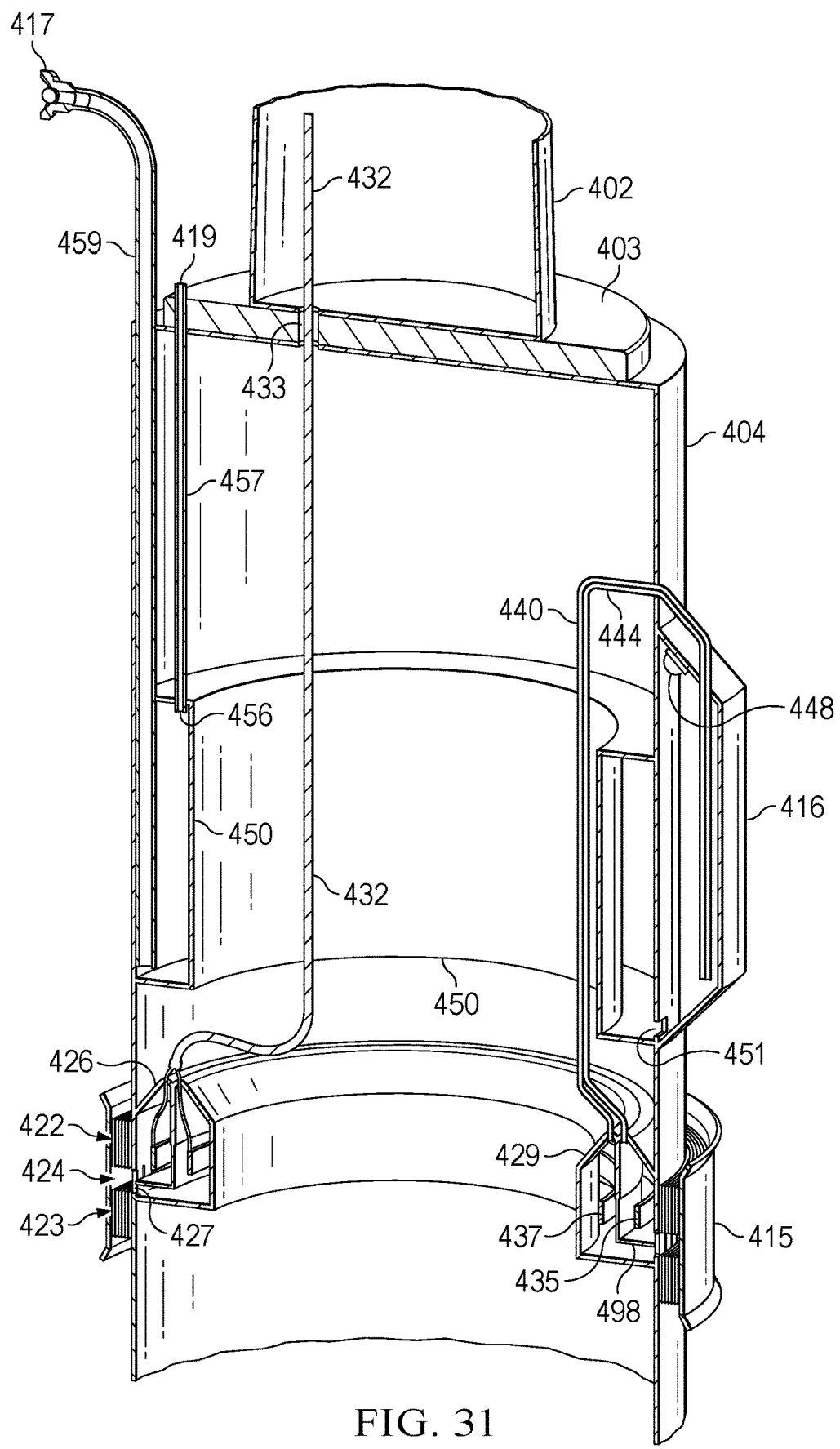
FIG. 31 is a perspective close-up view of a portion of a side sectional view of the fourth embodiment.

FIG. 31 shows a perspective view of a close-up portion of a side sectional view of the same embodiment that is illustrated in FIGS. 23-30. The section plane is taken along section line 30-30 of FIGS. 28 and 29.

Figure 32:
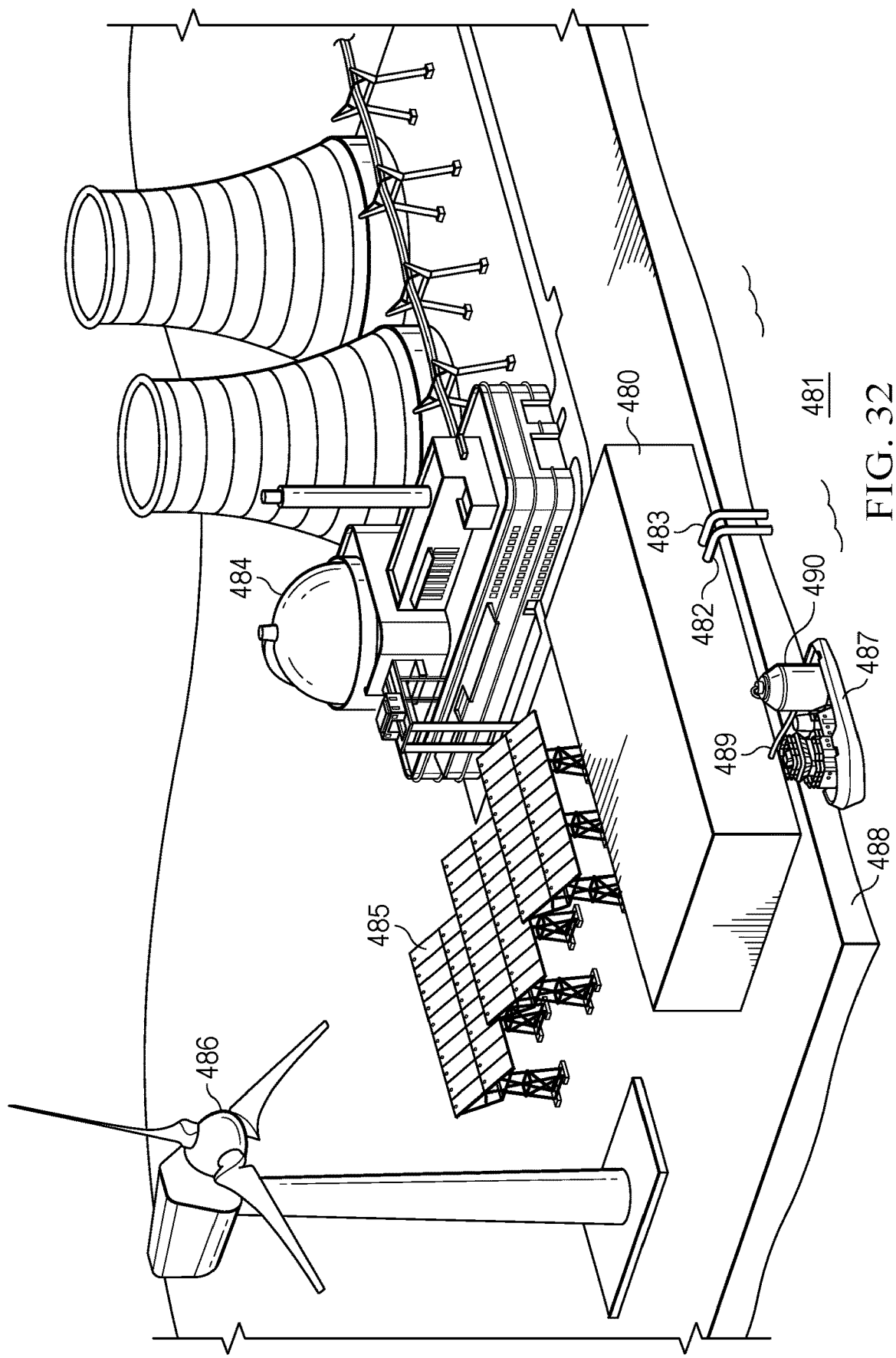
FIG. 32 is a perspective side view of a fifth embodiment of the present invention.

FIG. 32 shows a perspective view of a fifth embodiment of the present invention. A seawater and/or brine electrolysis apparatus, mechanism, and/or facility 480 pumps in, and/or receives, a flow of seawater from a body of seawater 481 through and/or via a fluid intake pipe 482. It returns waste fluid, e.g., seawater with a diminished and/or reduced chloride ion content, to the body of seawater through and/or via a fluid effluent pipe 483.

The seawater electrolysis facility 480 electrolyzes seawater (and/or a brine derived from seawater) so as to produce chlorine gas and hydrogen gas. It then reacts and/or combusts a mixture of those chlorine and hydrogen gases so as to produce hydrogen chloride gas which it dissolves into a reservoir of seawater so as to produce a highly acidified hydrochloric acid solution. The seawater into which the seawater electrolysis facility dissolves the hydrogen chloride gas that it produces is derived, extracted, and/or obtained, from a portion of the seawater that it receives from, through, and/or via, fluid intake pipe 482. Furthermore, a portion of the heat produced and/or generated by the combustion of the hydrogen and chlorine gases, as well as a portion of the heat produced by the dissolution of the resulting hydrogen chloride gas into water, is transferred to, and removed from the seawater electrolysis facility, by the water effluent flowing back to the body of water 481 through and/or via fluid effluent pipe 483.

The seawater electrolysis facility 480 is powered, and/or energized, by electrical power received from a nuclear power facility 484, a solar photovoltaic farm 485, and a wind turbine 486.

The scope of the present invention is not limited to the source of the electrical power which energizes the electrolyzer, the hydrogen-chlorine gas igniter, and/or any pumps involved. The scope of the present invention includes, but is not limited to, embodiments which are energized in full, or in part, by electrical power obtained and/or derived from: other types of solar energy technologies, e.g., concentrating solar power systems; geothermal plants; other types of wind energy technologies, e.g., offshore wind turbines, and high-altitude wind systems; hydropower systems, e.g., hydroelectric dams, and run-of-river electrical/turbine systems; ocean energy technologies, e.g., wave, tidal, and ocean-thermal, energy systems; biomass-powered electrical power generation systems; and fossil-fuel-powered electrical generation plants, e.g., electrical generation powered through the burning of natural gas.

The scope of the present invention is not limited to the location and/or the configuration of electrolyzer. The scope of the present invention includes, but is not limited to, embodiments positioned: adjacent to an upper surface of a body of seawater, e.g., being positioned within a buoy, barge, seafloor-mounted platform, floating platform, or surface water vessel; at a significant depth below an upper surface of a body of seawater, e.g., being positioned on or within the submerged tower of an offshore wind turbine; adjacent to a seafloor, e.g., being operatively connected to a wave energy device affixed to the seafloor; and, on land adjacent to a body of salty water, e.g., operatively connected to a solar farm adjacent to an ocean.

The scope of the present invention is not limited to a particular electrolysis fluidic substrate. The scope of the present invention includes, but is not limited to, embodiments comprising electrolyzers which produce and/or evolve hydrogen and chlorine gases from seawaters; concentrated brine solutions; mixtures of waters and chloride salts, e.g., sodium chloride; and, mixtures of waters and salt residues remaining after lithium salt extractions.

Periodically, an acid discharge vessel 487 travels to, and/or arrives at, the location of the seawater electrolysis facility 480, e.g., it arrives and moors at and/or adjacent to a wharf 488 adjacent to the seawater electrolysis facility. An intake pump (not shown) on the acid discharge vessel is fluidly connected to an acid supply hose 489 of the seawater electrolysis facility 480, and, after connection, hydrochloric acid solution is pumped from the seawater electrolysis facility and into a hydrochloric-acid storage tank 490 on the acid discharge vessel through the acid supply hose. After exhausting the supply of hydrochloric acid solution available from the seawater electrolysis facility, and/or after reaching the capacity of its hydrochloric-acid storage tank, the flow of hydrochloric acid solution into and/or through the acid supply hose is halted, the acid supply hose is disconnected from the acid discharge vessel, and the acid discharge vessel leaves the wharf to which it was moored and travels, and/or heads out, to a location in the body of water 481, and/or in a fluidly connected body of water, where a relatively alkaline fluid environment, e.g., located at or below a depth of 2 km, may be found.

Figure 33:
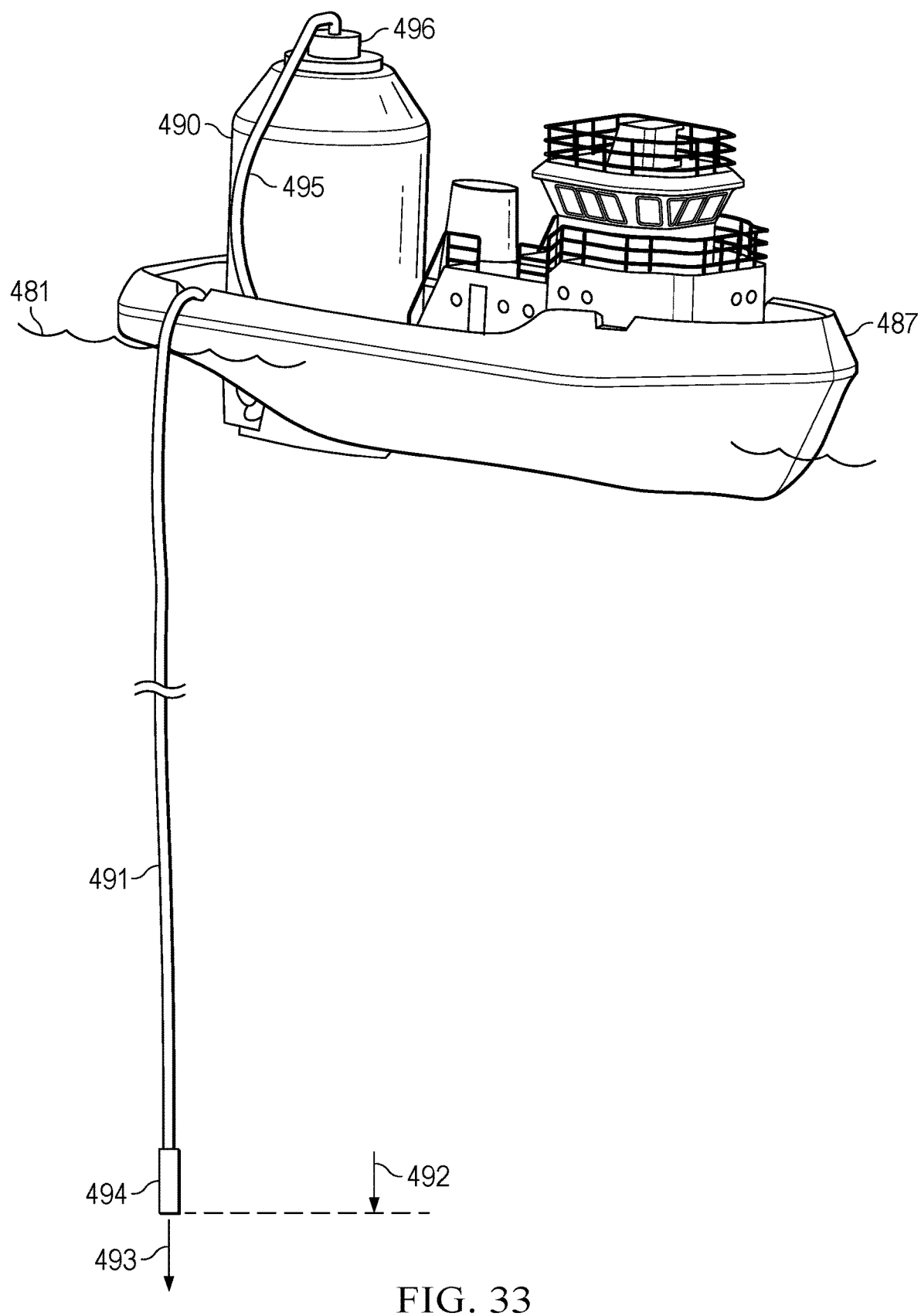
FIG. 33 is a perspective view of the fifth embodiment.

FIG. 33 shows a second perspective view of the fifth embodiment. After adding hydrochloric acid solution to its hydrochloric-acid storage tank 490 at a seawater electrolysis facility (e.g., 480 in FIG. 32), the acid discharge vessel 487 travels to a location in a body of water 481 at which sufficient depth, and/or favorable subsea alkalinity or chemistry, makes possible the acidic neutralization of hydrochloric acid. At that location, the acid discharge vessel deploys an acid discharge hose 491 to a depth 492 below which discharged 493 hydrochloric acid solution will be neutralized and sequestered for a substantial period of time, e.g., thousands of years, if not forever.

A weighted discharge nozzle 494 creates a downward tension within the deployed acid discharge hose 491 and promotes the structural integrity of the submerged end of the acid discharge hose, e.g., by reducing acid damage to the flexible elements of which the acid discharge hose is comprised and which might otherwise be exposed to the discharged hydrochloric acid at a sectioned submerged end of that hose.

The acid discharge hose 491 is fluidly connected to a storage tank pump hose 495 which, in turn, is fluidly connected to a storage tank pump 496, and, therethrough, to the hydrochloric acid solution within the hydrochloric-acid storage tank 490.

After discharging the contents of its hydrochloric-acid storage tank 490, the acid discharge vessel 487 returns, and/or travels back, to the same or another seawater electrolysis facility (e.g., 480 in FIG. 32) where it will refill its hydrochloric-acid storage tank and thereby initiate a repetition of the embodiment's storage-tank-fill and storage-tank-discharge-to-depth cycle.

Figure 34:
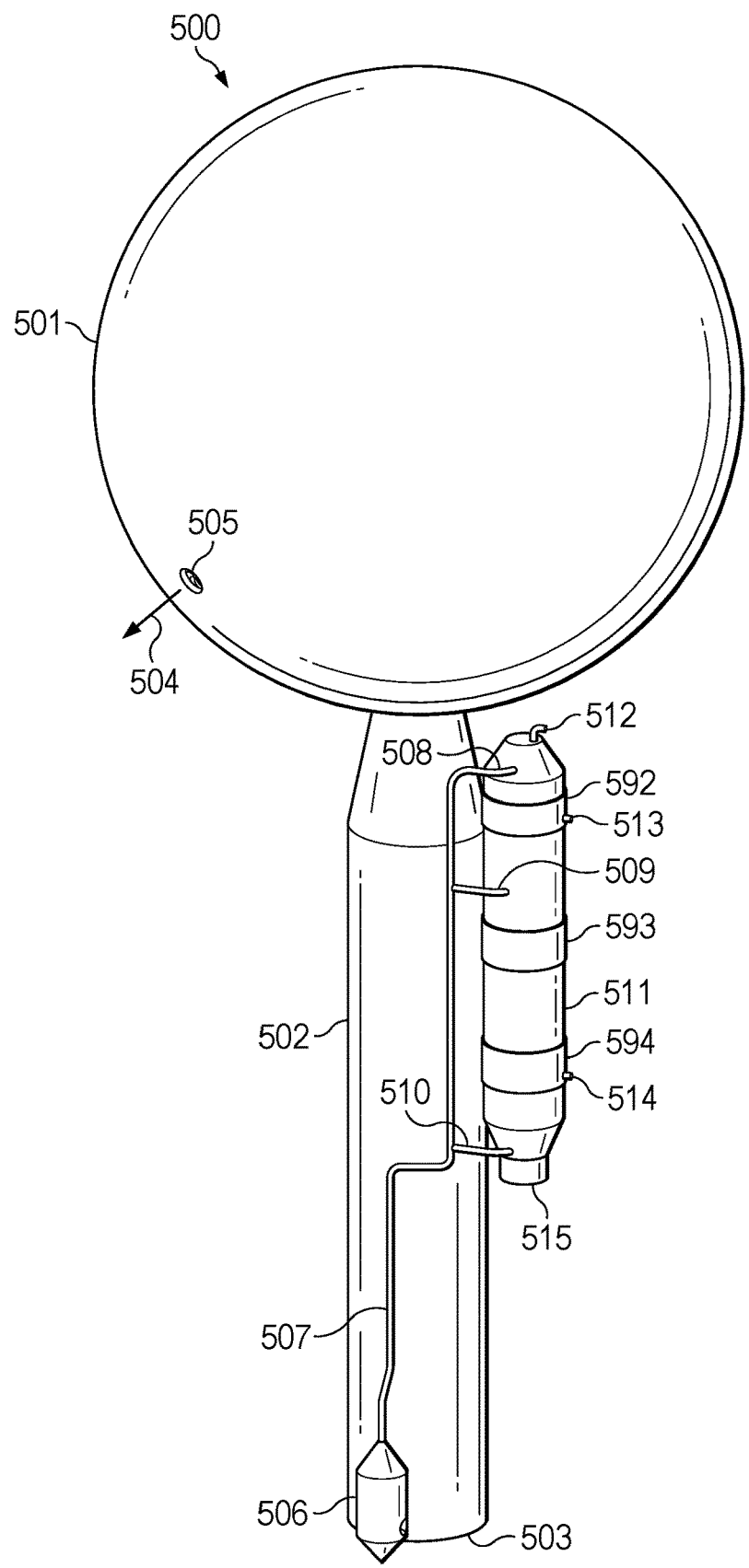
FIG. 34 is a perspective side view of a sixth embodiment of the present invention.

FIG. 34 shows a perspective view of a sixth embodiment 500 of the present invention.

This sixth embodiment of the present invention uses energy harvested from ocean waves to produce electrical power which it then uses to electrolyze seawater and create therefrom hydrogen and chlorine gases. The embodiment then combusts those gases in the presence of a reservoir of seawater so as to convert the combustion product hydrogen chloride gas into a solution of hydrochloric acid.

When the reservoir of hydrochloric-acid acidified seawater reaches, achieves, and/or is characterized by, a sufficiently low pH and/or a sufficiently high level of acidity, the embodiment decants the acidified solution into a tubular chamber wherein it is frozen, thereby forming a rigid rod of frozen aqueous hydrochloric acid solution.

The resulting rod of frozen hydrochloric acid solution is then released into the body of water on which the embodiment floats, whereupon it falls to, below, and/or beyond, a depth, e.g., 2 km, at which a natural alkalinity within the deep water neutralizes the hydrochloric acid, thereby sequestering that hydrochloric acid from a long period of time, e.g., millennia, and, concomitantly, alkalinizing the surface of the body of water on which the embodiment floats and from which it chemically extracted the chlorine ions which it chemically reacted in its formation of the sequestered hydrochloric acid.

A WEC 501/502 similar to the one 301/302 illustrated in FIGS. 7-21, and consistent with the type of inertial hydrodynamic wave engine device disclosed and/or specified in U.S. patent Ser. No. 16/789,205, floats adjacent to an upper surface (not visible) of a body of water over which waves pass. The WEC produces electrical power in response to wave motion as explained in U.S. patent Ser. No. 16/789, 205. The extensive explanation of the operation of embodiment 300 in FIGS. 7-21, and especially with respect to FIG. 14, also explains the operation of embodiment 501/502, especially with respect to its response to passing waves, the impulsive flow of pressurized water from its reaction tube 502 into a pressurized reservoir within hollow buoy 501, the outflow of that pressurized water from the pressurized reservoir through its water turbines, and the electrical power produced by the water turbines' respective operatively-connected generators. Since this facet of the operation of embodiment 500 is the same as that of embodiment 300, that portion of the operational explanation will not be repeated here.

As the WEC 501/502 moves up and down in response to wave motion, water within the WEC's reaction tube 502 moves up and down within the reaction tube, and water flows in and out of the reaction tube through a mouth 503 and/or aperture at a lower end of the reaction tube. Occasionally, water moving upward within the reaction tube collides with a constriction in an upper portion of that reaction tube, which tends to cause an increase in the pressure within a portion of the water within the reaction tube's constriction. This periodic increase in water pressure within the constricted portion of the WEC's reaction tube tends to cause an ejection of pressurized water up to and into a pressurized interior of the WEC's upper hollow spherical portion 501 which tends to result in an accumulation of pressurized water therein.

Pressurized water within the interior of the WEC's upper hollow spherical portion 501 tends to flow, e.g., 504, out of the WEC's two water turbines, one 505 of which is visible in the illustration of FIG. 34. Electrical power produced by the embodiment's water turbines, and respective operatively connected generators (not shown), energizes various components, systems, subsystems, modules, and/or mechanisms, within the embodiment, including, but not limited to: a seawater electrolyzer 506, an HCl-process controller (not visible), multiple thermoelectric chillers (and heaters) (not visible), multiple valves (not visible), and multiple temperature and pressure sensors (not visible).

A mixture of hydrogen and chlorine gases produced by the embodiment's seawater electrolyzer 506 flows up, into, and through, primary gas pipe 507. Depending upon which, if any, of three gas valves (not visible) are open and/or closed, the mixture of gases flows from the primary gas pipe and into, and through, any combination, if any, of three respective gas delivery pipes: a combustion chamber gas pipe 508; a frozen HCl ejection gas pipe 509; and, an ejection port gasification pipe 510. The hydrogen and chlorine gases flowing through the various gas pipes 507-510, carry, and/or deliver, those gases from the seawater electrolyzer where they are produced, to and into the hydrochloric acid production and freezing apparatus 511.

The embodiment's hydrochloric acid production and freezing apparatus 511 comprises, utilizes, incorporates, and/or includes, three drain pipes. A first and/or upper combustion chamber drain pipe 512 enables, and/or facilitates, fluid communication between an upper interior of the combustion chamber (not visible) of the embodiment's hydrochloric acid production and freezing apparatus and the body of water outside the embodiment, and upon which the embodiment floats. A second and/or lower combustion chamber drain pipe 513 enables, and/or facilitates, fluid communication between a lower interior of the combustion chamber (not visible) of the embodiment's hydrochloric acid production and freezing apparatus and the body of water outside the embodiment, and upon which the embodiment floats. And, a third and/or ice plug chamber drain pipe 514 enables, and/or facilitates, fluid communication between an interior of the HCl freezing chamber (not visible) of the embodiment's hydrochloric acid production and freezing apparatus and the body of water outside the embodiment, and upon which the embodiment floats.

The embodiment's hydrochloric acid production and freezing apparatus 511 comprises, utilizes, incorporates, and/or includes, three heat sinks 592-594 which transfer heat generated by a plurality of thermoelectric coolers to the body of water (not visible) on which the embodiment floats. During one part of the hydrochloric acid production and freezing process implemented, and/or executed, by the hydrochloric acid production and freezing apparatus, one of the plurality of thermoelectric coolers is energized with a reversed electrical polarity such that it heats a content of the hydrochloric acid production and freezing apparatus, and in this case the respective heat sink serves to draw heat and/or thermal energy from the body of water to the respective thermoelectric "heater."

Frozen rods of an aqueous hydrochloric acid solution, e.g., 38 WT % (percent by weight) hydrochloric acid are released from the embodiment through a lower mouth 515 and/or aperture of the hydrochloric acid production and freezing apparatus 511.

Figure 35:
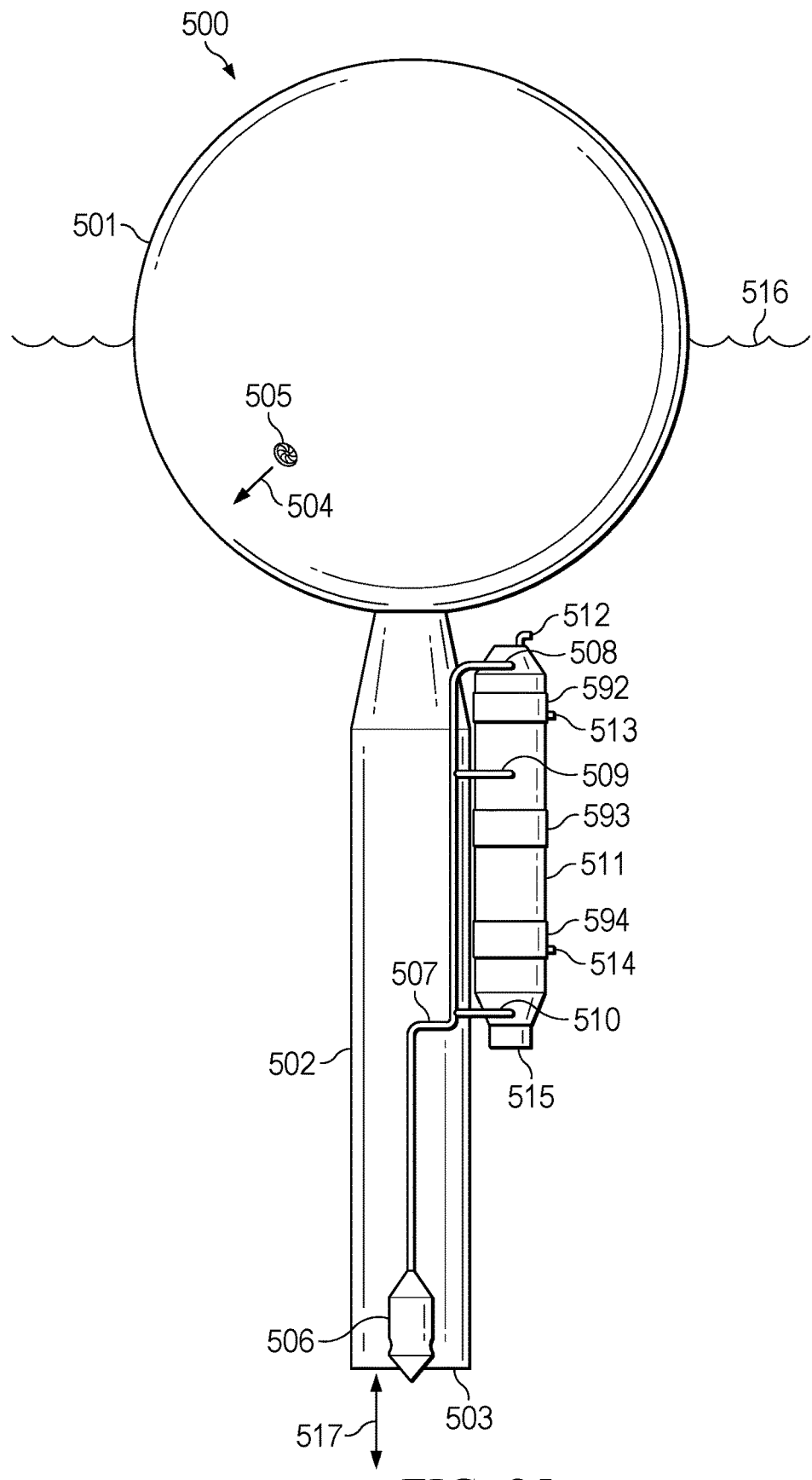
FIG. 35 is a side view of the sixth embodiment.

FIG. 35 shows a side view of the same embodiment 500 that is illustrated in FIG. 34. The embodiment is buoyant and floats adjacent to an upper surface 516 of a body of water over which waves pass. The embodiment's WEC 501/502 operates in the same way as does the embodiment 300 illustrated in FIGS. 7-21. As the embodiment is moved up and down in response to passing and/or impinging waves, water moves up-and-down within the embodiment's reaction tube 502. As water moves up-and-down within the reaction tube, water moves 517 in and out of the lower mouth 503 of the reaction tube.

Figure 36:
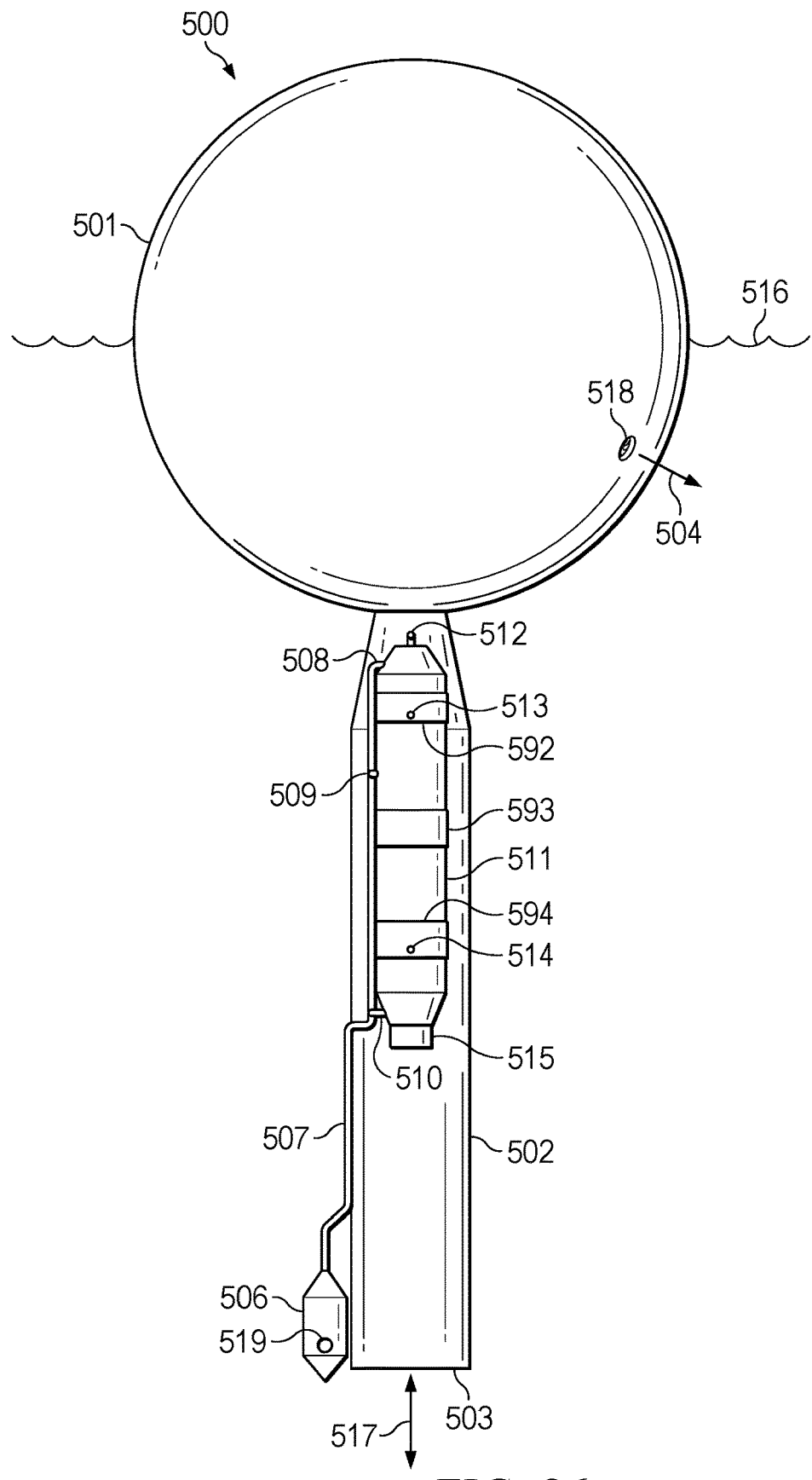
FIG. 36 is a side view of the sixth embodiment.

FIG. 36 shows a side view of the same embodiment 500 that is illustrated in FIGS. 34 and 35. The embodiment comprises, incorporates, includes, and/or utilizes, two water turbines. One 505 of the embodiment's two water turbines is visible in FIGS. 34 and 35. The other 518 is visible in FIG. 36. Each water turbine is operatively connected to a respective generator that produces electrical power when the turbine rotor and/or blades of its respective water turbine rotate in response to an outflow 504 of water from a pressurized water reservoir (see 335 in FIG. 14) within the embodiment's hollow buoy.

Seawater flows into the embodiment's electrolyzer 506 through a first and/or inflow aperture (not visible), and flows out through a second and/or outflow aperture 519. Water flowing into the embodiment's electrolyzer contains a full complement of chloride ions (Cl−) at the concentration characteristic of the body 516 of seawater on which the embodiment floats. However, the water flowing out of the embodiment's electrolyzer contains fewer chloride ions, and/or contains a lesser concentration of them, as some of the chloride ions within the seawater at the electrolyzer's anode are oxidized so as to form, and/or create, chlorine gas therefrom.

Figure 37:
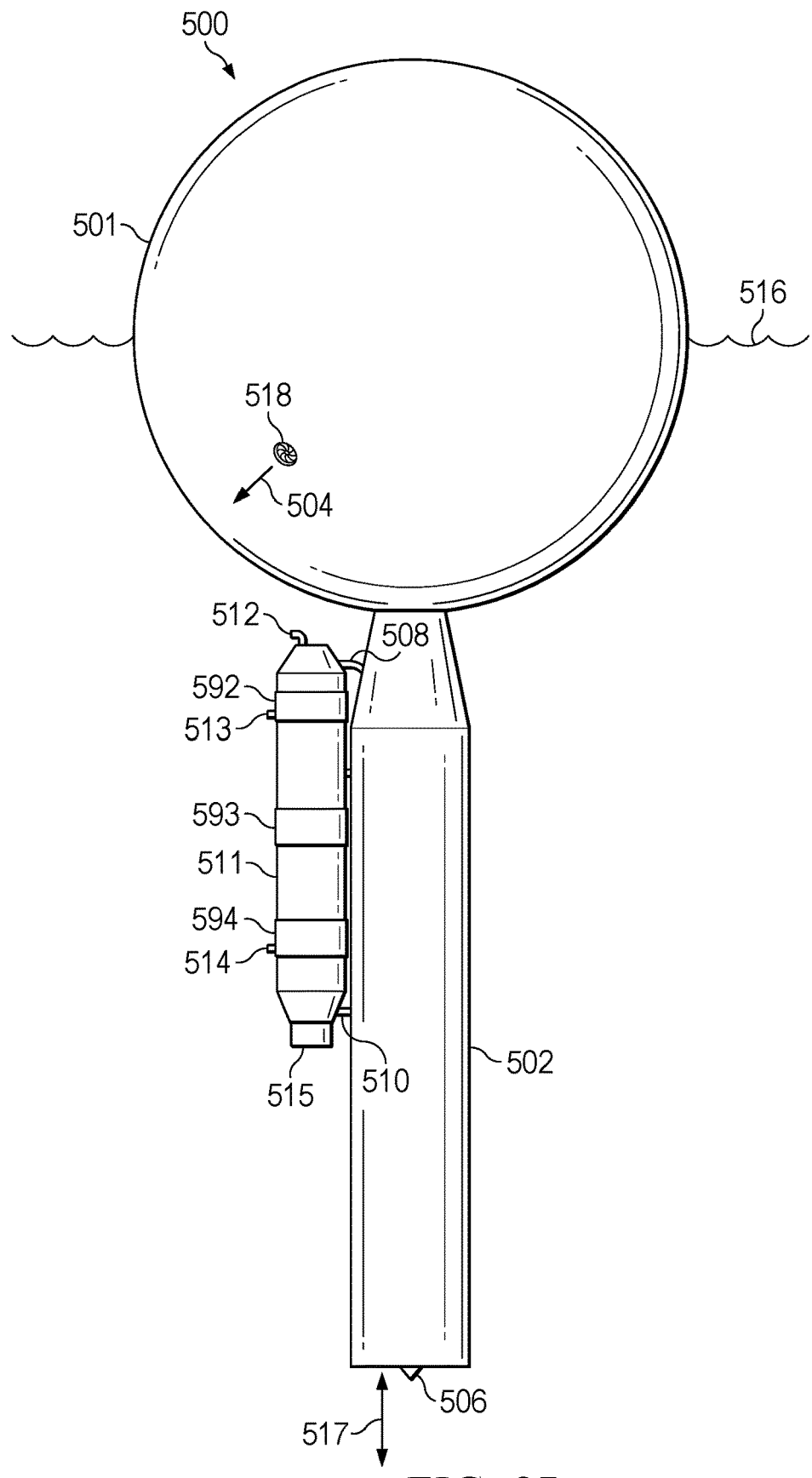
FIG. 37 is a side view of the sixth embodiment.

FIG. 37 shows a side view of the same embodiment 500 that is illustrated in FIGS. 34-36.

Figure 38:
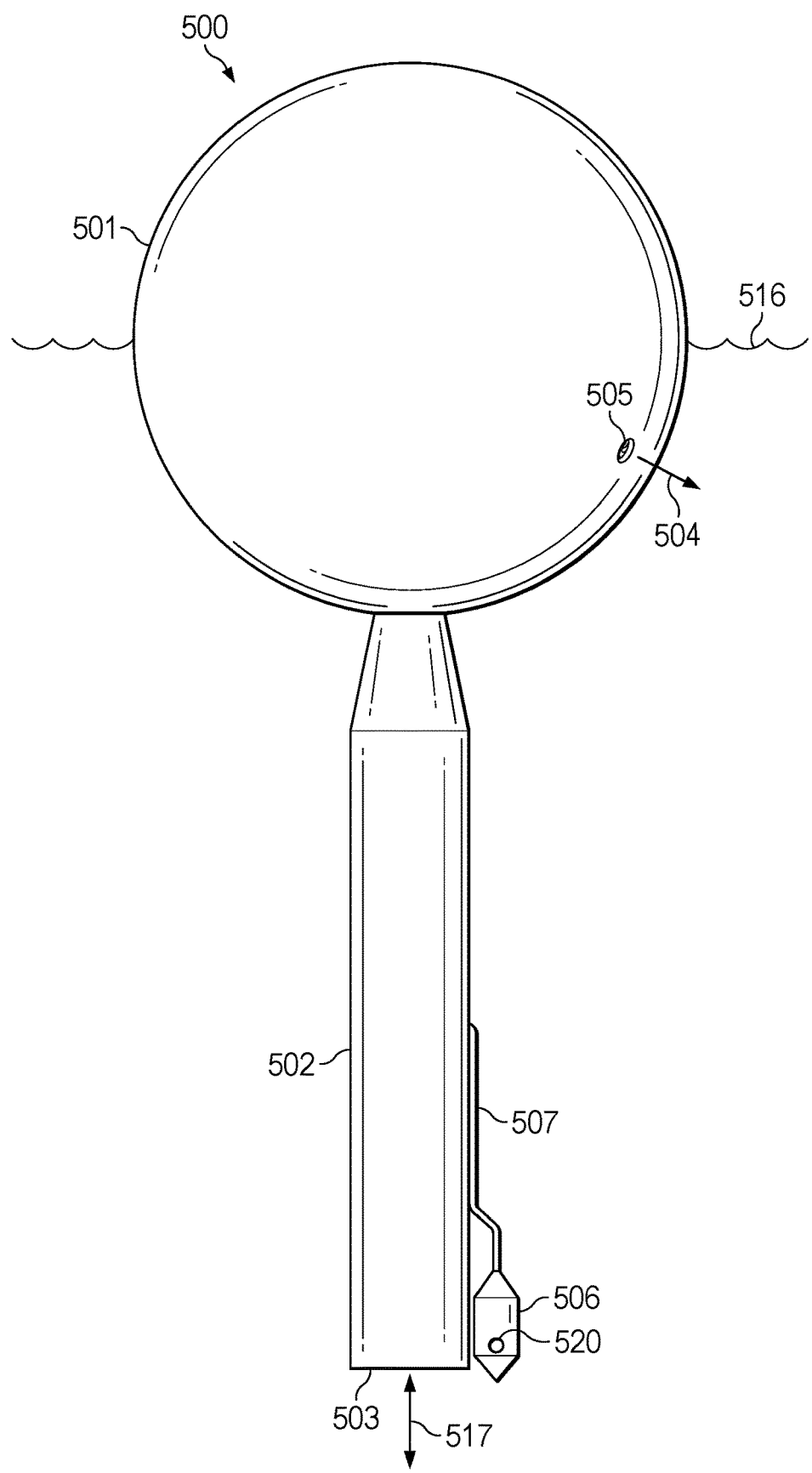
FIG. 38 is a side view of the sixth embodiment.

FIG. 38 shows a side view of the same embodiment 500 that is illustrated in FIGS. 34-37. The embodiment's electrolyzer 506 contains a first and/or inflow aperture 520 through which seawater flows into an interior of the electrolyzer. The electrolyzer contains a second and/or outflow aperture (519 in FIG. 36) through which seawater, depleted of some of its chloride ion (Cl−) content, flows out of the electrolyzer.

Figure 39:
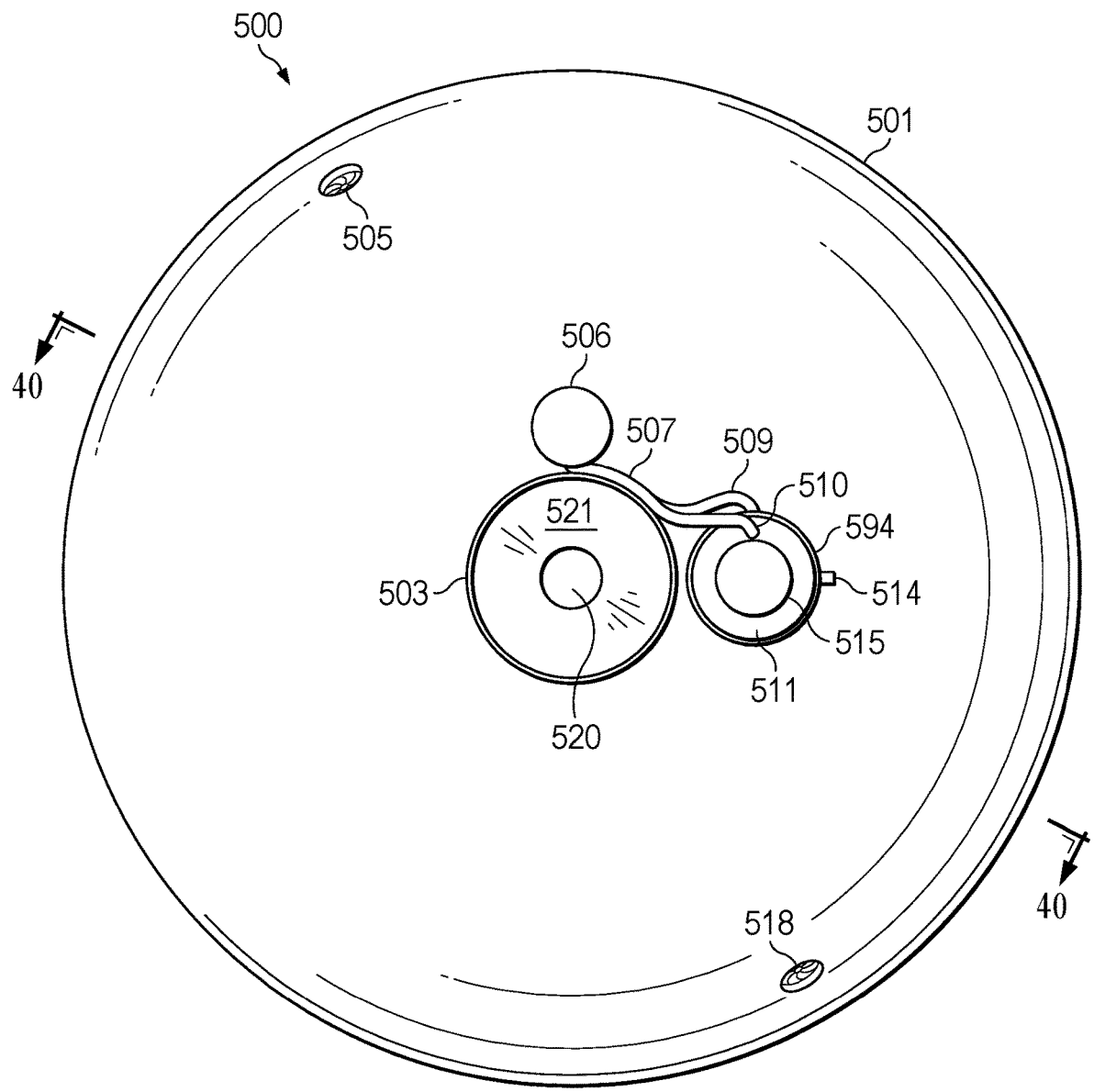
FIG. 39 is a bottom-up view of the sixth embodiment.

FIG. 39 shows a bottom-up view of the same embodiment 500 that is illustrated in FIGS. 34-38. A lower mouth 503 of the reaction tube (502 in FIGS. 34-38) is fluidly connected to the body of water (516 in FIGS. 35-38) on which the embodiment floats. An upper mouth 520 of the reaction tube is fluidly connected to a water reservoir (not visible) within the embodiment's hollow buoy 501.

As the embodiment 500 moves up and down in response to wave action at the buoy 501, water within the embodiment's reaction tube (502 in FIGS. 34-38) moves up and down as well (typically out of phase with up and down oscillations of the embodiment and its reaction tube). When water moves upward within the reaction tube (i.e., relative to the reaction tube), a portion of that upwardly moving water will tend to be pressurized by its flow into and through a constricted portion 521 of the reaction tube.

Periodically, occasionally, and/or intermittently, a portion of the pressurized water moving upward within the embodiment's reaction tube (502 in FIGS. 34-38) will be sufficiently pressurized and/or upwardly accelerated so as to cause that portion of water to be ejected through and/or from the upper mouth 520 of the reaction tube. Water so ejected will tend to be trapped, and/or to accumulate, within the embodiment's pressurized water reservoir (not visible) and therefrom will flow out of the buoy 501 through one of the embodiment's two water turbines 505 and 518, thereby energizing electrical generators operatively connected to each respective water turbine, causing those generators to produce electrical power.

Figure 40:
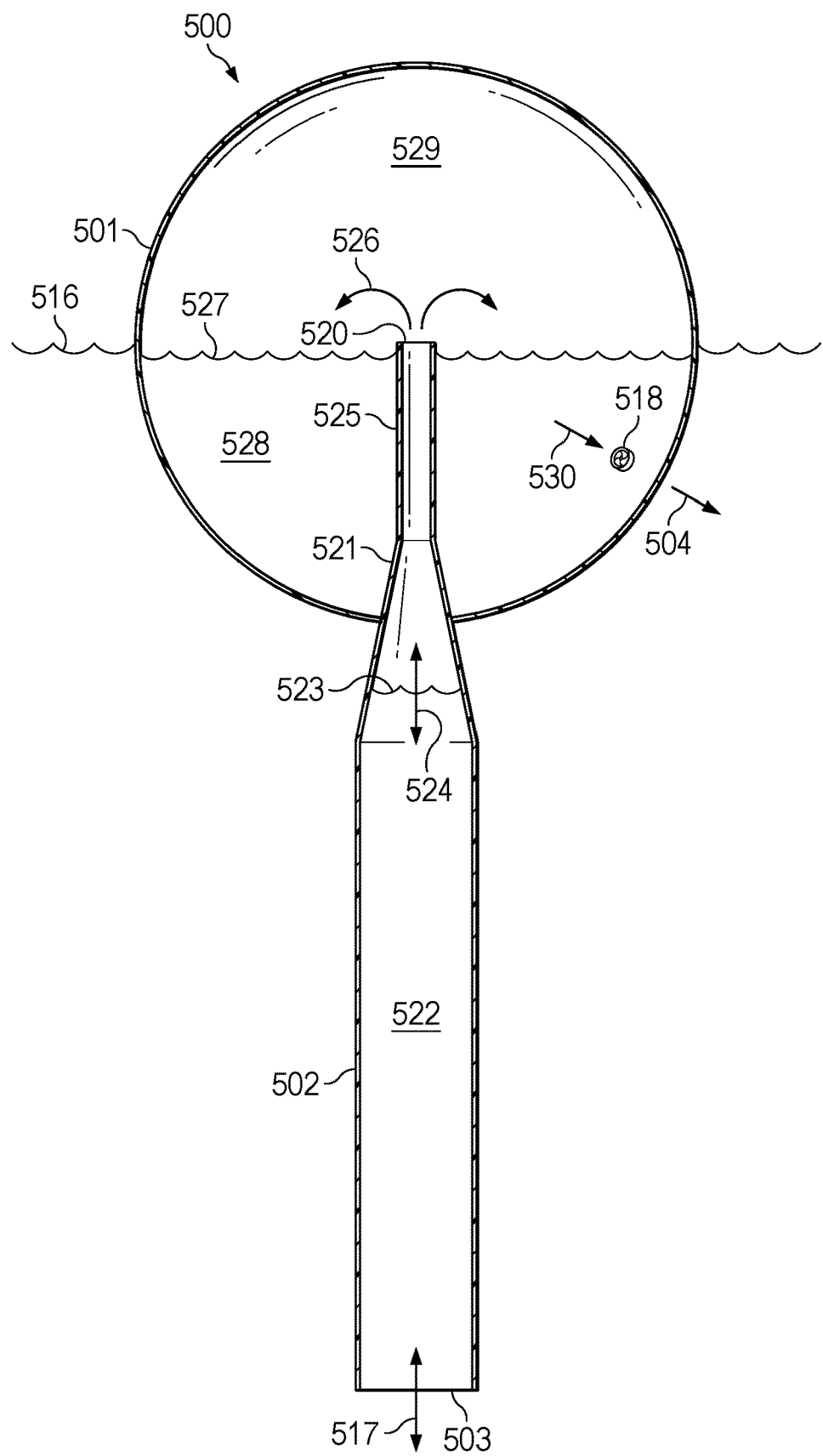
FIG. 40 is a side sectional view of the sixth embodiment.

FIG. 40 shows a side sectional view of the same embodiment 500 that is illustrated in FIGS. 34-39. The section plane is taken along section line 40-40 of FIG. 39.

The embodiment 500 floats adjacent to an upper surface 516 of a body of water over which waves pass. In response to wave action at the embodiment's buoy 501, the embodiment rises and falls, typically out of phase with the heave of the waves impinging upon the buoy. As the embodiment rises and falls, and as a further consequence of the wave-driven alteration of the relative depth of the lower mouth 503 of the embodiment's reaction tube 502, water 522 within the reaction tube moves up and down, typically out of phase with the vertical oscillations of the embodiment, and/or relative to the reaction tube.

As water 522 within the embodiment's reaction tube 502 moves up and down relative to the reaction tube, water moves 517 in and out of the lower mouth 503 of the reaction tube. And, as water within the embodiment's reaction tube moves up and down, so too an upper surface 523 of that water moves 524 up and down within the reaction tube. When the water 522 moves upward and flows into and through a constricted portion 521 of the reaction tube, its upward velocity through the constricted portion of the tube tends to increase thereby propelling the water upward through a relatively narrower upper part 525 of the reaction tube. And, if the upward acceleration of the water flowing out of the constriction 521, and into and through the upper part 525 of the reaction tube, is sufficient, a portion of the upwardly accelerated water will be ejected 526 from an upper mouth 520 of the reaction tube.

Water ejected 526 from the upper mouth 520 of the embodiment's reaction tube 502 will tend to fall onto, and then through, an upper surface 527 of a water reservoir 528 positioned, and/or trapped, within a lower portion of an interior of the hollow buoy 501. A pressurized air pocket 529 within an upper portion of the interior of the hollow buoy is in fluid communication with the water reservoir and increases the pressure, i.e., adds to its native head and/or hydrostatic pressure, of the water therein (which is why the nominal, average, and/or resting upper surface 523 of the water 522 within the reaction tube is at a lower level than the upper surface 516 of the body of water on which the embodiment floats).

When water of the water reservoir 528 flows 530 into and through the embodiment's water turbines, e.g., 518, it flows therethrough with the hydrostatic pressure imbued by the depth of the water turbines within the water reservoir, as well as with the pressure of the air pocket 529 above the water reservoir.

The outflow 530/504 of water from the reservoir and into the body of water 516 rotates the water turbines, which in turn energize respective operatively connected generators, thereby producing electrical power that is subsequently consumed by the embodiment, e.g., through its electrolysis of seawater and its freezing of hydrochloric acid solution.

Figure 41:
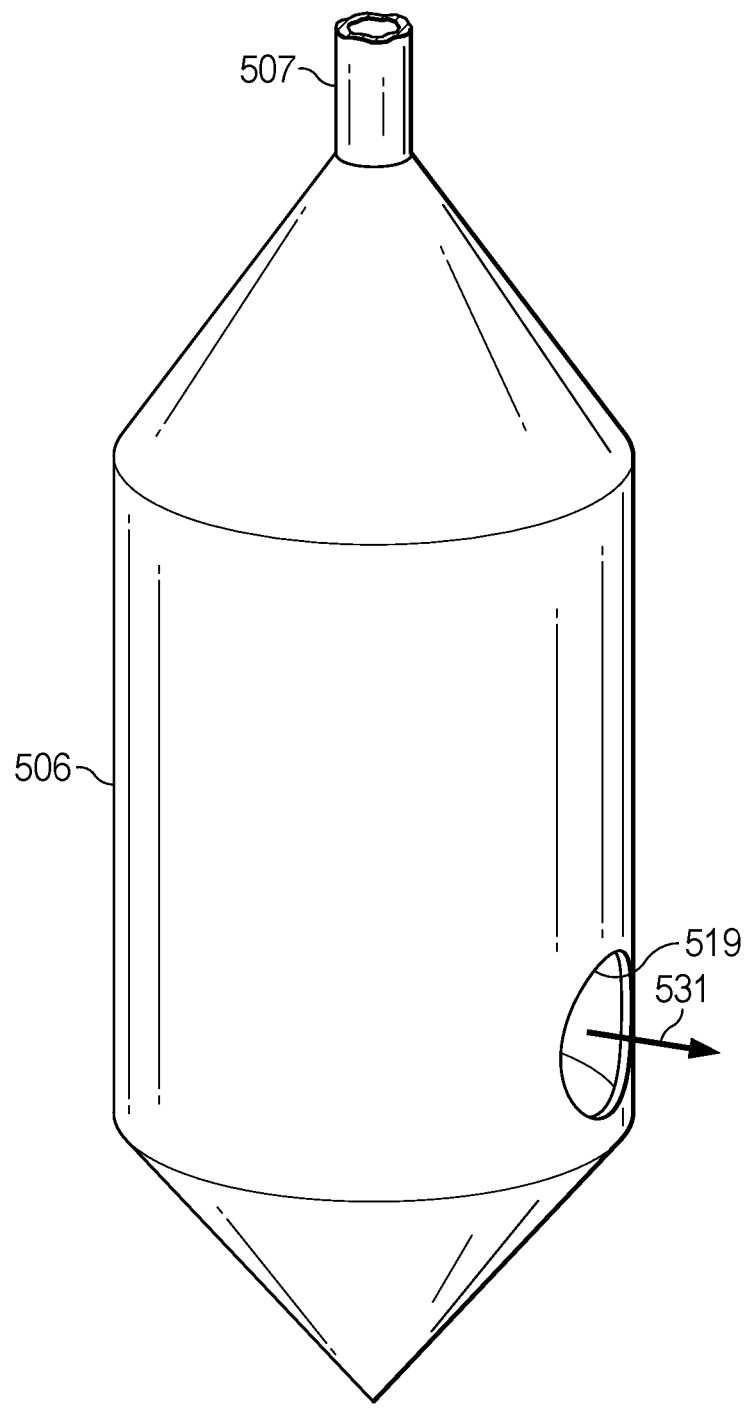
FIG. 41 is a perspective side view of an electrolyzer of the sixth embodiment.

FIG. 41 shows a side perspective view of the electrolyzer 506 of which the embodiment 500 that is illustrated in FIGS. 34-39 is, in part, comprised. The outer electrolyzer chamber wall includes two apertures each of which fluidly connects an interior of the electrolyzer to the body of seawater (516 in FIGS. 35-38) on which the embodiment floats. One aperture (not visible, 520 in FIG. 38) facilitates and/or enables an inflow of water from the body of seawater into the interior of the electrolyzer chamber. The other aperture 519 facilitates and/or enables an outflow 531 of water from the interior of the electrolyzer chamber into the body of seawater.

Figure 42:
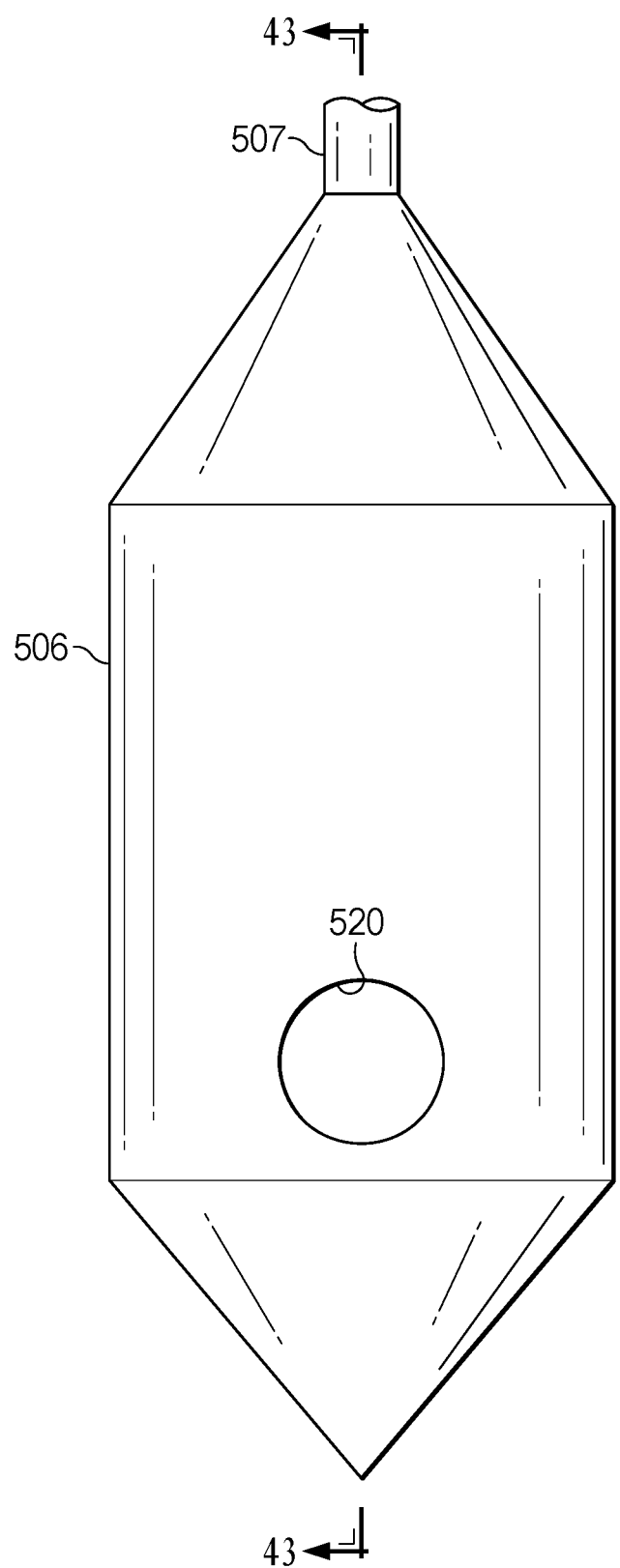
FIG. 42 is a side view of the electrolyzer of the sixth embodiment.

FIG. 42 shows a side view of the same electrolyzer 506 illustrated in FIG. 41.

Figure 43:
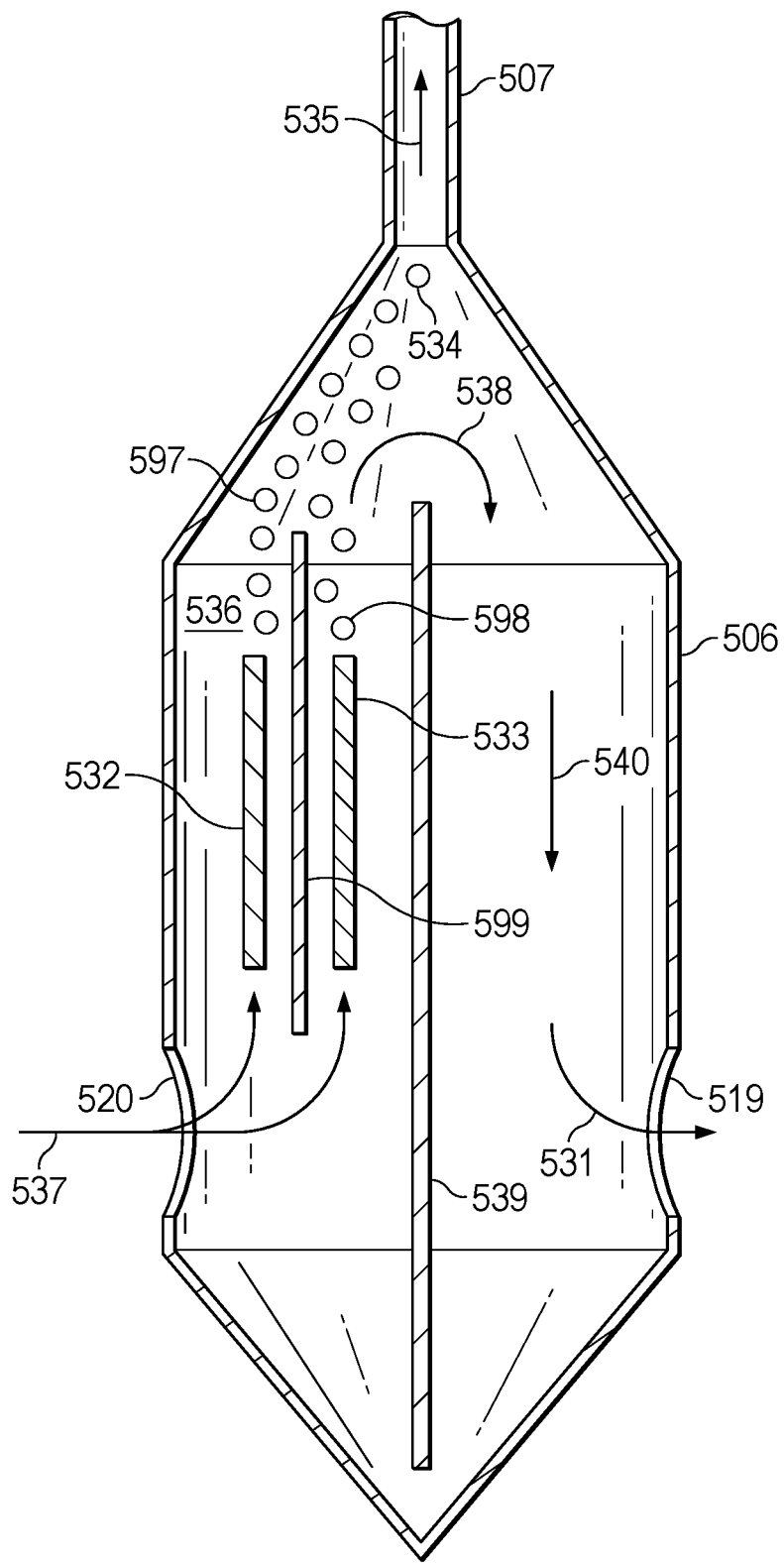
FIG. 43 is a side sectional view of the electrolyzer of the sixth embodiment.

FIG. 43 shows a side sectional view of the same electrolyzer 506 that is illustrated in FIGS. 41 and 42. The section plane is taken along section line 43-43 of FIG. 42.

Within an interior 536 of the electrolyzer chamber 506, a cathodic electrode 532 reduces hydronium ions (H3O+) so as to produce and evolve a hydrogen gas, e.g., 597. Within that same interior of the electrolyzer chamber, an anodic electrode 533 oxidizes chloride ions (Cl−) so as to produce and evolve a chlorine gas, e.g., 598. Bubbles, e.g., 534, of hydrogen gas, chlorine gas, and mixtures of hydrogen and chlorine gases, rise from the electrodes and flow 535 up, into, and through, the embodiment's primary gas pipe 507.

The bubbles, e.g., 534, that rise from the electrodes 532 and 533, create a bubble pump that draws fresh seawater into the interior of the electrolyzer chamber through inflow aperture 520, and expels chloride-ion-depleted and hydroxide-rich seawater from the interior of the electrolyzer chamber and out through outflow aperture 519. As the bubbles of hydrogen and chlorine gases rise from the electrodes 532 and 533, they entrain some of the water 536 around and above those electrodes and create an upwelling current within the electrolyzer chamber. As the bubble-driven current of water flows upward it draws 537 in seawater through inflow aperture 520. And, as the bubble-driven current of water flows upward it flows 538 over and around a central and/or medial vertical wall 539 that divides first and second lateral portions of the interior of the electrolyzer chamber 506. After water flows 538 over the top of the medial vertical wall, it flows 540 downward through the second lateral portion of the interior of the electrolyzer chamber, and then flows 531 out of the electrolyzer chamber through outflow aperture 519.

Separating the electrolyzer's cathodic electrode 532 from the electrolyzer's anodic electrode 533 is a microporous semipermeable diaphragm 599 comprised and/or fabricated of asbestos fibers and fibrous polytetrafluoro-ethylene (PFTE). The diaphragm inhibits a passage of hydroxide ions from around the cathode to the anode during the time that seawater is flowing upward from the bottoms of the electrodes until after the seawater has flowed well beyond the electrodes.

Figure 44:
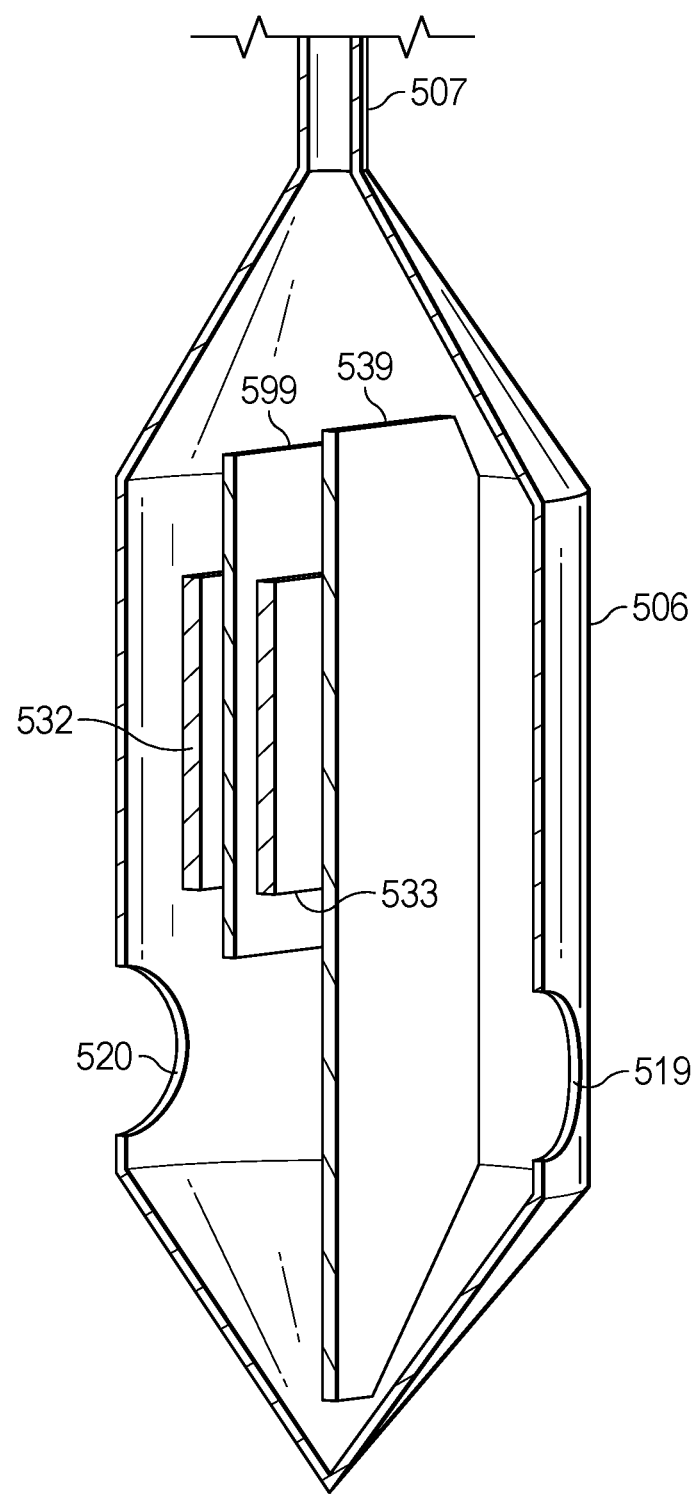
FIG. 44 is a perspective side sectional view of the electrolyzer of the sixth embodiment.

FIG. 44 shows a perspective side sectional view of the same electrolyzer 506 that is illustrated in FIGS. 41-43. The section plane is taken along section line 43-43 of FIG. 42.

Figure 45:
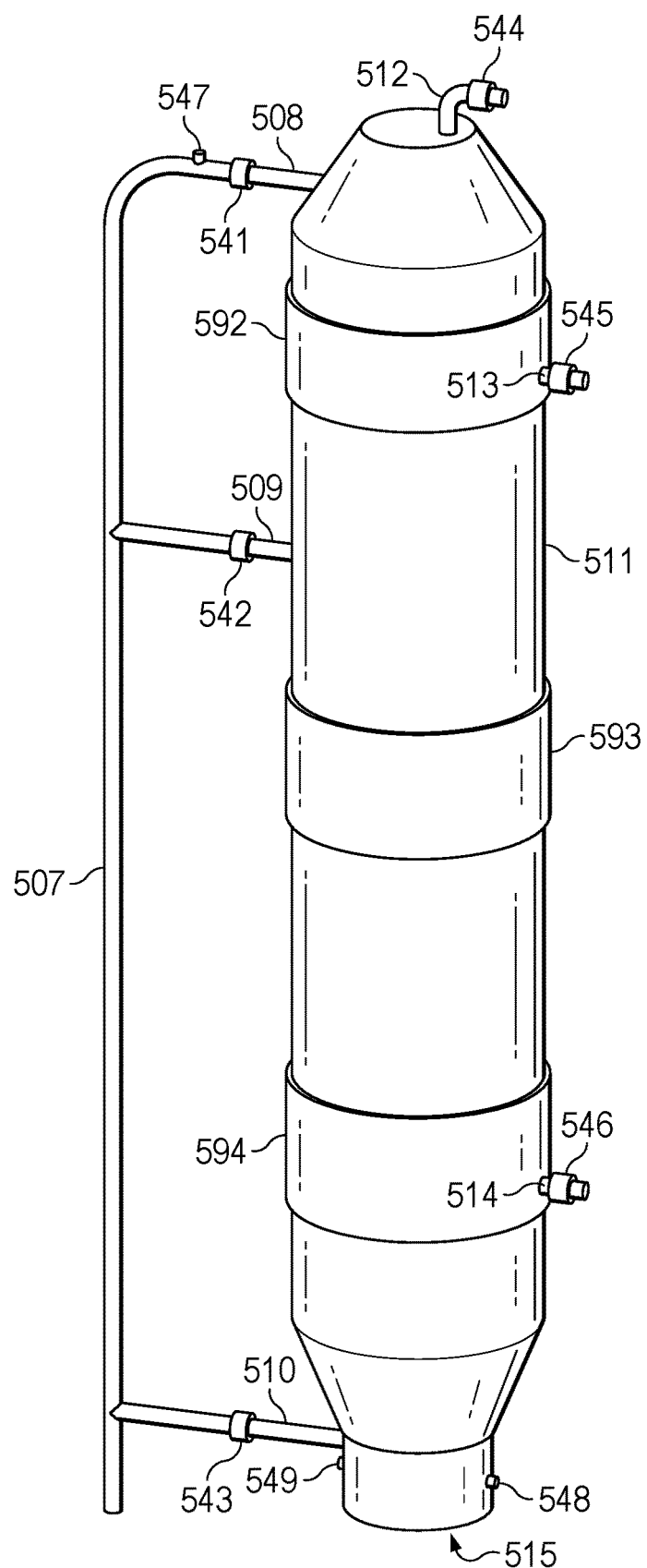
FIG. 45 is a perspective side view of a hydrochloric acid production and freezing apparatus of the sixth embodiment.

FIG. 45 shows a side perspective view of the hydrochloric acid production and freezing apparatus 511 of which the embodiment 500 that is illustrated in FIGS. 34-40 is, in part, comprised. The hydrochloric acid production and freezing apparatus receives a mixture of hydrogen and chlorine gases from the embodiment's electrolyzer (506 in FIG. 34) via and/or through primary gas pipe 507.

When a combustion chamber gas valve 541 is open, a mixture of hydrogen and chlorine gases flows from the primary gas pipe 507 and into and through a combustion chamber gas pipe 508 and therethrough into a combustion chamber (not visible) within the hydrochloric acid production and freezing apparatus 511.

When a frozen HCl ejection gas valve 542 is open, a mixture of hydrogen and chlorine gases flows from the primary gas pipe 507 and into and through a frozen HCl ejection gas pipe 509 and therethrough into an HCl freezer chamber (not visible) within the hydrochloric acid production and freezing apparatus 511.

When an ejection port gasification gas valve 543 is open, a mixture of hydrogen and chlorine gases flows from the primary gas pipe 507 and into and through an ejection port gasification pipe 510 and therethrough into an ejection port (not visible) within the hydrochloric acid production and freezing apparatus 511.

When combustion chamber evacuation valve 544 is open, any gases within the combustion chamber (not visible) of the hydrochloric acid production and freezing apparatus 511 are able to escape the combustion chamber and flow into the body of water (516 in FIG. 35) on which the embodiment floats, thereby ensuring that the combustion chamber is flooded with seawater.

When hydrochloric acid reservoir initialization valve 545 is open, any gases within a lower portion of the combustion chamber (not visible) of the hydrochloric acid production and freezing apparatus 511 are able to escape the lower portion of the combustion chamber and flow into the body of water (516 in FIG. 35) on which the embodiment floats. An opening of hydrochloric acid reservoir initialization valve 545 causes, permits, and/or enable, seawater to flow into and fill that lower portion of the combustion chamber, thereby displacing any gases therein, and thereby forming an initial seawater reservoir into which hydrochloric acid may and/or will be deposited.

When ice plug chamber initialization valve 546 is open, any gases within the ice plug chamber (not visible) of the hydrochloric acid production and freezing apparatus 511 are able to escape the ice plug chamber and flow into the body of water (516 in FIG. 35) on which the embodiment floats, thereby ensuring that the ice plug chamber is flooded with seawater.

The pressure of the mixture of hydrogen and chlorine gases within the embodiment's primary gas pipe 507 is measured and reported to the embodiment's HCl-process controller (not visible) by a primary gas pipe pressure sensor 547.

The pressure of the fluid (seawater or gas) within the embodiment's ejection port (not visible), having a lower mouth 515, is measured and reported to the embodiment's HCl-process controller (not visible) by an inner ejection port pressure sensor 548. The pressure of the seawater at the same depth as the depth of the ejection port pressure sensor, is measured and reported to the embodiment's HCl-process controller (not visible) by an outer ejection port pressure sensor 549.

Figure 46:
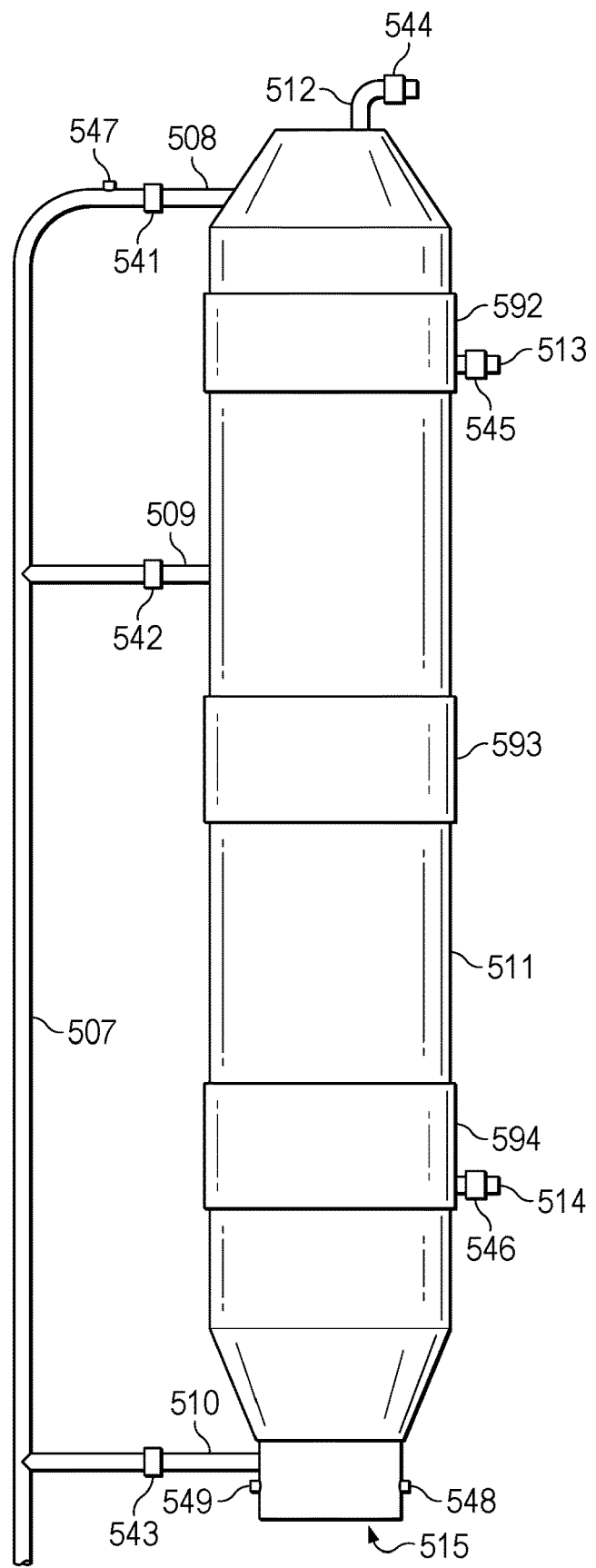
FIG. 46 is a side view of the hydrochloric acid production and freezing apparatus of the sixth embodiment.

FIG. 46 shows a side view of the same hydrochloric acid production and freezing apparatus 511 illustrated in FIG. 45.

Figure 47:
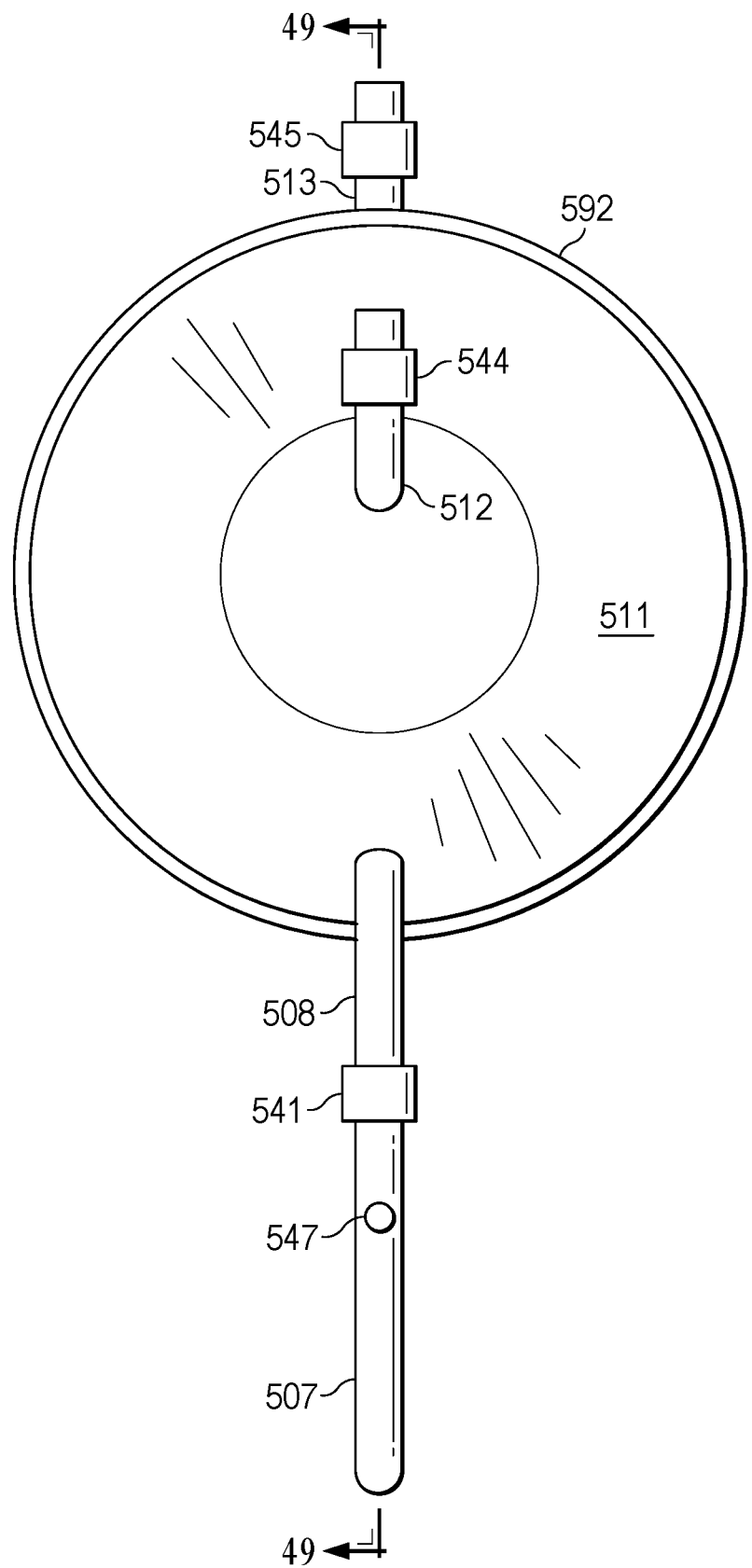
FIG. 47 is a top-down view of the hydrochloric acid production and freezing apparatus of the sixth embodiment.

FIG. 47 shows a top-down view of the same hydrochloric acid production and freezing apparatus 511 illustrated in FIGS. 45 and 46.

Figure 48:
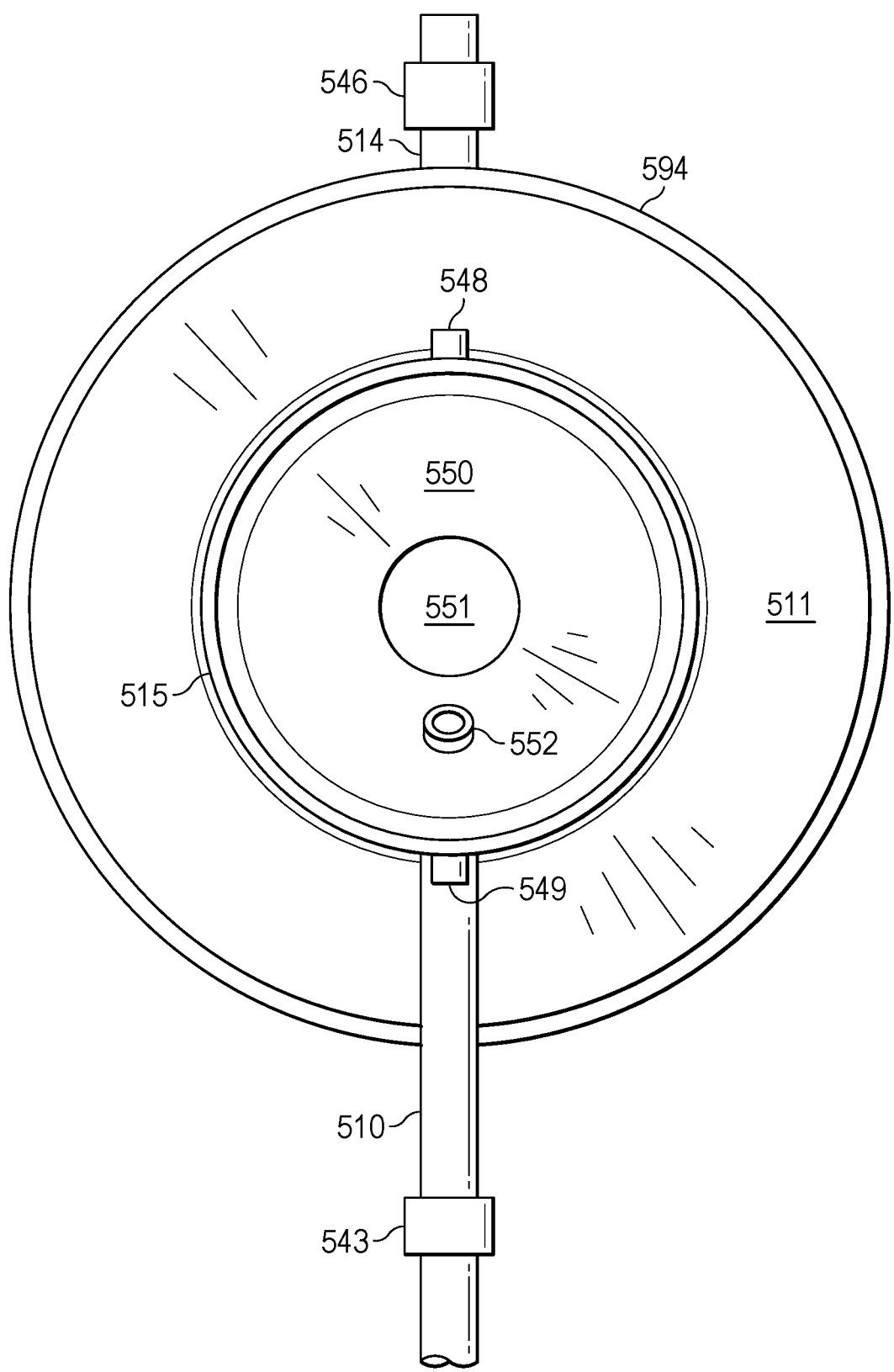
FIG. 48 is a bottom-up view of the hydrochloric acid production and freezing apparatus of the sixth embodiment.

FIG. 48 shows a bottom-up view of the same hydrochloric acid production and freezing apparatus 511 illustrated in FIGS. 45-47. Visible through the lower mouth 515 of the embodiment's ejection port is an upper wall 550 of the embodiment's HCl freezer chamber. And, separating the HCl freezer chamber from the combustion chamber is an HCl drain valve 551.

Visible within the bottom-up view of the hydrochloric acid production and freezing apparatus 511 is the ejection gas effluent aperture 552 of the frozen HCl ejection gas pipe 509 through which pressurized gas is introduced into an upper end of the embodiment's HCl freezer chamber for the purpose of dislodging a rod of frozen hydrochloric acid solution so that the rod falls down and out of the embodiment through the ejection port and the lower mouth 515 thereof.

Figure 49:
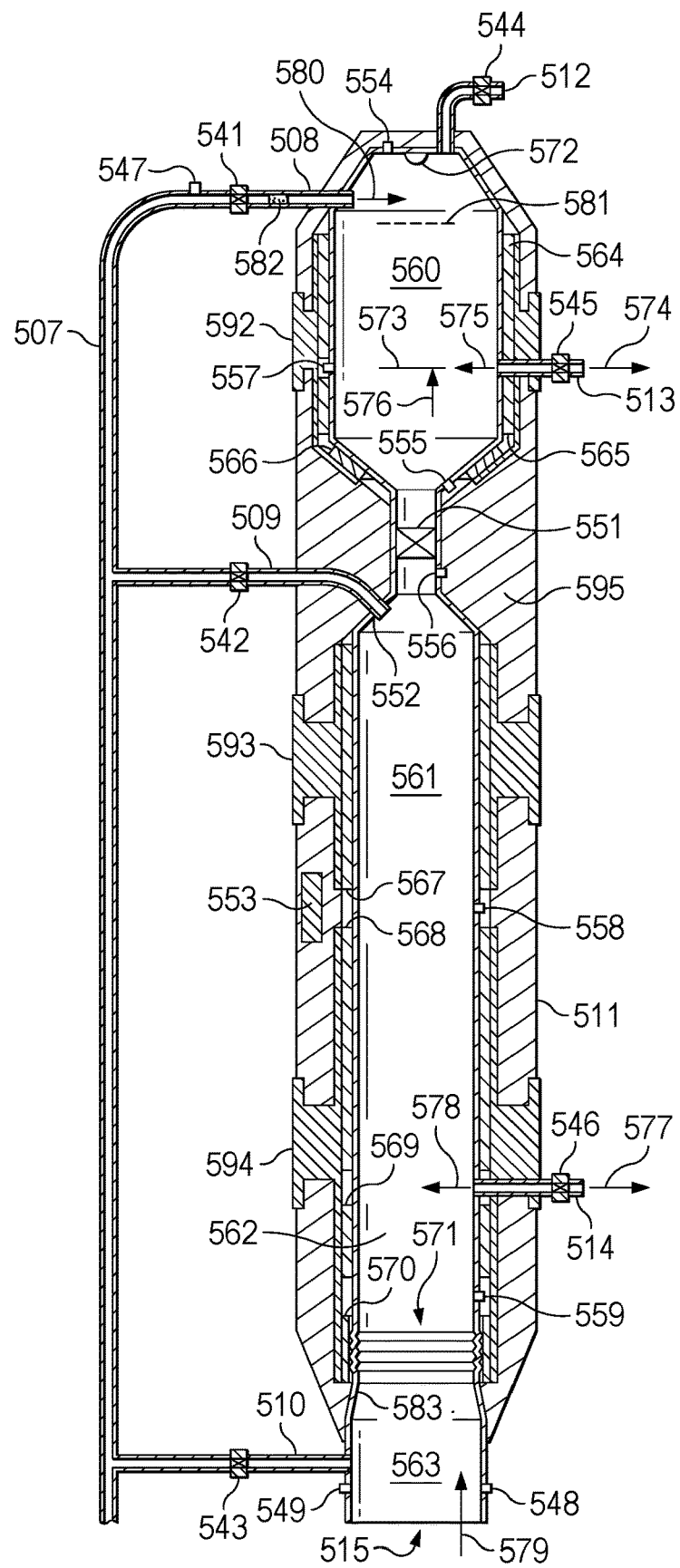
FIG. 49 is a side sectional view of the hydrochloric acid production and freezing apparatus of the sixth embodiment.

FIG. 49 shows a side sectional view of the same hydrochloric acid production and freezing apparatus 511 that is illustrated in FIGS. 45-48. The section plane is taken along section line 49-49 of FIG. 47.

The hydrochloric acid production and freezing apparatus 511, of the embodiment 500 which is illustrated in FIGS. 34-38, operates in a cyclical fashion. After the discharge of a rod of frozen hydrochloric acid solution (not shown in FIG. 49), the hydrochloric acid production and freezing apparatus initiates a new frozen rod formation and discharge cycle. The various operational steps involved in the frozen rod formation and discharge cycle are controlled by an HCl-process controller 553.

The HCl-process controller 553 controls, orchestrates, and/or implements, the frozen rod formation and discharge cycle, through its control of seven valves 541-546 and 551, and four sets of multistage thermoelectric coolers (TECs) 564-570, and through sensor data provided to it by six pressure sensors 547-549 and 554-556, and three temperature sensors 557-559.

Valves 541-543 control the flow of a gas, i.e., a mixture of hydrogen and chlorine gases, into the tubular interior of the hydrochloric acid production and freezing apparatus 511. While valves 544-546 control the flow of gas out of that tubular interior. And, valve 551 controls the flow of hydrochloric acid solution from the combustion chamber 560 into the HCl freezer chamber 561.

The tubular interior of the hydrochloric acid production and freezing apparatus 511 includes, and/or is comprised of, four tubular portions, each fluidly connected to the others (except when HCl discharge valve 551 is closed thereby fluidly isolating the combustion chamber 560 from the other tubular portions). The combustion chamber 560 comprises the uppermost portion of the tubular interior of the hydrochloric acid production and freezing apparatus. Below the combustion chamber, in descending order, are the HCl freezer chamber 561, the ice plug chamber 562, and the ejection port 563.

Each of the multistage thermoelectric coolers (TECs) 564-570 of the hydrochloric acid production and freezing apparatus 511 is thermally connected (on one side) to one of three heat sinks 592-594. Each heat sink permits the heat produced on an outer side of each TEC (i.e., a side distal from the center of the hydrochloric acid production and freezing apparatus), as cold it produced on the other/inner side, to be dissipated, and/or conductively transferred, to the body of water (516 in FIG. 35) on which the embodiment (500 in FIG. 35) floats. When a TEC is energized with a reversed polarity such that it produces cold on its outer side and heat on its inner side, the respective heat sink to which it is thermally connected absorbs heat from the body of water (516 in FIG. 35) on which the embodiment (500 in FIG. 35) floats.

The hydrochloric acid production and freezing apparatus 511 is surrounded on most sides by a layer of thermal insulation 595 which permits a hydrochloric acid solution within the apparatus to be chilled to −50 degrees Celsius, and a cylindrical volume of seawater to be chilled to −10 degrees Celsius, without a significant amount of thermal energy being absorbed from the body of water (516 in FIG. 35) on which the embodiment (500 in FIG. 35) floats while the embodiment expends energy removing thermal energy from the hydrochloric acid solution and cylindrical volume of seawater.

A new frozen rod formation and discharge cycle begins with a first operational step wherein the HCl-process controller 553 fills the tubular interior of the hydrochloric acid production and freezing apparatus 511 with a mixture of hydrogen and chlorine gases. To do this, the HCl-process controller opens valves 541-543 and 551, and closes valves 544-546. At this point in the frozen rod formation and discharge cycle, the HCl-process controller de-energizes the annular multistage thermoelectric coolers (TECs) 564-570 that are arrayed around the respective peripheries of the combustion chamber 560, the HCl freezer chamber 561, the ice plug chamber 562, and the ridge lock 571. The HCl-process controller also de-energizes the ignition lamp (e.g., an emitter of ultraviolet electromagnetic radiation which ignites mixtures of hydrogen and chlorine gases) thereby preventing an ignition of the gases with which the HCl-process controller fills the tubular interior of the hydrochloric acid production and freezing apparatus.

The HCl-process controller 553 continues adding hydrogen and chlorine gases to the tubular interior of the hydrochloric acid production and freezing apparatus 511 until the upper combustion chamber pressure sensor 554 indicates that the pressure of the gas within the combustion chamber has reached, and/or become equal to, the hydrostatic pressure measured by the outer ejection port pressure sensor 549, i.e., thereby indicating that the gas within the tubular interior of the hydrochloric acid production and freezing apparatus has reached a pressure equal to the hydrostatic pressure of a depth equal to the depth of the outer ejection port pressure sensor which indicates that the gas within the interior of the hydrochloric acid production and freezing apparatus has come to extend from the uppermost part of the combustion chamber down to a level and/or depth equal to that of the outer ejection port pressure sensor, and/or adjacent to the to the lower mouth 515 of the ejection port 563.

After the tubular interior 560-563 of the hydrochloric acid production and freezing apparatus 511 has been filled with gas, and any seawater within that tubular interior has been displaced from, and/or pushed out of, that interior, the HCl-process controller 553 initiates and executes a second operational step of the frozen rod formation and discharge cycle.

At this point in the frozen rod formation and discharge cycle, the HCl-process controller 553 closes the gas inlet valves 541-543. It also closes the HCl drain valve 551 thereby separating, isolating, and/or fluidly disconnecting, the combustion chamber 560 from the other portions 561-563 of the tubular interior of the hydrochloric acid production and freezing apparatus.

During this second operational step, the HCl-process controller 553 leaves closed the combustion chamber evacuation valve 544 (thereby preventing gas within the combustion chamber from escaping), the hydrochloric acid reservoir initialization valve 545 (thereby preventing gas within the combustion chamber from escaping), and the ice plug chamber initialization valve 546 (thereby preventing gas within the ice plug chamber 562 and the ejection port 563 from escaping).

During this second operational step, the HCl-process controller leaves off and/or de-energized the ultraviolet lamp 572, as well as the various multistage TECs 564-570.

After the tubular interior 560-563 of the hydrochloric acid production and freezing apparatus 511 has been filled with gas, and the flow of gas into that tubular interior has been halted (and the gas secured within that tubular interior), the HCl-process controller 553 initiates and executes a third operational step of the frozen rod formation and discharge cycle.

At this point in the frozen rod formation and discharge cycle, the HCl-process controller 553 opens the hydrochloric acid reservoir initialization valve 545 thereby allowing that portion of the gas within the combustion chamber 560 which is below the level 573 to escape 574 from the combustion chamber by flowing into and through lower combustion chamber drain pipe 513, and through the opened hydrochloric acid reservoir initialization valve, and therethrough into the body of water (516 of FIG. 35) on which the embodiment (500 in FIG. 35) floats.

As gas escapes 574 the combustion chamber 560, seawater flows 575 into that combustion chamber 560 through the same lower combustion chamber drain pipe 513 and the same opened hydrochloric acid reservoir initialization valve 545, thereby flooding 576 that lower portion of the combustion chamber between the HCl drain valve 551 and the lower combustion chamber drain pipe 513, i.e., up to level 573, with seawater, thereby initializing the water (seawater) reservoir within the combustion chamber. In a later operational step, when hydrogen and chlorine gases produced by, and received from, the embodiment's (500 in FIG. 34) electrolyzer (506 in FIG. 34) flow into the combustion chamber, and are ignited with the ultraviolet lamp therein, the hydrogen chloride gas produced by the combustion, will dissolve into the water reservoir thereby increasing both its volume and its acidity (and thereby transforming it into a hydrochloric acid reservoir).

The position (e.g., elevation and/or depth) of the lower combustion chamber drain pipe 513, with respect to the interior of the combustion chamber 560, is such that when the hydrochloric acid reservoir is full and ready to be discharged into the HCl freezer chamber 561, the reservoir will comprise and/or constitute a 38% by weight solution of hydrochloric acid.

The HCl-process controller 553 leaves open the hydrochloric acid reservoir initialization valve 545, thereby allowing gas to continue to flow 574 out of the combustion chamber 560, and allowing seawater to continue flowing 575 in to the combustion chamber, until the upper combustion chamber pressure sensor 554 indicates to the HCl-process controller that it has achieved, registered, and/or detected a pressure consistent with the hydrostatic pressure outside the hydrochloric acid production and freezing apparatus 511 at the depth and pressure characterizing, and/or associated with, the lower combustion chamber drain pipe 513.

When the upper combustion chamber pressure sensor 554 indicates to the HCl-process controller 553 that it has achieved a pressure consistent with the hydrostatic pressure at the depth and pressure of the lower combustion chamber drain pipe 513, then it closes the hydrochloric acid reservoir initialization valve 545, thereby preventing the further outflow of gas from, and/or the further inflow of seawater into, the combustion chamber 560. And, thereby stabilizing, fixing, trapping, enclosing, the initial reservoir of seawater that will become the basis of the hydrochloric acid solution that the hydrochloric acid production and freezing apparatus 511, and its HCl-process controller 553, will produce.

After the initial reservoir of seawater has been created within the combustion chamber 560, the HCl-process controller 553 initiates and executes a fourth operational step of the frozen rod formation and discharge cycle.

At this point in the frozen rod formation and discharge cycle, the HCl-process controller 553 opens the ice plug chamber initialization valve 546, thereby allowing gas within the ice plug chamber 562 and the ejection port 563 to escape 577 through the ice plug chamber drain pipe 514 into the body of water (516 of FIG. 35) on which the embodiment (500 in FIG. 35) floats. The escaping gas also permits seawater to flood the ice plug chamber 562 and the ejection port 563, i.e., by flowing 578 in through the same ice plug chamber drain pipe 514 and by flowing 579 up and through the ejection port 563.

The HCl-process controller 553 leaves open the ice plug chamber initialization valve 546, thereby allowing gas to continue to flow 577 out of the ice plug chamber 562 and the ejection port 563, and allowing seawater to continue flowing 578 and 579 in to the ice plug chamber and the ejection port, until the HCl drain pipe pressure sensor 556 indicates to the HCl-process controller that it has achieved, registered, and/or detected, a pressure consistent with the hydrostatic pressure outside the hydrochloric acid production and freezing apparatus 511 at the depth and pressure characterizing, and/or associated with, the ice plug chamber drain pipe 514.

When the HCl drain pipe pressure sensor 556 indicates to the HCl-process controller 553 that it has achieved a pressure consistent with the hydrostatic pressure at the depth and pressure of the ice plug chamber drain pipe 514, then it closes the ice plug chamber initialization valve 546, thereby preventing the further outflow of gas from, and/or the further inflow of seawater into, the ice plug chamber 562 and the ejection port 563.

After the ice plug chamber 562 and the ejection port 563 have been flooded with seawater, the HCl-process controller 553 initiates and executes a fifth operational step of the frozen rod formation and discharge cycle.

At this point in the frozen rod formation and discharge cycle, the HCl-process controller 553 energizes, activates, and/or "turns on," the ice plug chamber TEC 569 and the ice plug ridge lock TEC 570 thus causing those multistage thermoelectric coolers to chill and freeze the seawater within the ice plug chamber 562. When the seawater within the ice plug chamber freezes, that frozen seawater constitutes, comprises, and/or serves as, a "plug" preventing fluid within the HCl freezer chamber 561 from escaping through the ejection port 563. The frozen plug resulting from, and/or created during, this operational step includes circumferential grooves 571, ridges, and/or holdfasts, each of which has a maximal diameter exceeding the nominal and/or average diameter of the ice plug chamber, and which thereby prevent the frozen plug from being able to slide out of the ice plug chamber while that portion of the ice plug is and/or remains frozen.

The HCl-process controller 553 continues energizing the ice plug chamber TEC 569 and the ice plug ridge lock TEC 570, thereby continuing to chill the seawater therein, until an ice plug chamber temperature sensor 559 indicates to the HCl-process controller that the seawater/ice within the ice plug chamber has fallen below the freezing point of seawater (at the depth and pressure of the ice plug chamber) which is approximately −1.8 degrees Celsius. So, to ensure the rigidity of the ice plug within the ice plug chamber, the HCl-process controller will continue energizing the ice plug chamber TEC 569 and the ice plug ridge lock TEC 570 until the temperature of the seawater/ice within the ice plug chamber has fallen to at least −10 degrees Celsius before initiating and executing the sixth operational step.

After the seawater within the ice plug chamber 562 has been frozen, thereby fluidly isolating the interior of the HCl freezer chamber 561, the HCl-process controller 553 initiates and executes a sixth operational step of the frozen rod formation and discharge cycle.

At this point in the frozen rod formation and discharge cycle, the HCl-process controller 553 opens the ejection port gasification gas valve 543 thereby permitting gas to flow from the primary gas pipe 507 and into and through the ejection port gasification pipe 510 thus creating a pocket of gas beneath the frozen ice plug within the ice plug chamber 562. This pocket of gas insulates the frozen ice plug from the thermal energy within the body of water (516 in FIG. 35) that might otherwise hasten its melting, and/or require more of the embodiment's electrical power to prevent its melting and thereby to preserve and/or continue the ice plug's frozen state.

The HCl-process controller 553 leaves open the ejection port gasification gas valve 543, thereby allowing gas to continue to flow into the ejection port 563 until the inner ejection port pressure sensor 548 sends data to the HCl-process controller indicating that the pressure of the pocket of gas within the ejection port, and beneath the ice plug, has reached and/or exceeded the hydrostatic pressure measured, and transmitted to the HCl-process controller, by the outer ejection port pressure sensor 549 which measures the head pressure of the seawater outside the hydrochloric acid production and freezing apparatus 511 at the depth and pressure of the outer ejection port pressure sensor. After the pressure data transmitted to the HCl-process controller by and/or from the inner 548 and outer 549 ejection port pressure sensors indicates that the gas pocket has reached its desired volume, the HCl-process controller closes the ejection port gasification gas valve 543 thereby preventing an inflow of any additional gas to the ejection port.

The gas pocket, created beneath the frozen seawater plug within the ice plug chamber 562, will facilitate the eventual release, discharge, separation, and/or ejection, of the rod of frozen hydrochloric acid solution that will be created by, and/or result from, the frozen rod formation and discharge cycle.

After a pocket of gas has been created within the ice plug chamber 563, the HCl-process controller 553 initiates and executes a seventh operational step of the frozen rod formation and discharge cycle.

At this point in the frozen rod formation and discharge cycle, the HCl-process controller 553 opens the combustion chamber gas valve 541 thereby allowing a mixture of hydrogen and chlorine gases to flow from the primary gas pipe 507 and therefrom to flow into the combustion chamber gas pipe 508 and therethrough to flow 580 into the combustion chamber 560. Also, at this point in the frozen rod formation and discharge cycle, the HCl-process controller turns on, energizes, and/or activates, the ultraviolet lamp 572 causing the hydrogen and chlorine gases that flow into the combustion chamber to react with one another (i.e., to combust) thereby creating hydrogen chloride gas. The hydrogen chloride gas created during and/or by the combustion of the hydrogen and chlorine gases dissolves into the seawater reservoir positioned within a lower part of the combustion chamber thereby becoming hydrochloric acid and thereby acidifying the seawater reservoir.

As hydrogen and chlorine gases are combusted and/or reacted, and as hydrochloric acid is added to the seawater reservoir, both the acidity and the volume of that reservoir increase.

As the volume of the reservoir of acidified seawater and hydrochloric acid solution increases, the upper surface of that reservoir will reach a threshold level 581 within the combustion chamber 560. At this level, the lower combustion chamber pressure sensor 555 will transmit to the HCl-process controller 553 a pressure value corresponding to the sensor's depth (and/or head pressure) beneath the upper surface (at level 581) of the hydrochloric acid reservoir. However, that pressure value will include the addition of the pressure of any gas within the combustion chamber above the upper surface (at level 581) of the hydrochloric acid reservoir. Therefore, the HCl-process controller subtracts the pressure value it receives from the upper combustion chamber pressure sensor 554, from the pressure value that it receives from the lower combustion chamber pressure sensor, in order to determine the depth of the lower combustion chamber pressure sensor 555 within the reservoir of hydrochloric acid solution, and thereby in order to determine the depth, volume, and mass, of the hydrochloric acid solution within the reservoir.

After the pressure data from the lower 555 and upper 554 combustion chamber pressure sensors informs the HCl-process controller 553 that the hydrochloric acid reservoir within the combustion chamber is full, the HCl-process controller closes the combustion chamber gas valve 541 thereby ending the flow of gas into the combustion chamber.

When the upper surface of the hydrochloric acid reservoir reaches the level 581 through the additional of hydrochloric acid to a reservoir that started at the level 573, then the ratio of seawater to hydrochloric acid will be such that the filled reservoir (with upper surface at level 581) will be approximately 38% by weight hydrochloric acid.

It should be noted that the combustion of the hydrogen and chlorine gases within the combustion chamber 560, e.g., as triggered by the illumination of the ultraviolet lamp 572, does not also ignite and/or combust the hydrogen and chlorine gases within the primary gas pipe 507, because an ignition and/or flashback arrestor 582 within the combustion chamber gas pipe 508 prevents such a spread of the combustion into the primary gas pipe.

Heat produced by the serial and/or continuous combustion of hydrogen and chlorine gases within the combustion chamber 560 creates a thermal gradient across the thermoelectric coolers (and/or Peltier coolers/junctions) resulting in the creation of a voltage across those Peltier coolers. This voltage imparts electrical power to the embodiment, in addition to the electrical power produced by its two water-turbine/generator assemblies.

After the reservoir of hydrochloric acid solution within the combustion chamber 560 has reached its maximum desired volume and/or level, the HCl-process controller 553 initiates and executes an eighth operational step of the frozen rod formation and discharge cycle.

At this point in the frozen rod formation and discharge cycle, the HCl-process controller 553 turns on, energizes, and/or activates, the combustion chamber multistage thermoelectric coolers (TECs) 564-566, thereby chilling the hydrochloric acid solution within the hydrochloric acid reservoir. These TECs remain energized, and continue chilling the hydrochloric acid reservoir, until the combustion chamber temperature sensor 557 indicates to the HCl-process controller that the temperature of the hydrochloric acid solution within the hydrochloric acid reservoir has fallen below a temperature of −1.8 degrees Celsius, thereby ensuring that the hydrochloric acid solution will not melt the ice plug within the ice plug chamber 562. Likewise, when, and/or while, the combustion chamber temperature sensor indicates to the HCl-process controller that the temperature of the hydrochloric acid solution within the hydrochloric acid reservoir has reached the target temperature, then it will turn off, de-energize, and/or de-activate, the combustion chamber multistage thermoelectric coolers (TECs)—turning them on whenever the temperature rises above the target temperature, and turning them back off whenever the temperature again reaches the target temperature.

The temperature of the hydrochloric acid solution within the hydrochloric acid reservoir is lowered to a temperature below the freezing point of seawater ice in order to ensure that when added to the HCl freezer chamber 561, the hydrochloric acid solution will not melt the ice plug, within the ice plug chamber, thereby releasing the liquid hydrochloric acid solution into the body of water (561 in FIG. 35) outside the embodiment.

The HCl-process controller will continue energizing the combustion chamber TECs until the temperature of the hydrochloric acid solution within the combustion chamber has fallen to at least −10 degrees Celsius before initiating and executing the ninth operational step.

After the reservoir of hydrochloric acid solution within the combustion chamber 560 has reached a sufficiently low temperature, e.g., below −10 degrees Celsius, the HCl-process controller 553 initiates and executes a ninth operational step of the frozen rod formation and discharge cycle.

At this point in the frozen rod formation and discharge cycle, the HCl-process controller 553 opens the HCl drain valve 551 thereby permitting the reservoir of hydrochloric acid solution contained within the combustion chamber 560 to drain downward through open HCl drain valve and into the gas-filled HCl freezer chamber 561. And, as the chilled hydrochloric acid solution within the combustion chamber flows downward and into the HCl freezer chamber, the gas originally within the HCl freezer chamber flows upward into the combustion chamber.

Because of the plug of frozen seawater blocking and/or obstructing the ice plug chamber, the chilled hydrochloric acid solution that flows into the HCl freezer chamber 561 is trapped there. When the lower combustion chamber pressure sensor 555 indicates and/or signals to the HCl-process controller 553 a pressure reading that is approximately equal to a pressure reading indicated and/or signaled to the HCl-process controller by the upper combustion chamber pressure sensor 554, then the HCl-process controller closes the HCl drain valve 551, thereby confining the hydrochloric acid solution within the HCl freezer chamber.

After the chilled hydrochloric acid solution has drained into, and been confined within, the HCl freezer chamber 561, the HCl-process controller 553 turns on, energizes, and/or activates, the HCl freezer chamber TECs 567-568, and turns off, and/or de-energizes, the combustion chamber TECs 564-566.

The HCl-process controller 553 continues energizing the HCl freezer chamber TECs 567-568, thereby continuing to chill the hydrochloric acid solution within the HCl freezer chamber 561, until HCl freezer chamber temperature sensor 558 indicates to the HCl-process controller that the hydrochloric acid solution within the HCl freezer chamber has fallen below the freezing point of a 38 wt % hydrochloric acid solution (at the depth and pressure of the HCl freezer chamber) which is approximately −26 degrees Celsius. So, to ensure the rigidity of the frozen hydrochloric acid solution within the HCl freezer chamber, the HCl-process controller will continue energizing the HCl freezer chamber TECs 567-568 until the temperature of the hydrochloric acid solution within the HCl freezer chamber has fallen to at least −50 degrees Celsius before initiating and executing the tenth operational step. The HCl-process controller will turn off the HCl freezer chamber TECs when the temperature of the hydrochloric acid solution is sufficiently low (e.g., at least or below −50 degrees Celsius), and turn them back on when it rises above the target temperature (e.g., rises above −50 degrees Celsius).

After the hydrochloric acid solution within the HCl freezer chamber 561 has reached a sufficiently low temperature, e.g., below −50 degrees Celsius, the HCl-process controller 553 initiates and executes a tenth operational step of the frozen rod formation and discharge cycle.

At this point in the frozen rod formation and discharge cycle, the HCl-process controller 553 turns on, energizes, and/or activates, the ice plug ridge lock TEC 570. However, the HCl-process controller energizes the ice plug ridge lock TEC with a reversed electrical polarity, thereby causing the ice plug ridge lock TEC to produce heat instead of cold. Thus, after its activation, the ice plug ridge lock TEC begins to melt that portion of the seawater ice plug within the ice plug chamber 562, and adjacent to the ejection port 563. The cooling provided by the still energized HCl freezer chamber TECs 567-568 and ice plug chamber TEC 569 maintain the low temperatures, and frozen state, of the hydrochloric acid solution within the HCl freezer chamber 561 and of the seawater ice within the ice plug chamber 562, even as the distal and/or lowermost end of the ice plug at the ridge lock 571 is melted.

When the portion of the ice plug within the ice plug chamber 562 has melted to a sufficient degree, the ice ridges (at 571) anchoring the ice plug within the interior of the ice plug chamber lose their ability to fix the position of, and/or to hold up, the ice plug within the ice plug chamber. When the ice ridges have been sufficiently degraded and/or melted, the frozen rod comprising an upper portion of frozen hydrochloric acid, and a lower portion of frozen seawater, falls from, and/or out of, the bottom of the hydrochloric acid production and freezing apparatus 511, falling through the gas-filled ejection port 563. The ejection port offers minimal resistance to the downward gravitational separation of the frozen rod from the hydrochloric acid production and freezing apparatus due to the relatively greater diameter of the ejection port (due to the frustoconical flare in the wall of the ejection port at 583), and due to the pocket of gas within the ejection port.

The separation and/or passage of the frozen rod (not shown) from the hydrochloric acid production and freezing apparatus 511 is signaled to the HCl-process controller 553 when the temperature data from HCl freezer chamber temperature sensor 558 indicates an increase in the ambient temperature from that of the frozen hydrochloric acid solution, e.g., below approximately −50 degrees Celsius, to a nominal temperature of the seawater which will flow into the evacuated HCl freezer chamber 561 and ice plug chamber 562, e.g., approximately 4 degrees Celsius or greater, after the evacuation of the frozen rod.

If the HCl-process controller 553 determines that an expected interval of time expected to achieve a release of a frozen rod has exceeded a nominal, threshold, and/or expected amount of time, then the HCl-process controller will open frozen HCl ejection gas valve 542 after a pressure reading from the primary gas pipe pressure sensor 547 indicates that enough hydrogen and chlorine gas has been produced by the embodiment's (500 in FIG. 35) electrolyzer (506 in FIG. 35), and been trapped within the primary gas pipe 507, so that the pressure of that accumulated gas has come to exceed the has reached, and/or become equal to, a hydrostatic pressure of a depth equal to the depth of the frozen HCl ejection gas pipe 509. After the HCl-process controller opens frozen HCl ejection gas valve 542, gas will flow from the primary gas pipe, into and through the frozen HCl ejection gas pipe 509, and into an upper portion and/or part of the HCl freezer chamber 561, flowing into that HCl freezer chamber through the ejection gas effluent aperture 552.

If the HCl-process controller 553 determines that an expected interval of time expected to achieve a gas-pressure-assisted ejection of a frozen rod has exceeded a nominal, threshold, and/or expected amount of time, then the HCl-process controller will energize, in reverse polarity, the HCl freezer chamber TECs 567-568, and the ice plug chamber TEC 569 (while maintaining a reversed energization of the ice plug ridge lock TEC 570). And, because these thermoelectric coolers (TECs) will be energized in reversed polarities, they will emit heat and, with sufficient time, will melt the contents of the HCl freezer chamber 561 and the ice plug chamber 562. With sufficient time, the frozen rod will either become separated from the hydrochloric acid production and freezing apparatus 511, and fall through the ejection port 563, or it will be completely melted (although one would not expect this outcome to ever be necessary).

After the frozen rod has separated from the hydrochloric acid production and freezing apparatus 511 (or been melted), the HCl-process controller 553 initiates and executes the first operational step of the frozen rod formation and discharge cycle—thereby beginning (again) yet another hydrochloric-acid formation and sequestration cycle.

A primary gas pipe pressure sensor 547 measures the pressure of the gas within the primary gas pipe 507. When the pressure data it sends to the HCl-process controller 553 indicate that the free surface of the gas/seawater interface within the primary gas pipe has reached a threshold depth, and has moved to a depth proximate to an upper end of the electrolyzer (506 in FIG. 35), the HCl-process controller turns off, de-energizes, and/or deactivates, the electrolyzer, so as to prevent the mixture of hydrogen and chlorine gases that it produces from entering the electrolyzer chamber and potentially displacing the seawater pool in which the electrolyzer's electrodes are nominally bathed.

Another embodiment, similar to the embodiment 500 illustrated in FIGS. 34-49, utilizes, incorporates, and/or includes, a hydrophobic material in the fabrication of its HCl freezer chamber 561 and ice plug chamber 562 which tends to promote the clean, speedy, complete, and relatively quick and efficient, separation of the frozen rod from the interiors of those chambers—thereby facilitating the tenth operational step of the frozen rod formation and discharge cycle. The scope of the present disclosure includes embodiments that are constructed of, and/or which include, any and all types, varieties, and/or combinations, of materials.

Another embodiment, similar to the embodiment 500 illustrated in FIGS. 34-49, utilizes a combustion chamber configured to create a hydrochloric acid solution of a different acidity, strength, and/or relative hydrochloric acid content. For example, another embodiment creates, freezes, and discharges frozen rods, comprised of a hydrochloric acid solution of 10 wt %, which is characterized by a higher freezing point (of approximately −18 degrees Celsius) than the freezing point (of approximately −26 wt %) characteristic of the 38 wt % of hydrochloric acid solution produced and frozen by the embodiment illustrated in FIGS. 34-49. The scope of the present disclosure includes embodiments that produce, freeze, and sequester, hydrochloric acid solutions of any and all extant concentrations and/or acidities.

Another embodiment, similar to the embodiment 500 illustrated in FIGS. 34-49, is configured to chill the hydrochloric acid solutions that it produces and freezes to a different temperature, e.g., to −90 degrees Celsius, than does the embodiment illustrated in FIGS. 34-49. The scope of the present disclosure includes embodiments that freeze the solutions of hydrochloric acid that they produce to any temperature that is at least sufficient to achieve the freezing of the respective hydrochloric acid solutions, i.e., given the concentration and/or pressure (depth of HCl freezing chamber) characteristic of their respective hydrochloric acid solutions.

Another embodiment, similar to the embodiment 500 illustrated in FIGS. 34-49, is configured to chill the seawater that it freezes into ice plugs to a different temperature, e.g., to −90 degrees Celsius, than does the embodiment illustrated in FIGS. 34-49. The scope of the present disclosure includes embodiments that freeze seawater to any temperature that is at least sufficient to achieve the freezing of the seawater, i.e., given the pressure (depth of ice plug chamber) characteristic of their respective embodiments.

Another embodiment, similar to the embodiment 500 illustrated in FIGS. 34-49, uses an alternate refrigeration technology, e.g., gas compression and expansion, to chill its hydrochloric acid solution and seawater. And, another embodiment, similar to the embodiment 500 illustrated in FIGS. 34-49, uses an alternate heating technology, e.g., resistive electrical heaters, to warm the ridge lock portions of its frozen seawater ice plugs. The scope of the present disclosure includes embodiments that utilize any technology to chill and freeze hydrochloric acid solutions and/or seawater, as well as embodiments that utilize any technology to heat their frozen seawater ice plugs (and/or portions thereof).

Figure 50:
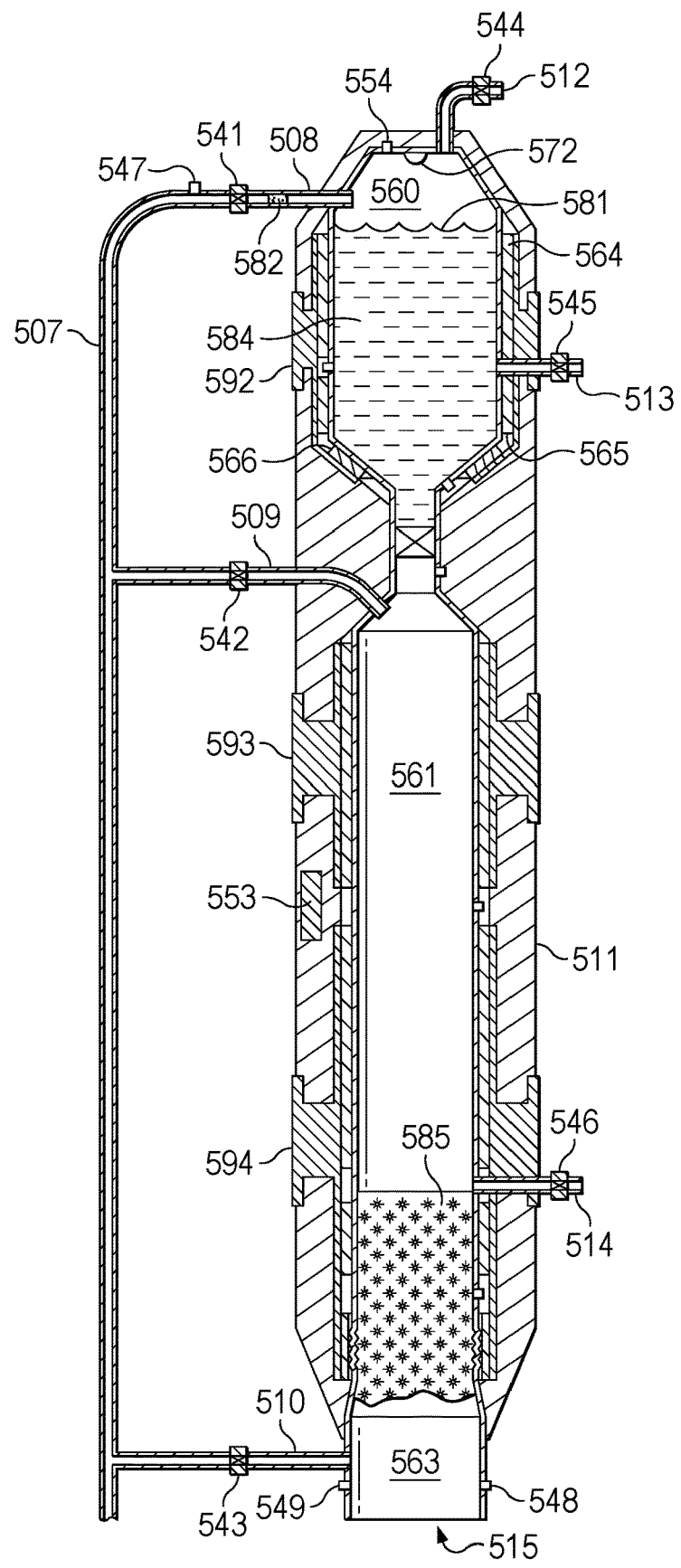
FIG. 50 is a side sectional view of the hydrochloric acid production and freezing apparatus of the sixth embodiment.

FIG. 50 shows a side sectional view of the same hydrochloric acid production and freezing apparatus 511 that is illustrated in FIGS. 45-49. The section plane is taken along section line 49-49 of FIG. 47.

FIG. 50 illustrates the configuration and/or state of the hydrochloric acid production and freezing apparatus 511 after its completion of the seventh operational step of the frozen rod formation and discharge cycle.

The combustion chamber has completed the generation, creation, and/or formulation, of a sufficient quantity and/or volume of hydrochloric acid so as to increase the volume of the seawater/hydrochloric acid reservoir 584 to the point that its upper surface has reached the threshold level 581 at which the HCl-process controller 553 will initiate and execute the eighth operational step of the frozen rod formation and discharge cycle, which is to cool the hydrochloric acid solution 584 down a temperature of no more than −10 degrees Celsius.

Visible in FIG. 50 is the ice plug 585 that was completed in, and/or as a consequence of, fifth operational step of the frozen rod formation and discharge cycle.

Figure 51:
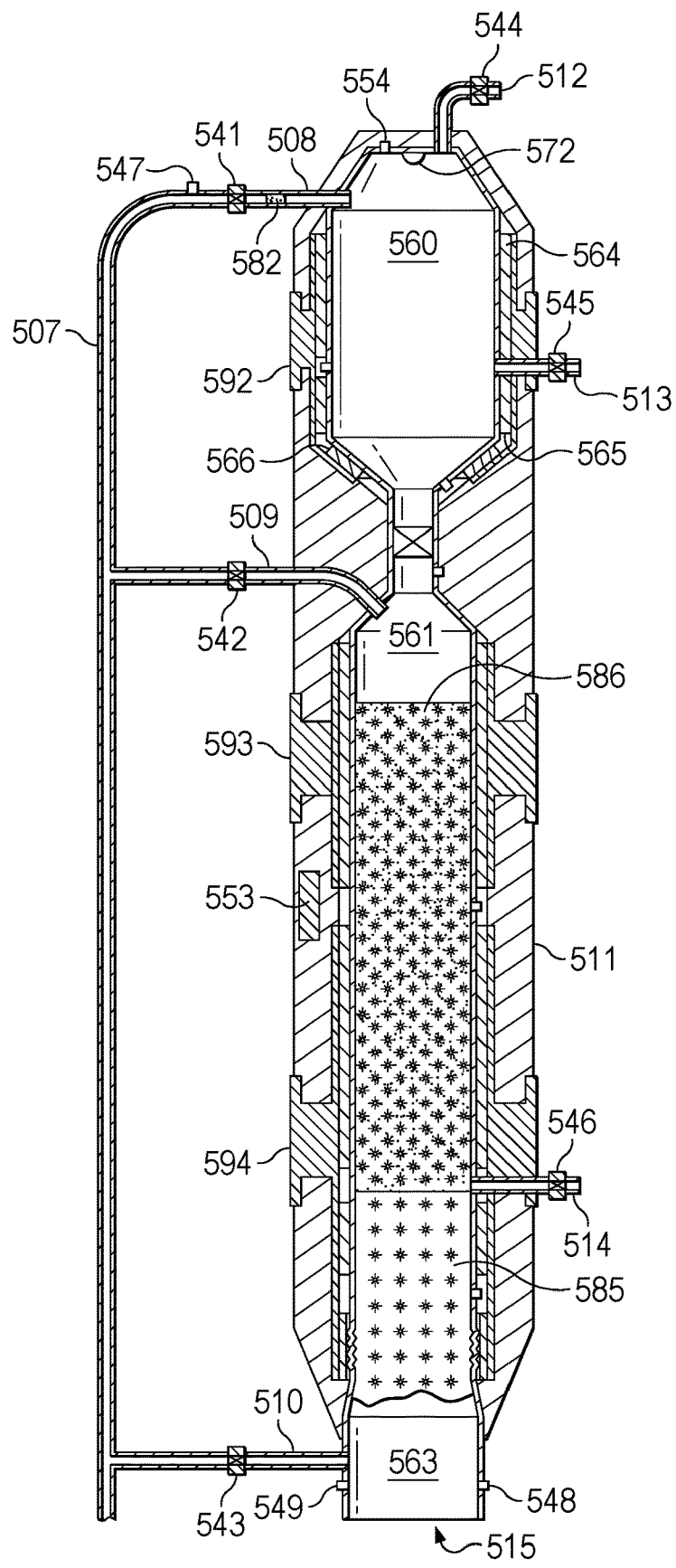
FIG. 51 is a side sectional view of the hydrochloric acid production and freezing apparatus of the sixth embodiment.

FIG. 51 shows a side sectional view of the same hydrochloric acid production and freezing apparatus 511 that is illustrated in FIGS. 45-50. The section plane is taken along section line 49-49 of FIG. 47.

FIG. 51 illustrates the configuration and/or state of the hydrochloric acid production and freezing apparatus 511 after its completion of the ninth operational step of the frozen rod formation and discharge cycle.

The hydrochloric acid solution decanted into the HCl freezer chamber 561 has been frozen into a cylindrical block 586 of hydrochloric ice. And that block of frozen hydrochloric acid rests atop the frozen seawater ice plug 585.

Figure 52:
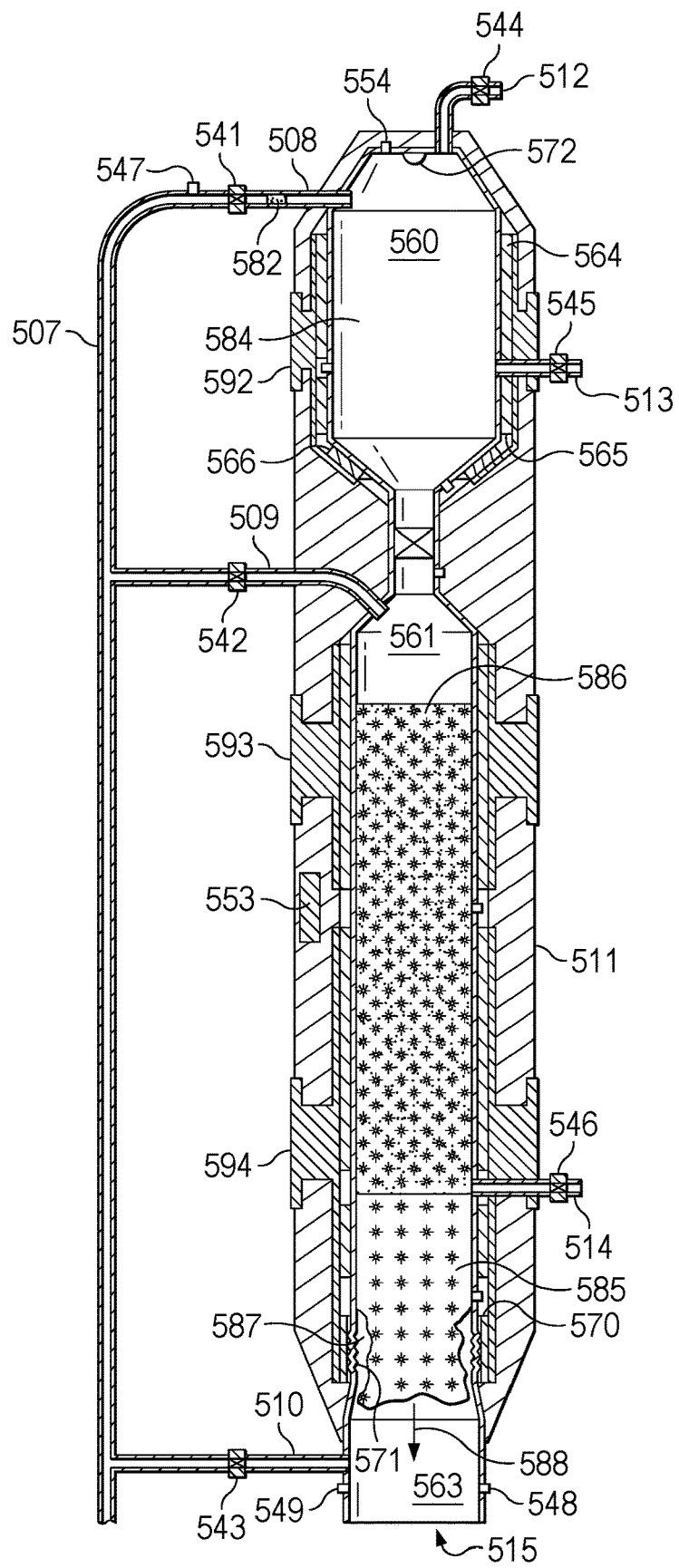
FIG. 52 is a side sectional view of the hydrochloric acid production and freezing apparatus of the sixth embodiment; and, FIG. 53 is a side view of an embodiment of the sixth embodiment discharging a rod of frozen hydrochloric acid solution.

FIG. 52 shows a side sectional view of the same hydrochloric acid production and freezing apparatus 511 that is illustrated in FIGS. 45-51. The section plane is taken along section line 49-49 of FIG. 47.

FIG. 52 illustrates the configuration and/or state of the hydrochloric acid production and freezing apparatus 511 after its completion of the tenth operational step of the frozen rod formation and discharge cycle. Following the reversed-polarity energization of the ice plug ridge lock TEC 570, portions, e.g., 587, of the seawater ice comprising the ice plug 585 have melted, separating those melted portions of the ice plug from the ridge locks 571 that preventing the ice plug, and the cylindrical block 586 of hydrochloric ice above it, from detaching from, and/or sliding out of, the hydrochloric acid production and freezing apparatus 511. Thus, when a sufficient volume of the ice plug adjacent to the ridge locks has melted, the frozen rod, comprising the upper cylindrical block of hydrochloric ice and the lower ice plug, will fall 588 down and out through the ejection port 563 of the hydrochloric acid production and freezing apparatus. Thereafter falling through the body of water (516 in FIG. 35) until reaches and/or exceeds a depth, e.g., 2 km, at which the hydrochloric acid will be sequestered for a long time, e.g., for millennia.

For the sake of clarity and understanding, the operational steps characteristic of the operation of the embodiment's (500 in FIG. 35) hydrochloric acid production and freezing apparatus 511 have been presented, and/or discussed, as though those operations were executed in a serial and/or linear fashion. However, it will be obvious to those skilled in the art that some of those steps may be started and/or executed in parallel, while other operational steps are in progress.

For example, an alternate embodiment similar to the one illustrated and discussed in FIGS. 34-52 executes the needed operational steps in the following and altered order of: 1) filling the combustion chamber 560, the HCl freezer chamber 561, the ice plug chamber 562, and the ejection port 563 with gas; 2) sealing the gas by closing the respective combustion chamber gas valve 541, the frozen HCl ejection gas valve 542, and the ejection port gasification gas valve 543; 3) fluidly isolating the combustion chamber from the HCl freezer chamber, the ice plug chamber, and the ejection port. These initial steps 1-3 are conducted in a serial fashion with respect to this alternate embodiment, just as they were for the original embodiment. However, after these first three operational steps are completed, the creation of the hydrochloric acid reservoir can occur at the same time that the ice plug is created.

In other words, after the completion of the third initial step, the combustion chamber 560 can be initialized (through the creation of an initial reservoir of seawater), the reservoir of hydrochloric acid solution (584 in FIG. 50) can then be created through a period during, and/or over which, hydrogen, and chlorine gases are combusted within the combustion chamber, and the filled reservoir of hydrochloric acid solution can be chilled. And, after the completion of the third initial step, and at the same time that the reservoir of hydrochloric acid is being created and cooled, seawater can be admitted to the ice plug chamber 562, and the ejection port 563, the ice plug (585 in FIG. 50) can then be created through the freezing of a portion of that seawater, and the ice plug can then be thermally isolated from the body of water (516 in FIG. 35) through the creation of a gas pocket below the ice plug and within the ejection port.

After the reservoir of hydrochloric acid solution (584 in FIG. 50) has been created and chilled, and after the seawater ice plug (585 in FIG. 50) has been created and insulated with a gas pocket between it and the seawater outside the embodiment, then . . . after both of these independently executed series of operational tasks have been completed . . . the chilled hydrochloric acid solution can be moved from the combustion chamber 560 to the HCl freezer chamber 561 and frozen. And then, after the hydrochloric acid solution has been frozen (586 in FIG. 50), the portion (e.g., 587 in FIG. 52) of the ice plug held fast within the ridge locks can be melted and the frozen rod of HCl and seawater can be discharged (e.g., 589 in FIG. 53) from the embodiment (500 in FIG. 35).

Figure 53:
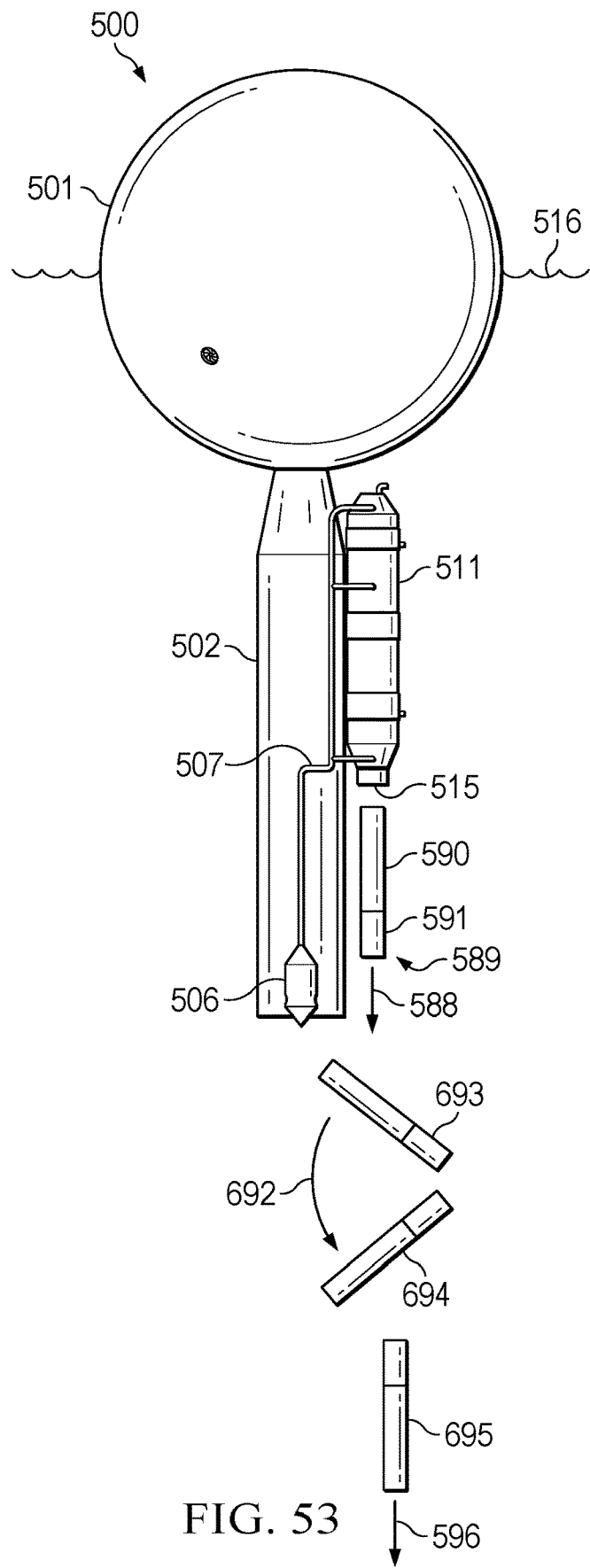

FIG. 53 shows a side view illustrating the discharge, release, and/or ejection, of a frozen rod from the same hydrochloric acid production and freezing apparatus 511 that is illustrated in FIGS. 45-52.

At the completion of the tenth operational step of the frozen rod formation and discharge cycle, a frozen cylindrical block, e.g., 589, composed of an upper cylindrical block, e.g., 590, of frozen hydrochloric acid solution and a lower cylindrical block, e.g., 591, of frozen seawater, falls out of the bottom of the hydrochloric acid production and freezing apparatus 511, passing through the lower mouth 515 of the ejection port (563 of FIG. 49) of the hydrochloric acid production and freezing apparatus. The density of the frozen hydrochloric acid solution (at a concentration of 38 wt % is approximately 1200 kg/m3, while the density of ice is approximately 917 kg/m3, therefore as the frozen rod falls down through the body of water 516, the heavier end of that frozen rod, i.e., the end with the frozen hydrochloric acid, will tend to cause the frozen rod, e.g., 593, to rotate to an orientation, e.g., 594, in which the heavier end is pointing downward. This rotation will tend to continue until the frozen rod has inverted the vertical orientation with which it fell out of the hydrochloric acid production and freezing apparatus, i.e., the orientation of frozen rod 589. Once fully inverted, the frozen rod 595 will tend to fall 596 downward and its downward velocity will tend to accelerate until it reaches a terminal velocity.

After an interval of time during which the frozen rod falls, it will achieve a depth at which its payload of hydrochloric acid will be effectively sequestered for a very long time, e.g., for millennia, and where the natural alkalinity found at significant depths within the sea is sufficient to neutralize the acidity of the payload of hydrochloric acid.

An alternate version of the embodiment 500 illustrated in FIGS. 34-53 incorporates, includes, utilizes, and/or comprises, and additional chamber and an altered configuration of its hydrochloric acid production and freezing apparatus 511.

The alternate embodiment has a combustion chamber 560 that is not insulated (595 in FIG. 49). However, the alternate embodiment's combustion chamber is encircled, wrapped, and/or surrounded, at least in part, by a fluid intake pipe through which seawater flows from the body of water on which the embodiment floats to, and/or into, the electrolyzer. Thus, instead of the heat produced by the combustion of hydrogen and chlorine gases within the combustion chamber being cooled by thermoelectric coolers which produce power as they cool the heated combustion chamber, in the alternate embodiment, the heat produced by the combustion of the hydrogen and chlorine gases within the combustion chamber is conductively transmitted and/or transferred to the seawater inflow pipe, and to the seawater flowing therethrough, by which fresh seawater is directed into the electrolyzer. By warming the seawater flowing into the electrolyzer, the alternate embodiment tends to enhance the efficiency of that electrolyzer and to produce more hydrogen and chlorine gases from a given expenditure of electrical energy.

Thus, when combusting hydrogen and chlorine gases within, the combustion chamber conductively transmits much, if not all, of its combustion-generated heat to the water flowing to the electrolyzer, thereby tending to enhance the efficiency of its electrolyzer, and, by constrast, thereby also precluding the possibility of gaining electrical power from the heat-driven thermoelectric (Peltier) coolers.

The alternate embodiment has an insulated HCl-chilling chamber fluidly connected, by way of a valve, to the uninsulated combustion chamber. And, after filling the hydrochloric acid solution reservoir within its combustion chamber, the alternate embodiment decants, moves, and/or transfers, that reservoir of hydrochloric acid solution from the combustion chamber to its HCl-chilling chamber by opening the valve that fluidly connects them. The HCl-chilling chamber of the alternate embodiment is similar in design to the combustion chamber 560 of the original embodiment (500 in FIG. 35) that is illustrated in FIGS. 34-53 in that it is insulated and equipped with thermoelectric coolers in a fashion, manner, design, and/or configuration, similar to that which characterizes the respective elements of the fashion, manner, design, and/or configuration, of the original embodiment's insulation (595 in FIG. 49) and thermoelectric coolers (564-566 in FIG. 49).

In the alternate embodiment, the HCl-chilling chamber is fluidly connected, by way of a valve, to an HCl freezer chamber comparable to that (561 of FIG. 49) of the original embodiment. And, the alternate embodiment, like the original embodiment, has an ice plug chamber, and an ejection port, which function in analogous manners to those of the original embodiment.

Figure 54:
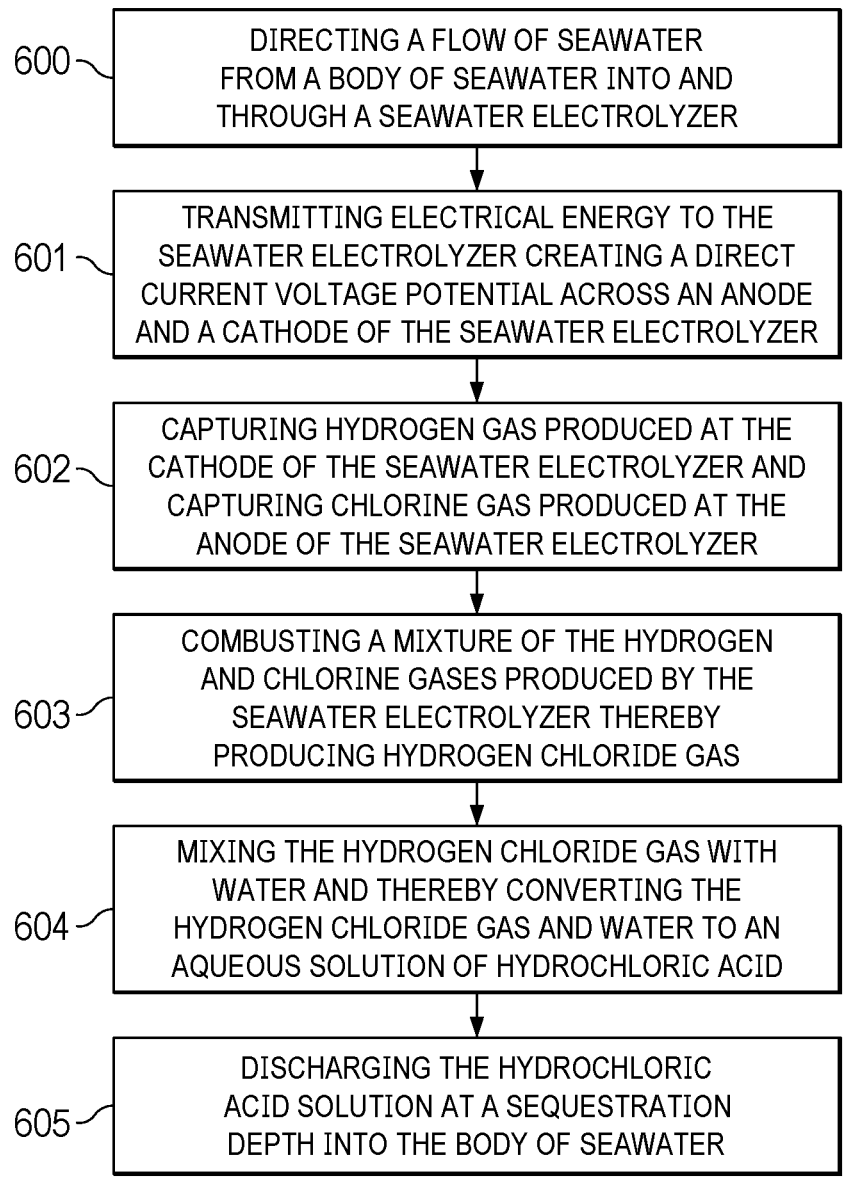
FIG. 54 enumerates the steps of a method of the present disclosure.

FIG. 54 illustrates a method of the present disclosure in which: 600: seawater from a body of seawater is made to flow into and through a seawater electrolyzer; 601: electrical energy, e.g., a direct current voltage and current, is used to create a voltage between the cathode and anode of the seawater electrolyzer; 602: the hydrogen and chlorine gases produced by the electrolyzer is captured; 603: the mixture of captured hydrogen and chlorine gases is combusted, and/or chemically reacted, thereby combining the gases into hydrogen chloride gas; 604: fluidly connecting the hydrogen chloride gas to a reservoir of water (and/or to a reservoir of an aqueous solution of hydrochloric acid) thereby dissolving the hydrogen chloride gas and converting the gas into hydrochloric acid that is thereby added to the reservoir; and, 605: discharge the reservoir, and the hydrochloric acid therein, into the body of seawater at a depth sufficient to achieve its long-term sequestration, i.e., at a "sequestration depth."

Figure 55:
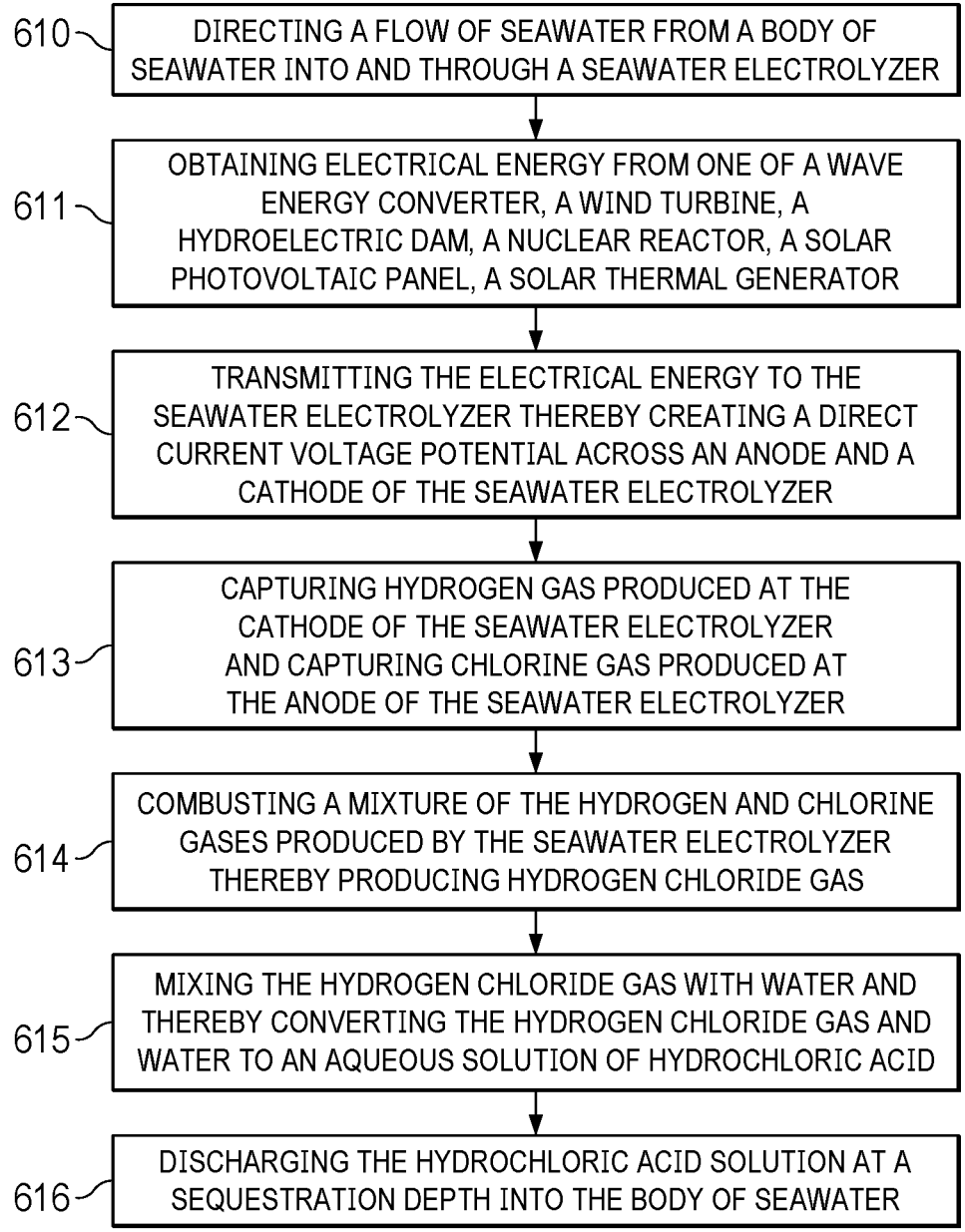
FIG. 55 enumerates the steps of a method of the present disclosure.

FIG. 55 illustrates a method of the present disclosure in which: 610: seawater from a body of seawater is made to flow into and through a seawater electrolyzer; 611: electrical energy is obtained from one of: a wave energy converter (such as the one disclosed in U.S. patent Ser. No. 16/789, 205); a wind turbine (e.g., a wind turbine affixed to a land mass, a wind turbine embedded in a seafloor, and a wind turbine floating in the sea); a hydroelectric dam, e.g., such as one might find along the course of a river; a nuclear power generator; a solar photovoltaic panel; and a solar thermal generator (such as one that uses an array of mirrors to concentrate solar radiation on a steam-powered generator) (the method includes any source of electrical power, electrical energy, and/or any source of non-electrical energy that may be converted into an electrical energy); 612: applying the obtained electrical energy to the anode and cathode of the seawater electrolyzer thereby manifesting an electrolysis of seawater within the electrolyzer; 613: capturing the hydrogen and chlorine gases produced by the seawater electrolyzer; 614: combusting and/or otherwise causing to react the hydrogen and chlorine gases to convert them to hydrogen chloride gas; 615: mixing the hydrogen chloride gas with water in a reservoir so as to dissolve the hydrogen chloride gas into the water and thereby convert the gas into hydrochloric acid; and, 616: discharge the reservoir, and the hydrochloric acid therein, into the body of seawater at a depth sufficient to achieve its long-term sequestration, i.e., at a "sequestration depth."

Figure 56:
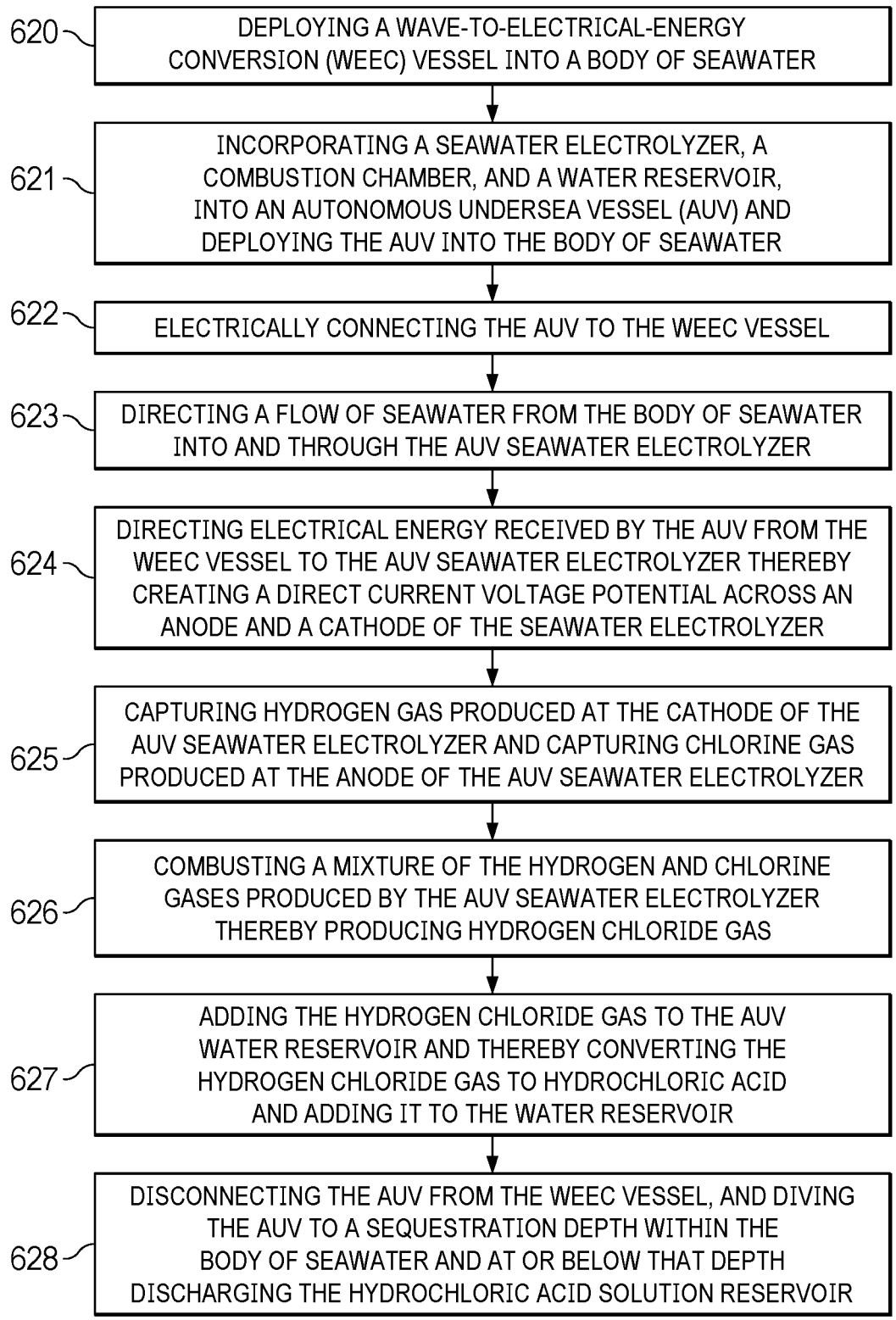
FIG. 56 enumerates the steps of a method of the present disclosure.
Figure 57:
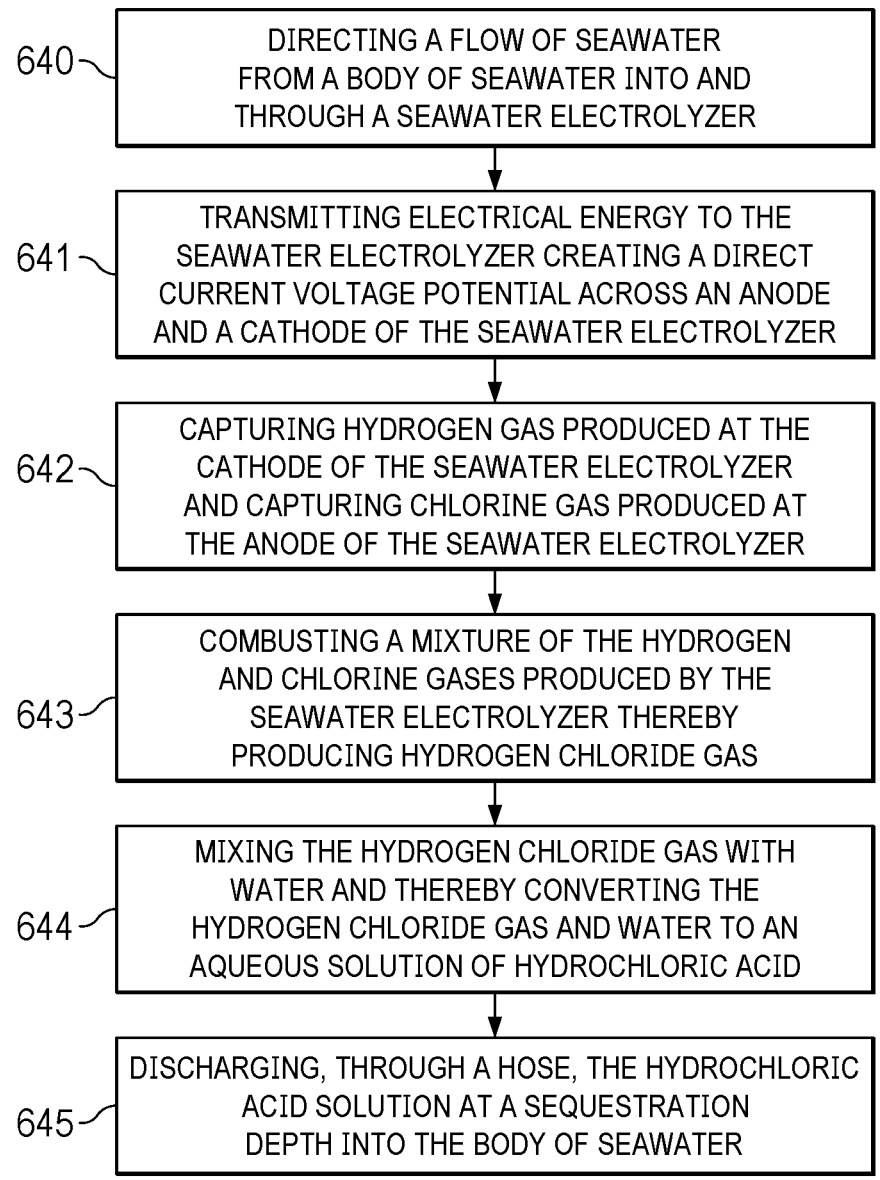
FIG. 57 enumerates the steps of a method of the present disclosure.

FIG. 56 illustrates a method of the present disclosure in which: 620: a wave energy conversion (WEC) device is deployed into a body of seawater in which the waves thereof will enable and/or cause the WEC device to produce electrical power; 621: create, and deploy into the body of seawater, an autonomous undersea vessel (AUV) that is able to electrically connect to the WEC device and obtain electrical power from it, and which AUV incorporates and/or comprises a seawater electrolyzer, a combustion chamber, and a hydrochloric acid reservoir; 622: electrically connect the AUV to the WEC device; 623: causing seawater from the body of seawater to flow into and through the seawater electrolyzer of the AUV; 624: apply electrical energy received from the WEC device to the anode and cathode of the AUV's seawater electrolyzer; 625: capture the hydrogen and chlorine gases produced by the AUV's seawater electrolyzer; 626: combust a mixture of the hydrogen and chlorine gases thereby chemically converting them into hydrogen chloride gas; 627: dissolve the hydrogen chloride gas into the water of the hydrochloric acid reservoir thereby converting the hydrogen chloride gas to hydrochloric acid and augmenting the volume of the hydrochloric acid reservoir; 628: detaching and/or disconnecting the AUV from the WEC device and then diving and/or submerging the AUV to a sequestration depth within the body of seawater and at that depth discharging the fluid contents of the hydrochloric acid reservoir.

FIG. 56 illustrates a method of the present disclosure in which: 640: seawater from a body of seawater is made to flow into and through a seawater electrolyzer; 641: utilize a source of direct-current electrical energy (the method includes any source of electrical power, electrical energy, and/or any source of non-electrical energy that may be converted into an electrical energy) so as to create an appropriate voltage and current across a cathode and an anode of the seawater electrolyzer; 642: capturing the hydrogen and chlorine gases produced by the seawater electrolyzer; 643: combusting and/or otherwise causing to react the hydrogen and chlorine gases to convert them to hydrogen chloride gas; 644: mixing the hydrogen chloride gas with water in a reservoir so as to dissolve the hydrogen chloride gas into the water and thereby convert the gas into hydrochloric acid (and to thereby reduce the pH of the water reservoir); and, 645: discharge the water reservoir, and the hydrochloric acid dissolved therein, into a hose a distal end of which is positioned within the body of seawater at a depth sufficient to achieve a long-term sequestration of the discharged hydrochloric acid, i.e., at a "sequestration depth."

Figure 58:
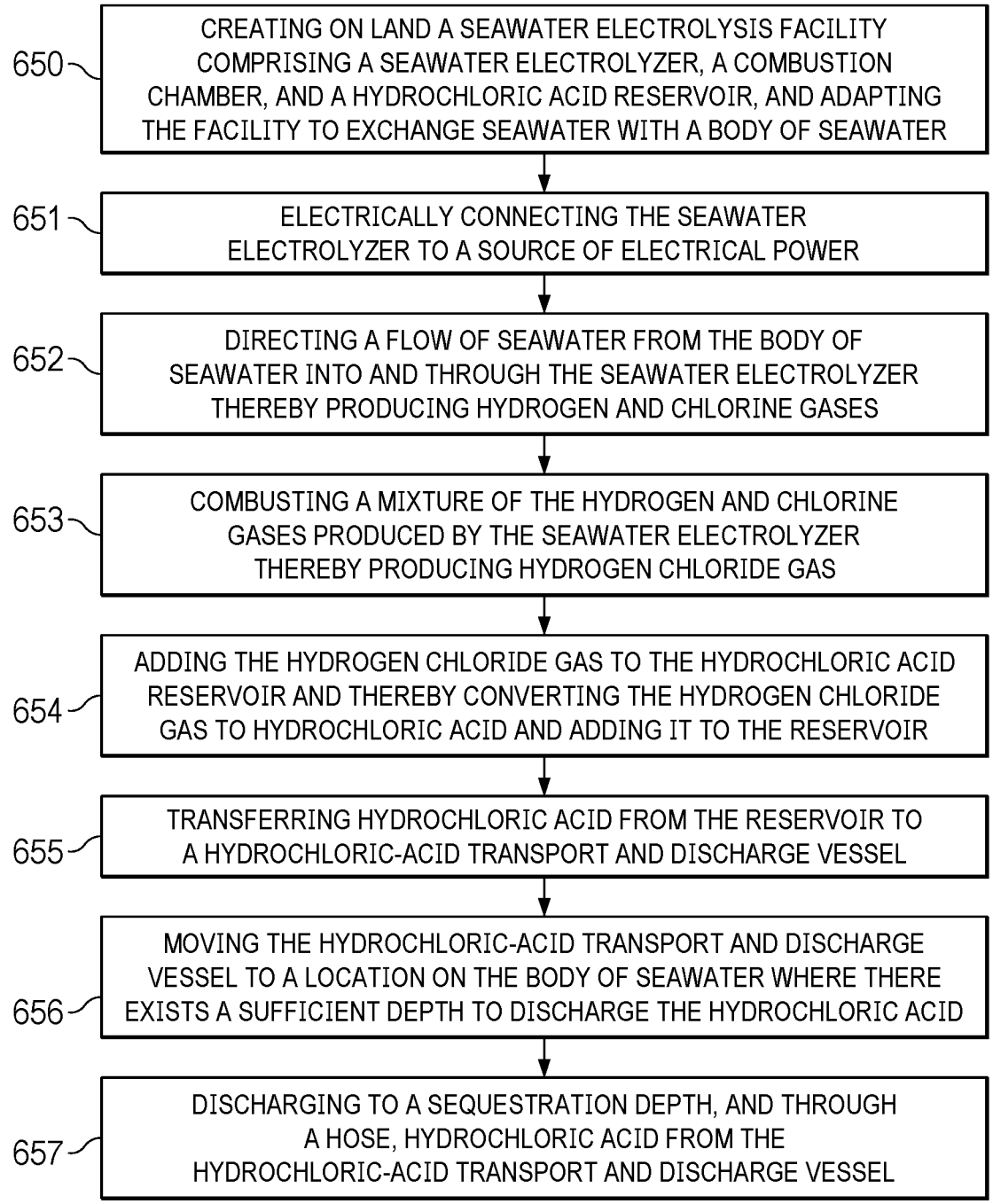
FIG. 58 enumerates the steps of a method of the present disclosure.

FIG. 58 illustrates a method of the present disclosure in which: 650: a facility capable of electrolyzing seawater is created on land, preferably adjacent to a body of seawater, the facility comprising a seawater electrolyzer, a combustion chamber, and a hydrochloric acid reservoir; 651: the facility and the seawater electrolyzer therein are connected to a source of electrical power (e.g., a nuclear power station, a solar panel, a wind turbine, a natural gas electricity generation utility, and/or an electrical grid) through which the seawater electrolyzer may be energized and seawater therein may be electrolyzed; 652: causing seawater from the body of seawater to flow (e.g., be pumped) into and through the seawater electrolyzer and thereby causing the seawater electrolyzer to produce hydrogen and chlorine gases from the seawater (and causing an effluent of the seawater electrolyzer to flow back to the body of seawater); 653: combust a mixture of the hydrogen and chlorine gases thereby chemically converting them into hydrogen chloride gas; 654: dissolve the hydrogen chloride gas into the water of the hydrochloric acid reservoir thereby converting the hydrogen chloride gas to hydrochloric acid and augmenting the volume of the hydrochloric acid reservoir; 655: transfer hydrochloric acid from the facility's hydrochloric acid reservoir to a hydrochloric-acid transport and discharge vessel; 656: moving, navigating, and/or transiting, the hydrochloric-acid transport and discharge vessel to a location at an upper surface of the body of seawater at which the seawater is sufficiently deep to sequester the hydrochloric acid solution stored on and/or within the hydrochloric-acid transport and discharge vessel; 657: causing the hydrochloric-acid transport and discharge vessel to discharge its store of hydrochloric acid solution into a hose wherein a distal end of the hose (and end from which the hydrochloric acid will flow out) is positioned at or below a sequestration depth.

Figure 59:
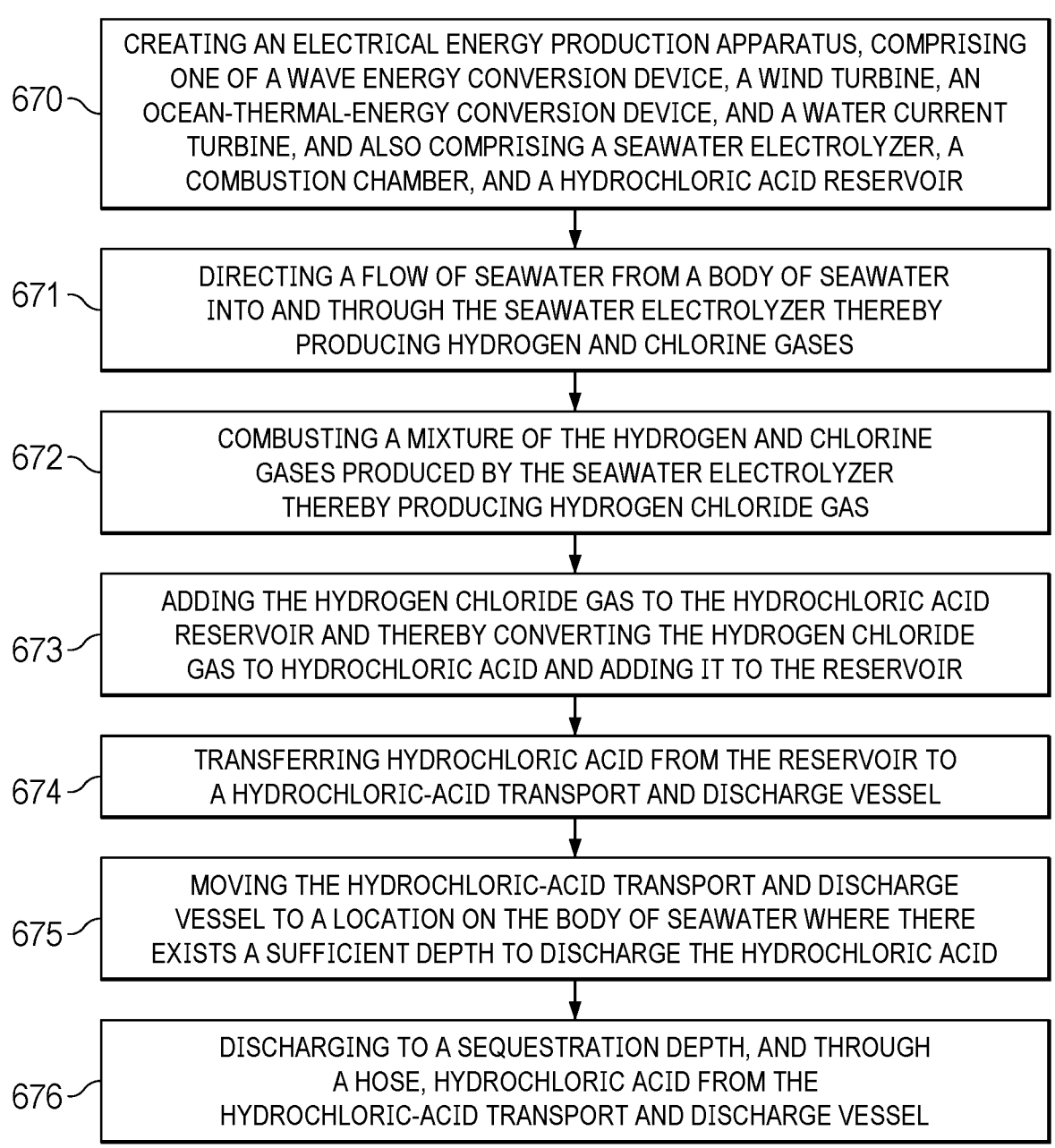
FIG. 59 enumerates the steps of a method of the present disclosure.

FIG. 59 illustrates a method of the present disclosure in which: 670: create a hydrochloric acid production apparatus that produces electrical energy from a natural, environmental, and/or renewable, source of energy (such as from an ocean wave, a wind, an ocean thermal gradient, and/or an ocean current), and which also comprises a seawater electrolyzer, a combustion chamber, and a hydrochloric acid reservoir; 671: causing seawater from the body of seawater to flow into and through the seawater electrolyzer thereby causing the seawater electrolyzer to produce hydrogen and chlorine gases from the seawater; 672: combust a mixture of the hydrogen and chlorine gases thereby chemically converting them into hydrogen chloride gas; 673: dissolve the hydrogen chloride gas into the water of the hydrochloric acid reservoir thereby converting the hydrogen chloride gas to hydrochloric acid and augmenting the volume of the hydrochloric acid reservoir; 674: transfer hydrochloric acid from the hydrochloric acid reservoir of the hydrochloric acid production apparatus to a hydrochloric-acid transport and discharge vessel; 675: moving, navigating, and/or transiting, the hydrochloric-acid transport and discharge vessel to a location at an upper surface of the body of seawater at which the seawater is sufficiently deep to sequester the hydrochloric acid solution stored on and/or within the hydrochloric-acid transport and discharge vessel; 676: causing the hydrochloric-acid transport and discharge vessel to discharge its store of hydrochloric acid solution into a hose wherein a distal end of the hose (and end from which the hydrochloric acid will flow out) is positioned at or below a sequestration depth.

We claim:

1. A method for increasing a depth of acidity in a body of seawater, comprising:
   directing a flow of seawater from a first depth of the body of seawater through an electrolyzer configured to establish an electrical potential between a cathode and an anode, the flow of seawater passing through an anodic chamber and then a cathodic chamber;
   transmitting electrical energy to the electrolyzer;
   capturing hydrogen gas produced within the electrolyzer at the cathode;
   capturing chlorine gas produced within the electrolyzer at the anode;
   mixing the hydrogen gas and chlorine gas;
   reacting the hydrogen gas and chlorine gas to produce a hydrogen chloride gas;
   transferring the hydrogen chloride gas to a free surface of a water reservoir contained within an acid resistant chamber to produce a hydrochloric acid solution; and,
   transferring the hydrochloric acid solution to a second depth of the body of seawater below said first depth.

2. The method of claim 1, wherein the electrolyzer includes a semipermeable diaphragm to separate the cathodic chamber within the electrolyzer from the anodic chamber within the electrolyzer.

3. The method of claim 1, wherein the electrolyzer includes an ion-permeable membrane that separates the cathodic chamber within the electrolyzer from the anodic chamber within the electrolyzer.

4. The method of claim 1, further comprising transmitting the electrical energy to the electrolyzer as a direct electrical current.

5. The method of claim 1, further comprising energizing an ultraviolet lamp to ignite the mixture of captured hydrogen and chlorine gases.

6. The method of claim 1, further comprising energizing an electrical spark generator to ignite the mixture of hydrogen and chlorine gases.

7. The method of claim 1, further comprising initializing the water reservoir with seawater from the body of seawater.

8. The method of claim 1, further comprising selecting a threshold volume of the solution of dissolved gases, and transferring said hydrochloric acid to said second depth when the hydrochloric acid reaches a threshold volume.

9. The method of claim 1, further placing the electrolyzer and water reservoir within a buoyant, environmentally-powered vessel.

10. The method of claim 9, further powering the buoyant environmentally-powered vessel with wind energy.

11. The method of claim 9, further powering the buoyant environmentally-powered vessel with ocean wave energy.

12. The method of claim 9, further powering the buoyant environmentally-powered vessel with thermal energy.

13. The method of claim 9, further powering the buoyant environmentally-powered vessel with solar energy.

14. The method of claim 1, further placing the electrolyzer and water reservoir within a terrestrial facility adjacent to the body of seawater.

15. The method of claim 14, transmitting electrical energy converted from a wind energy to the electrolyzer.

16. The method of claim 14, transmitting electrical energy converted from an ocean wave energy to the electrolyzer.

17. The method of claim 14, transmitting electrical energy converted from a thermal energy to the electrolyzer.

18. The method of claim 14, transmitting electrical energy converted from a solar energy to the electrolyzer.

19. The method of claim 1, further transferring contents of the reservoir of hydrochloric acid solution to the second depth through an acid-resistant hose.

20. The method of claim 1, further transferring contents of the reservoir of hydrochloric acid solution to the second depth with an autonomous undersea vessel.

21. The method of claim 1, further transferring contents of the reservoir of hydrochloric acid solution to the second depth by freezing the hydrochloric acid solution and dropping the frozen hydrochloric acid solution into the body of water and allowing it to sink to a depth within that body of water.

\* \* \* \* \*